United States Patent
Chhipa et al.

(10) Patent No.: US 11,024,263 B2
(45) Date of Patent: Jun. 1, 2021

(54) METHOD AND APPARATUS FOR ADJUSTING AUGMENTED REALITY CONTENT

(71) Applicant: SAMSUNG ELECTRONICS CO., LTD., Suwon-si (KR)

(72) Inventors: Prakash Chandra Chhipa, Noida (IN); Ravinder Dhiman, Noida (IN)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 16/250,688

(22) Filed: Jan. 17, 2019

(65) Prior Publication Data
US 2019/0221191 A1   Jul. 18, 2019

(30) Foreign Application Priority Data
Jan. 18, 2018 (IN) .............................. 201811002097

(51) Int. Cl.
*G09G 5/373* (2006.01)
*G06F 3/147* (2006.01)

(52) U.S. Cl.
CPC ............ *G09G 5/373* (2013.01); *G06F 3/147* (2013.01); *G09G 2340/04* (2013.01); *G09G 2340/12* (2013.01); *G09G 2354/00* (2013.01); *G09G 2370/022* (2013.01)

(58) Field of Classification Search
CPC ............... G09G 5/373; G09G 2340/04; G09G 2340/12; G09G 2354/00; G06F 3/147
USPC ......................................................... 345/633
See application file for complete search history.

(56) References Cited

U.S. PATENT DOCUMENTS

| 2,960,761 | A | 11/1960 | Preader |
| 9,213,405 | B2 | 12/2015 | Perez et al. |
| 9,304,319 | B2 | 4/2016 | Bar-Zeev et al. |
| 9,557,951 | B2 | 1/2017 | Bean et al. |
| 2013/0050258 | A1* | 2/2013 | Liu ...................... G02B 27/017 345/633 |

(Continued)

FOREIGN PATENT DOCUMENTS

| WO | 2012/083087 A1 | 6/2012 |
| WO | 2014/100688 A2 | 6/2014 |

(Continued)

OTHER PUBLICATIONS

International Search Report (PCT/ISA/210) & Written Opinion (PCT/ISA/237) dated Apr. 30, 2019 issued by the International Searching Authority in International Application No. PCT/KR2019/000629.

(Continued)

*Primary Examiner* — Jin Ge
(74) *Attorney, Agent, or Firm* — Sughrue Mion, PLLC

(57) ABSTRACT

Methods and devices providing augmented reality (AR) content. The method includes monitoring viewing activity of a user with respect to one or more of objects, determining, based on the viewing activity of the user, a viewing time of AR content associated with a next appearing object from among the one or more of objects, determining a size of the AR content associated with the next appearing object based on the viewing activity of the user, and displaying the AR content of the next appearing object based on the size of the AR content.

16 Claims, 53 Drawing Sheets

(56) References Cited

U.S. PATENT DOCUMENTS

| | | |
|---|---|---|
| 2013/0083011 A1* | 4/2013 | Geisner .................. G09G 5/00 |
| | | 345/419 |
| 2013/0106674 A1 | 5/2013 | Wheeler et al. |
| 2013/0235347 A1 | 9/2013 | Hennessey et al. |
| 2014/0108309 A1 | 4/2014 | Frank et al. |
| 2014/0168056 A1 | 6/2014 | Swaminathan et al. |
| 2014/0253588 A1 | 9/2014 | Mandala |
| 2015/0206353 A1 | 7/2015 | Grasso et al. |
| 2015/0219899 A1 | 8/2015 | Mack et al. |
| 2016/0247324 A1 | 8/2016 | Mullins et al. |
| 2017/0206691 A1* | 7/2017 | Harrises ................. G06T 11/60 |
| 2017/0293356 A1* | 10/2017 | Khaderi ................ A63F 13/212 |
| 2018/0307303 A1* | 10/2018 | Powderly ................ G06F 3/011 |
| 2019/0041642 A1* | 2/2019 | Haddick ............ G02B 27/0172 |
| 2019/0122440 A1* | 4/2019 | Barros ...................... G06T 7/75 |
| 2019/0196576 A1* | 6/2019 | Saarinen ............ G06K 9/00671 |
| 2019/0259189 A1* | 8/2019 | Tinsman ................. G06T 11/00 |

FOREIGN PATENT DOCUMENTS

| | | |
|---|---|---|
| WO | 2014/197231 A3 | 12/2014 |
| WO | 2015/126007 A1 | 8/2015 |
| WO | 2017192130 A1 | 11/2017 |

OTHER PUBLICATIONS

Communication dated Oct. 26, 2020 issued by the European Intellectual Property Office in counterpart European Application No. 19741411.3.

* cited by examiner

FIG. 7C

|  | $t_{A_1}$ | $t_{A_2}$ | $t_{A_3}$ | $t_{A_4}$ | $t_{A_5}$ | $Exp(t_{A_6})^*$ | Observational Category |
|---|---|---|---|---|---|---|---|
| User1 | 70 | 65 | 80 | 60 | 55 | 66 | Category 8 |
| User2 | 3 | 4 | 2 | 5 | 3 | 3 | Category 1 |
| User3 | 15 | 20 | 12 | 17 | 16 | 16 | Category 4 |
| User4 | 30 | 35 | 28 | 32 | 40 | 33 | Category 5 |

Present Time

FIG. 7E

|       | $t_{R_1}$ | $t_{R_2}$ | $t_{R_3}$ | $t_{R_4}$ | $t_{R_5}$ | $Exp(t_{A_6})^*$ | Observational Category |
|-------|-----------|-----------|-----------|-----------|-----------|------------------|------------------------|
| User1 | 70        | 65        | 80        | 60        | 55        | 66               | Category 8             |
| User2 | 3         | 4         | 2         | 5         | 3         | 3                | Category 1             |
| User3 | 15        | 20        | 12        | 17        | 16        | 16               | Category 4             |
| User4 | 30        | 35        | 28        | 32        | 40        | 33               | Category 5             |

Present Time

FIG. 7G

| | $t_{R_1}/t_{A_1}$ | $t_{R_2}/t_{2_3}$ | $t_{R_3}/t_{A_3}$ | $t_{R_4}/t_{A_4}$ | $t_{R_5}/t_{A_5}$ | $Exp(t_{A_6})^*$ | Observational Category |
|---|---|---|---|---|---|---|---|
| User1 | 70/65 | 65/67 | 80/75 | 60/65 | 55/60 | 67 | Category 8 |
| User2 | 3/4 | 4/3 | 2/3 | 5/4 | 3/2 | 3 | Category 1 |
| User3 | 15/12 | 20/22 | 12/15 | 17/18 | 16/15 | 17 | Category 4 |
| User4 | 30/25 | 35/40 | 28/30 | 32/35 | 40/45 | 35 | Category 5 |

Present Time

FIG. 9B

|  | $\theta_{E_1}$ | $\theta_{E_2}$ | $\theta_{E_3}$ | $\theta_{E_4}$ | $\theta_{E_5}$ | $Exp(t_{A_6})^*$ | Observational Category |
|---|---|---|---|---|---|---|---|
| User1 | 100 | 90 | 95 | 80 | 85 | 33 | Category 6 |
| User2 | 11 | 14 | 18 | 12 | 22 | 3 | Category 1 |
| User3 | 40 | 45 | 55 | 62 | 52 | 16 | Category 4 |
| User4 | 190 | 210 | 240 | 220 | 235 | 66 | Category 9 |

Present Time

Estimated expected gaze time for further augmented content

FIG. 9D

Eye movement Angular Velocity (degree/sec) : $\theta_E$   Present Time
Head movement Angular Velocity (degree/sec) : $\theta_H$

| $\theta_E$ | $\theta_{E_0}$ | $\theta_{E_1}$ | $\theta_{E_2}$ | $\theta_{E_3}$ | $\theta_{E_4}$ | $\theta_{E_5}$ | $Exp(t_{A_6})$ |
|---|---|---|---|---|---|---|---|
| $\theta_H$ | $\theta_{H_0}$ | $\theta_{H_1}$ | $\theta_{H_2}$ | $\theta_{H_3}$ | $\theta_{H_4}$ | $\theta_{H_5}$ | |

$T_0$  $T_1$  $T_2$  $T_3$  $T_4$  $T_5$  $T_6$

Estimated expected gaze time for further augmented content

FIG. 26A

|  |  | Object 1 | Object 2 | Object 3 | Object 4 | Object 5 | Object 6 | Object 7 |
|---|---|---|---|---|---|---|---|---|
| User1 | T | $T_{LL}$ | $T_{LL}$ | $T_{HH}$ | $T_L$ | $T_L$ | $T_M$ |  |
|  | A | × | × | × | — | — | — | $A_L - A_M$ |
| User2 | T | $T_L$ | $T_L$ | $T_L$ | $T_M$ | $T_L$ | $T_L$ |  |
|  | A | — | — | — | — | — | — |  |
| User3 | T | $T_M$ | $T_M$ | $T_{HH}$ | $T_{LL}$ | $T_M$ | — |  |
|  | A | — | — | × | × | — | — |  |
| User4 | T | $T_H$ | $T_H$ | $T_H$ | $T_{LL}$ | $T_{LL}$ | $T_{LL}$ |  |
|  | A | — | — | — | × | × | × |  |
| User5 | T | $T_{LL}$ | $T_{LL}$ | $T_{LL}$ | $T_{LL}$ | $T_{LL}$ | $T_{LL}$ |  |
|  | A | × | × | × | × | × | × |  |

| | | |
|---|---|---|
| $A_L$ | LESS AR content |  |
| $A_M$ | Moderate AR content |  |
| $A_H$ | More AR content |  |

FIG. 27

| | | Object 1 | Object 2 | Object 3 | Object 4 | Object 5 | Object 6 | Object 7 |
|---|---|---|---|---|---|---|---|---|
| User1 | T | $T_{LL}$ | $T_{LL}$ | $T_{HH}$ | $T_L$ | $T_L$ | $T_M$ | |
| | A | × | × | × | — | — | — | |
| User2 | T | $T_L$ | $T_L$ | $T_L$ | $T_M$ | $T_L$ | $T_L$ | $A_L$ |
| | A | — | — | — | — | — | — | |
| User3 | T | $T_M$ | $T_M$ | $T_{HH}$ | $T_{LL}$ | $T_M$ | $T_L$ | |
| | A | — | — | × | × | — | — | |
| User4 | T | $T_H$ | $T_H$ | $T_H$ | $T_{LL}$ | $T_{LL}$ | $T_{LL}$ | |
| | A | — | — | — | × | × | × | |
| User5 | T | $T_{LL}$ | $T_{LL}$ | $T_{LL}$ | $T_{LL}$ | $T_{LL}$ | $T_{LL}$ | |
| | A | × | × | × | × | × | × | |

FIG. 28

|  |  | Object 1 | Object 2 | Object 3 | Object 4 | Object 5 | Object 6 | Object 7 |
|---|---|---|---|---|---|---|---|---|
| User1 | T | $T_{LL}$ | $T_{LL}$ | $T_{HH}$ | $T_L$ | $T_L$ | $T_M$ | |
| | A | × | × | × | — | — | — | |
| User2 | T | $T_L$ | $T_L$ | $T_L$ | $T_M$ | $T_L$ | $T_L$ | |
| | A | — | — | — | — | — | — | |
| User3 | T | $T_M$ | $T_M$ | $T_{HH}$ | $T_{LL}$ | $T_M$ | $T_L$ | |
| | A | — | — | × | × | — | — | $A_M$ |
| User4 | T | $T_H$ | $T_H$ | $T_H$ | $T_{LL}$ | $T_{LL}$ | $T_{LL}$ | |
| | A | — | — | — | × | × | × | |
| User5 | T | $T_{LL}$ | $T_{LL}$ | $T_{LL}$ | $T_{LL}$ | $T_{LL}$ | $T_{LL}$ | |
| | A | × | × | × | × | × | × | |

FIG. 29

|  |  | Object 1 | Object 2 | Object 3 | Object 4 | Object 5 | Object 6 | Object 7 |
|---|---|---|---|---|---|---|---|---|
| User1 | T | $T_{LL}$ | $T_{LL}$ | $T_{HH}$ | $T_L$ | $T_L$ | $T_M$ |  |
|  | A | × | × | × | — | — | — |  |
| User2 | T | $T_L$ | $T_L$ | $T_L$ | $T_M$ | $T_L$ | $T_L$ |  |
|  | A | — | — | — | — | — | — |  |
| User3 | T | $T_M$ | $T_M$ | $T_{HH}$ | $T_{LL}$ | $T_M$ | $T_L$ |  |
|  | A | — | — | × | × | — | — |  |
| User4 | T | $T_H$ | $T_H$ | $T_H$ | $T_{LL}$ | $T_{LL}$ | $T_{LL}$ | $A_H$ |
|  | A | — | — | — | × | × | × |  |
| User5 | T | $T_{LL}$ | $T_{LL}$ | $T_{LL}$ | $T_{LL}$ | $T_{LL}$ | $T_{LL}$ |  |
|  | A | × | × | × | × | × | × |  |

FIG. 30

|  |  | Object 1 | Object 2 | Object 3 | Object 4 | Object 5 | Object 6 | Object 7 |
|---|---|---|---|---|---|---|---|---|
| User1 | T | $T_{LL}$ | $T_{LL}$ | $T_{HH}$ | $T_L$ | $T_L$ | $T_M$ |  |
|  | A | × | × | × | — | — | — |  |
| User2 | T | $T_L$ | $T_L$ | $T_L$ | $T_M$ | $T_L$ | $T_L$ |  |
|  | A | — | — | — | — | — | — |  |
| User3 | T | $T_M$ | $T_M$ | $T_{HH}$ | $T_{LL}$ | $T_M$ | $T_L$ |  |
|  | A | — | — | × | × | — | — |  |
| User4 | T | $T_H$ | $T_H$ | $T_H$ | $T_{LL}$ | $T_{LL}$ | $T_{LL}$ |  |
|  | A | — | — | — | × | × | × |  |
| User5 | T | $T_{LL}$ | $T_{LL}$ | $T_{LL}$ | $T_{LL}$ | $T_{LL}$ | $T_{LL}$ | No AR Content appears |
|  | A | × | × | × | × | × | × |  |

METHOD AND APPARATUS FOR ADJUSTING AUGMENTED REALITY CONTENT

CROSS-REFERENCE TO RELATED APPLICATION(S)

This application is based on and claims priority under 35 U.S.C. § 119 to an Indian Patent Application No. 201811002097, filed on Jan. 18, 2018, in the Indian Patent Office, the disclosure of which is incorporated by reference herein in its entirety.

BACKGROUND

1. Field

The disclosure relates to providing augmented reality (AR) content. More particularly, the disclosure relates to a method and an apparatus for determining AR content to be provided to an augmented reality (AR) device while a user is viewing real objects via the AR device.

2. Description of Related Art

Augmented reality (AR) refers to an enhanced version of reality created by using computer-graphics technology, and thus, AR is changing the way users view the world. Unlike virtual reality, which creates a totally artificial environment, AR uses an existing environment and overlays new content over the existing environment. AR can be experienced by users by using various AR enabled applications on users' electronic devices. These AR enabled applications are developed to provide addition/useful AR related information on the users' electronic devices when users are viewing objects in the real world through cameras of the respective electronic devices. The AR related information may include web search results, social media content, media including textual information, images, videos, multi-media, notifications, etc. in association with the objects being viewed. Further, various augmented reality (AR) enabled devices have been recently developed to support augmented reality services to be provided to end users. One such example of an AR capable device is a see-through type display device, such as wearable glasses and a similar near-eye device, which provides instant AR related information when a user is viewing the surrounding real world.

Typically, wearable glasses include sensors along with one or more cameras in communication with a processor. The sensors and the cameras may be located at the outside portion of the wearable glasses. The cameras may be mounted near the eyes of a user. When the user wears the wearable glasses, the cameras may capture an image similar to an image received through the eyes of the user. Further, the sensors capture user's viewing interactions, for example, the eye-ball movement of the user, with respect to objects being viewed in the real world. The information captured by the cameras and sensors is transmitted to the processor to be processed and interpreted. The processor accordingly determines the objects of the surrounding real world that are being viewed by the user of the wearable device and outputs appropriate AR content for the objects being viewed. Some of the sensors and cameras may further include depth sensors to measure the depth value of the objects being captured by the cameras. Microsoft HoloLens is one such device which includes two depth sensing cameras that work in tandem to perform depth sensing tasks. One of the functions of the various sensors fitted on the outside portion of the wearable glasses is to track the eye-gaze of the user while the user is viewing objects in the real world. The wearable glasses may include an eyeball-tracking camera or an eye-tracker device to detect a gaze of the user by tracking the pupil of the user. The eye-tracking data can include various kinds of information about the user's eye-movement as he/she observes the viewable objects in the surrounding environment. The information may be used to measure either the point of gaze, i.e., a point where the user is looking, or the motion of the eye relative to the user's head. Many AR applications benefit from eye-tracking for visualization and interaction purposes between users and objects being viewed by the users. The AR applications may analyze the eye-tracking data and understand a state of the user viewing a particular object and then provide output AR content based on the user's state.

Presently, AR content that is provided for display on an AR device to an end-user is pre-set for a corresponding object and once the corresponding object is detected by the AR device, the pre-set content is fetched and displayed to the end-user. Thus, the AR content as fetched is static in nature without any consideration of the user's interest in that AR content.

In view of the above, it is desired to provide solutions to capture user's real-time viewing and exploration patterns, and based on the captured patterns, determine the best-suited AR content for viewing by the user. Also, there is a need to understand user's observation patterns of the near past augmented content as well as real objects to enhance the AR viewing experience of the user for further real objects in the field of view of the user.

SUMMARY

Provided is a method of providing augmented reality (AR) content in an AR device. The method includes monitoring viewing activity of a user towards at least one object; determining, based on the viewing activity of the user, a possible viewing time of AR content associated with a next appearing at least one object; determining a size of the AR content associated with the next appearing at least one object based on the viewing activity of the user; and displaying the AR content of the next appearing at least one object based on the size of the AR content.

According to an aspect of the disclosure, the method further includes detecting, for monitoring of the viewing activity of the user, viewing parameters including at least one of eye gaze time and eye movement determined based on a head movement of the user or an eye ball movement of the user.

According to an aspect of the disclosure, the monitoring of the viewing activity of the user includes estimating the possible viewing time using the viewing parameters.

According to an aspect of the disclosure, the method further includes determining an observation category based on the eye gaze time, where the observation category indicates whether the user is a fast explorer based on the duration of the eye gaze time.

According to an aspect of the disclosure, the eye gaze time is divided into a plurality of time instances, and the determining of the observation category includes determining the observation category by estimating the possible viewing time based on the plurality of the time instances.

According to an aspect of the disclosure, the determining of the possible viewing time further includes in response to a determination that each of viewing time corresponding to each of the plurality of time instances is greater than a predetermined maximum threshold time or less than a predetermined minimum threshold time, determining the size of the AR content associated with the next appearing at least one object as zero.

According to an aspect of the disclosure, the determining of the size of the AR content includes determining the size of the AR content based on the observation category.

According to an aspect of the disclosure, the determining of the size of the AR content includes determining the size of the AR content in proportion to the length of the eye gaze time.

According to an aspect of the disclosure, the method further includes determining a media type of the AR content based on the eye gaze time, where the media type of the AR content is selected as one or more of video type, audio type, text type, and image type.

According to an aspect of the disclosure, the viewing activity includes at least one of viewing instances over at least one of a plurality of times instances or a plurality of eye gazes.

According to an aspect of the disclosure, the monitoring of the viewing activity of the user includes filtering out the viewing activity of the user having a viewing time less than a predetermined minimum threshold time or greater than a predetermined maximum threshold time.

According to an aspect of the disclosure, the monitoring of the viewing activity of the user further includes updating the predetermined minimum threshold time or the predetermined maximum threshold time based on at least one of an observation category, historical viewing activity data, real time viewing activity data and user-specific profile data.

According to an aspect of the disclosure, the method further includes monitoring user data stored in the AR device and location data of the AR device, where the determining of the possible viewing time of the AR content is performed based on the viewing activity of the user, the user data and the location data of the AR device.

According to another aspect of the disclosure, provided is an apparatus for providing augmented reality content. The apparatus includes at least one sensor for monitoring viewing activity of a user towards one or more of objects; a processor for determining, based on the viewing activity of the user, a possible viewing time of AR content associated with a next appearing object among the one or more of objects, and determining a size of the AR content associated with the next appearing object based on the viewing activity of the user; a display for display the AR content of the next appearing object based on the size of the AR content.

According to an aspect of the disclosure, the at least one sensor is further configured for detecting, for monitoring of the viewing activity of the user, viewing parameters comprising at least one of eye gaze time and eye movement determined based on a head movement of the user or an eye ball movement of the user.

According to an aspect of the disclosure, the monitoring of the viewing activity of the user includes estimating the possible viewing time using the viewing parameters.

According to an aspect of the disclosure, the processor is further configured for determining an observation category based on the eye gaze time, where the observation category indicates whether the user is a fast explorer based on the duration of the eye gaze time.

According to an aspect of the disclosure, the eye gaze time is divided into a plurality of time instances, and the determining of the observation category includes determining the observation category by estimating the possible viewing time based on the plurality of the time instances.

According to an aspect of the disclosure, the determining of the possible viewing time further includes determining the size of the AR content associated with the next appearing object as zero in response to a determination that each of viewing time corresponding to each of the plurality of time instances is greater than a predetermined maximum threshold time or less than a predetermined minimum threshold time.

According to another aspect of the disclosure, provided is a non-transitory computer readable storage medium having a computer readable program stored therein, the computer readable program, when executed on an AR device, configured to execute instructions to cause the AR device to monitor viewing activity of a user towards one or more of objects; determine, based on the viewing activity of the user, a possible viewing time of AR content associated with a next appearing object among the one or more of objects; determine a size of the AR content associated with the next appearing object based on the viewing activity of the user; and display the AR content of the next appearing object based on the size of the AR content.

Additional aspects will be set forth in part in the description which follows and, in part, will be apparent from the description, or may be learned by practice of the present embodiments.

BRIEF DESCRIPTION OF THE ACCOMPANYING DRAWINGS

The above and other aspects, features, and advantages of certain embodiments of the present disclosure will be more apparent from the following description taken in conjunction with the accompanying drawings, in which:

FIGS. 1A and 1B are views illustrating static AR content which is provided for display to a user in spite of different viewing patterns observed for the user, according to related art.

FIGS. 2A, 2B, 3A, and 3B are block diagrams illustrating an external appearance of wearable glasses according to embodiments.

FIG. 7C is a view illustrating an estimation of a gaze-time for next appearing AR content using gaze-time observations with respect to augmented objects according to an embodiment.

FIG. 7E is a view illustrating an estimation of a gaze-time for next appearing AR content using gaze-time observations with respect to real objects according to an embodiment.

FIG. 7G is a view illustrating an estimation of gaze-time for next appearing AR content using gaze-time observations with respect to real objects and augmented objects according to an embodiment.

FIG. 9B is a view illustrating estimation of a gaze-time for next appearing AR content using eye ball movement observation sequence according to an embodiment.

FIG. 9D is a view illustrating an estimation of a gaze-time for next appearing AR content using head-movement observations sequence according to an embodiment.

FIGS. 26A, 26B, 27, 28, 29, and 30 are views illustrating determining AR content to be provided to a respective user based on past observed eye-gaze time of the respective user with respect to real and augmented objects according to an embodiment.

Figure 31A:
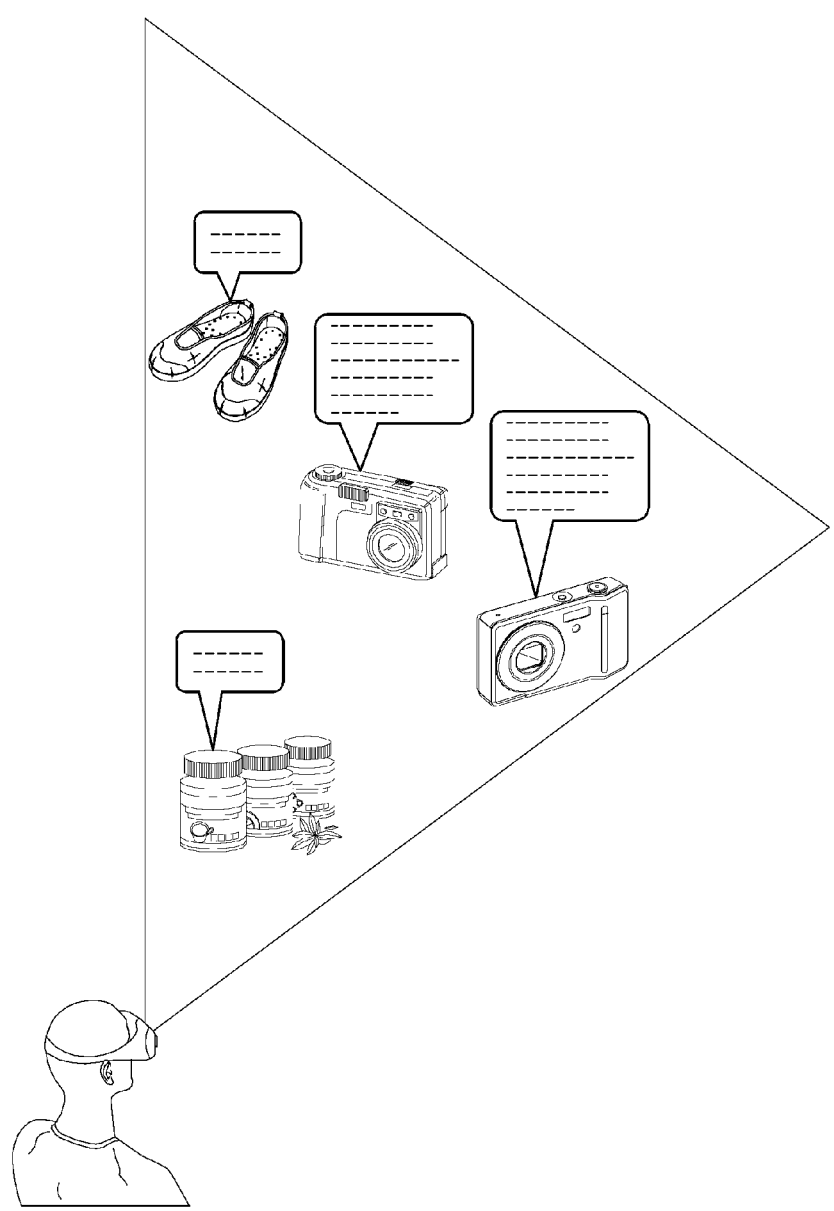
Figure 31B:
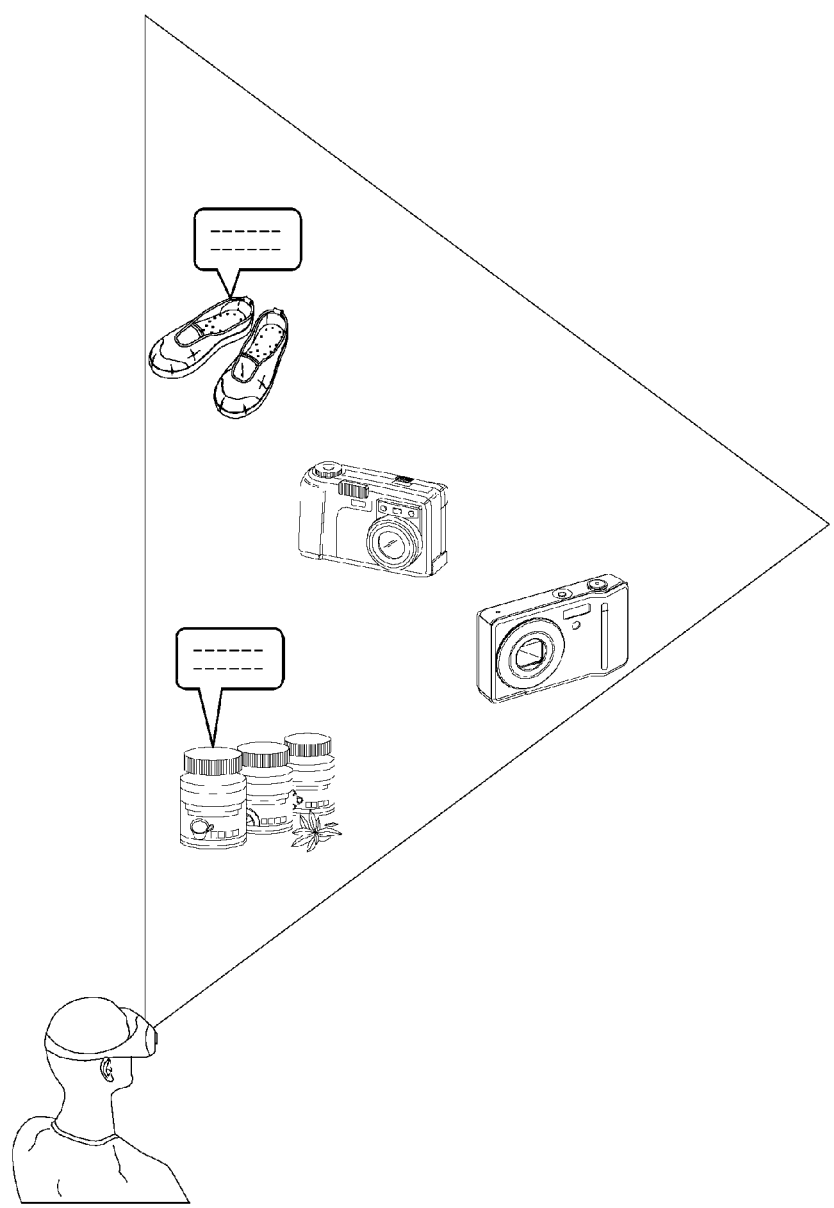

FIGS. 31A and 31B are views illustrating limiting the number of AR contents to be provided to a user for viewing according to an embodiment.

Figure 32A:
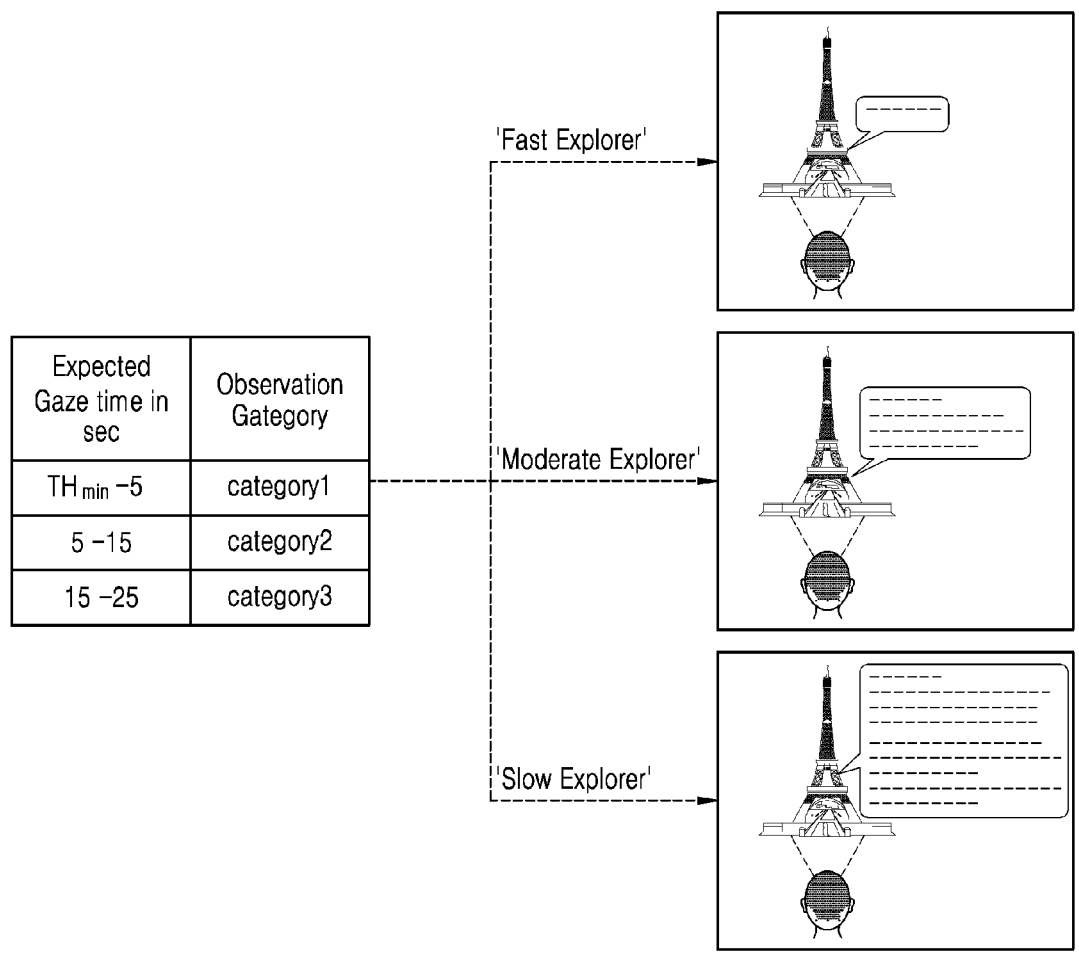

FIG. 32A is a view illustrating determining the expected gaze time of the user based on an observation category determined for the user according to an embodiment.

Figure 32B:
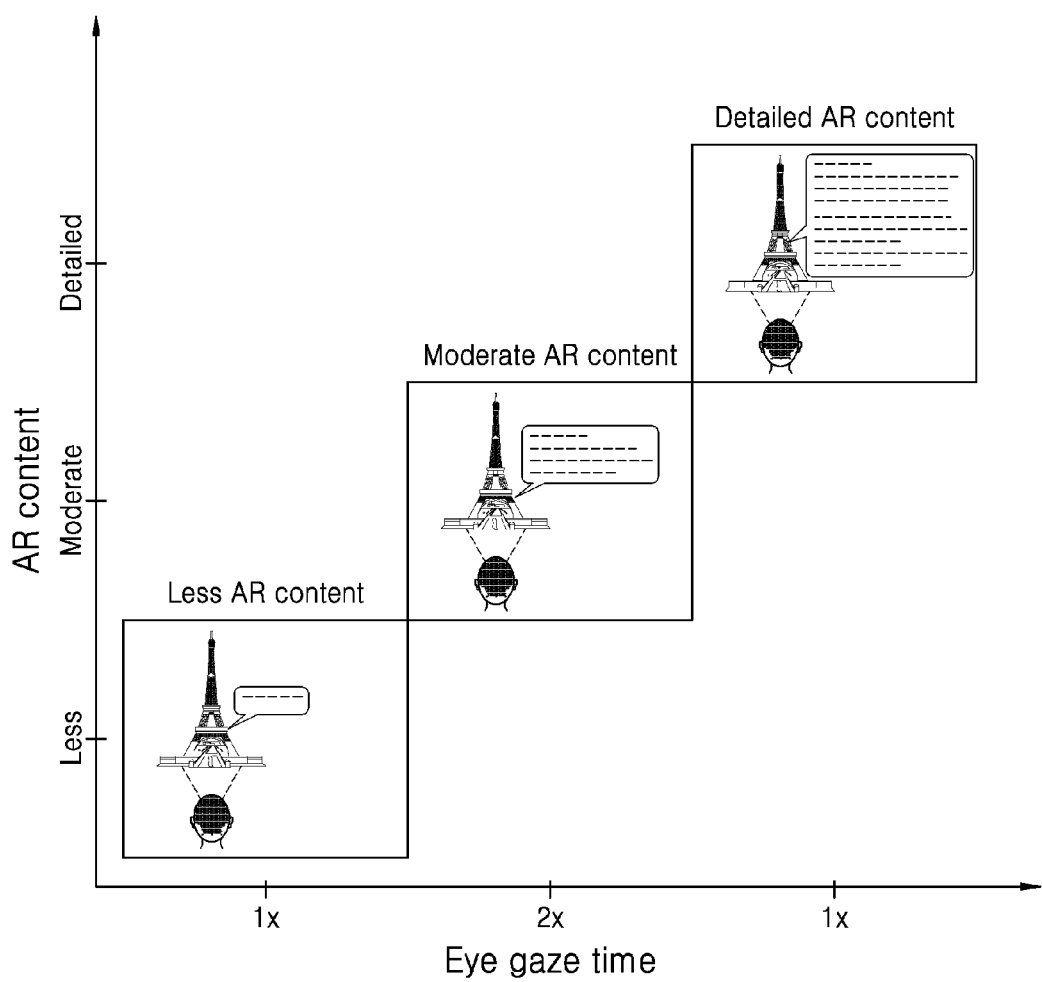

FIG. 32B is a view illustrating providing AR content to a user based on an observation category determined for the user according to an embodiment.

Figure 32C:
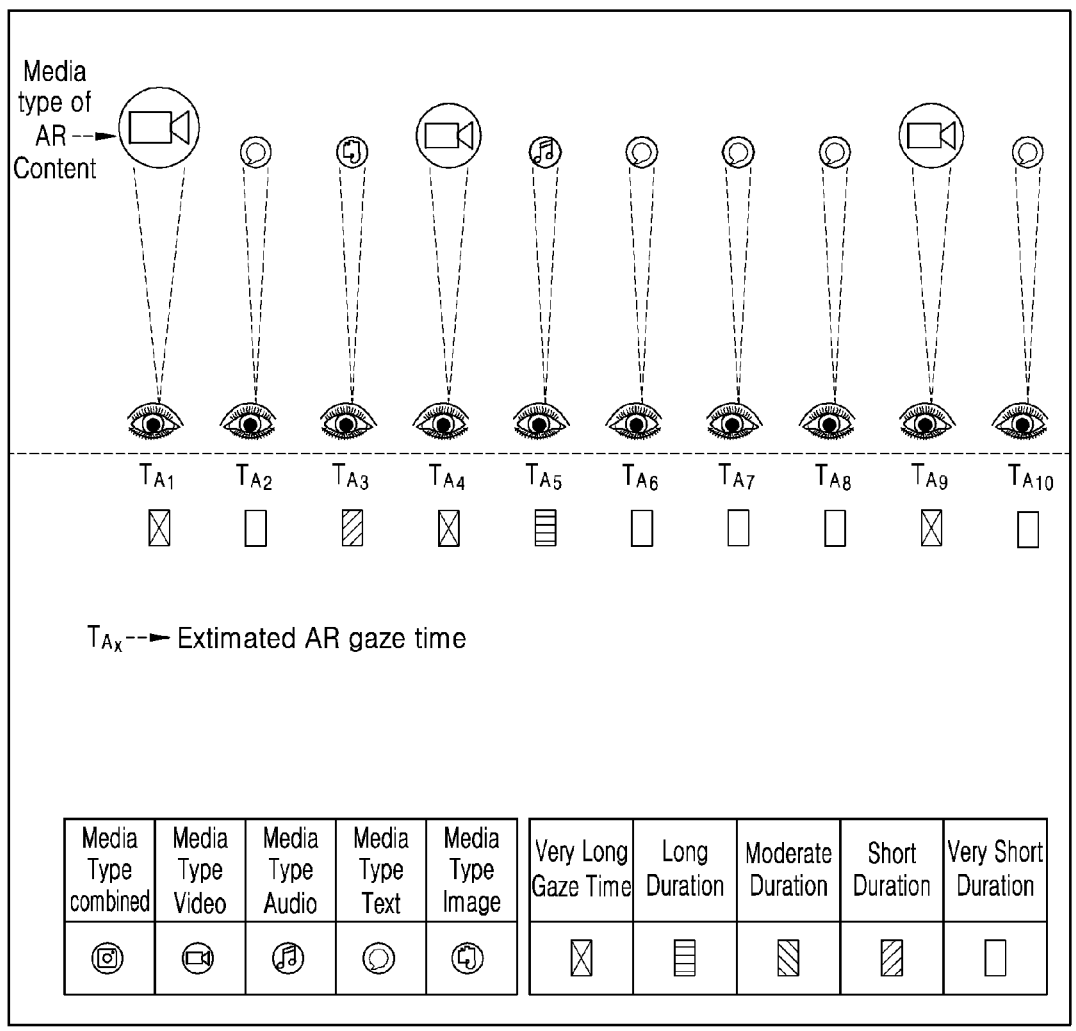

FIG. 32C is a view illustrating determining a suitable media type based on estimated gaze time according to an embodiment.

Figure 33A:
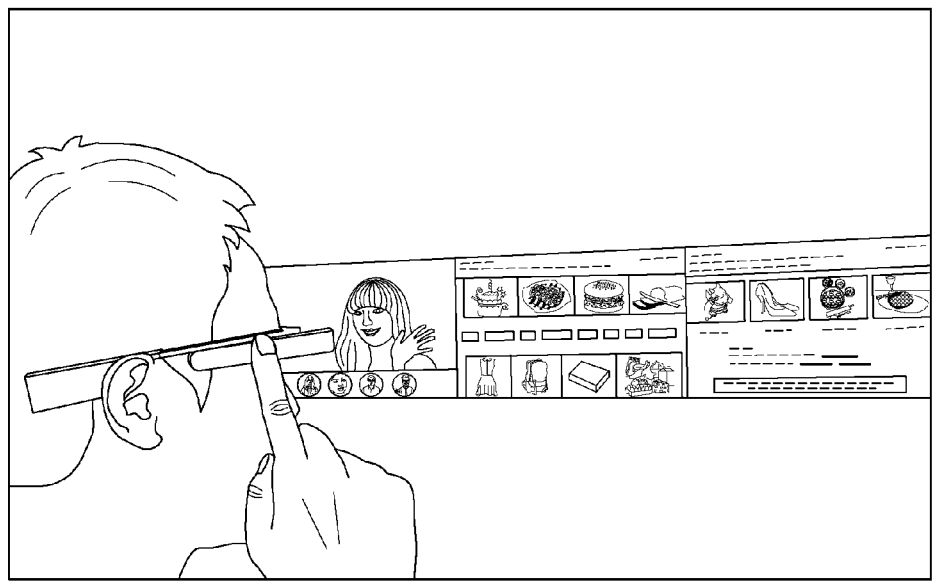
Figure 33B:
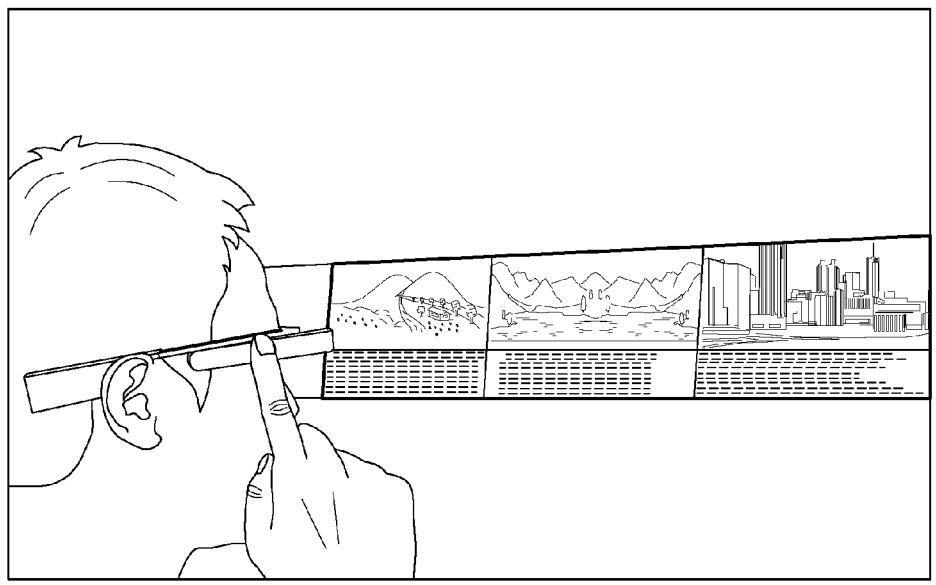

FIGS. 33A and 33B are views illustrating adjusting AR content according to a viewing pattern observed for a user when reading with AR glasses according to an embodiment.

Figure 34:
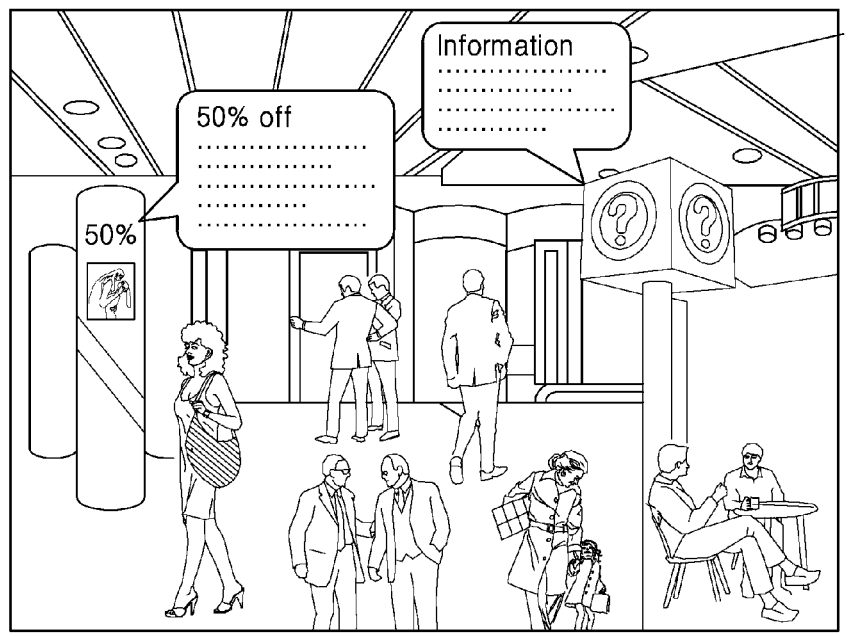

FIG. 34 is a view illustrating adjusting AR content according to a viewing pattern observed for a user according to an embodiment.

Figure 35:

FIG. 35 is a view illustrating providing a brief or detailed AR to a user according to an embodiment.

Figure 36:
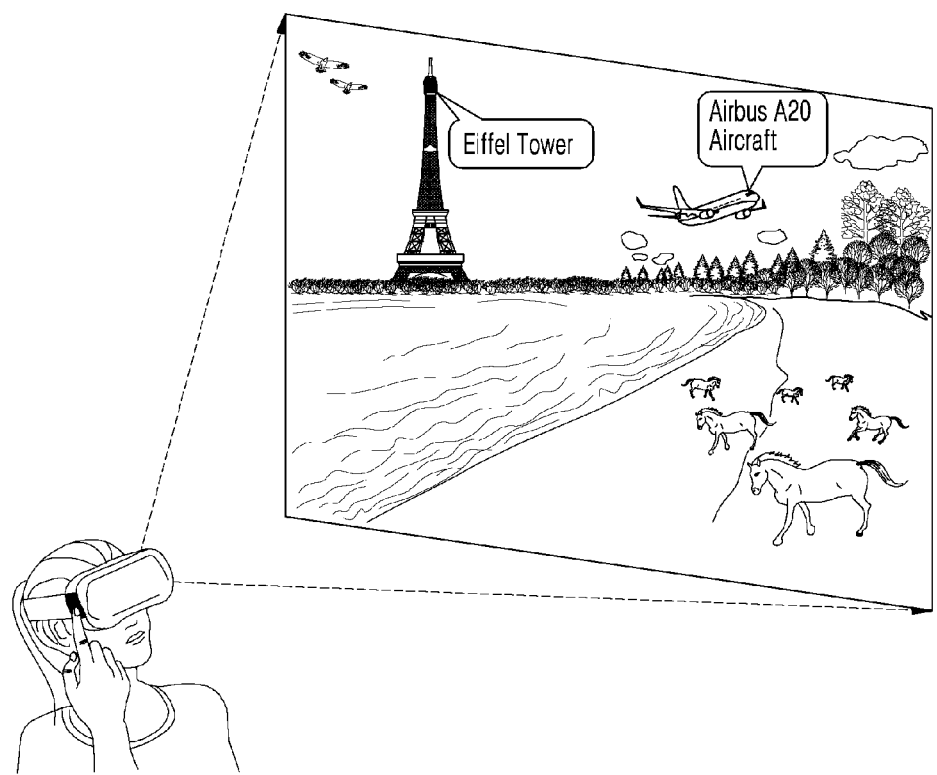

FIG. 36 is a view illustrating presenting real-time adaptive AR content to a viewer in a virtual reality (VR) playback scene according to an embodiment.

DETAILED DESCRIPTION

It may be noted that, to the extent possible, like reference numerals have been used to represent like elements in the drawings. Further, those of ordinary skill in the art will appreciate that elements in the drawings are illustrated for simplicity and may not have been necessarily drawn to scale. For example, the dimensions of some of the elements in the drawings may be exaggerated relative to other elements to help to improve understanding of aspects of the disclosure. Furthermore, the one or more elements may have been represented in the drawings by conventional symbols, and the drawings may show only those specific details that are pertinent to understanding the embodiments of the disclosure so as not to obscure the drawings with details that will be readily apparent to those of ordinary skill in the art having benefit of the description herein.

It should be understood that although embodiments are illustrated below, the inventive concept may be implemented using any number of currently known techniques. The present disclosure should in no way be limited to the embodiments, drawings, and techniques illustrated below, including the example design and embodiments illustrated and described herein, and may be modified within the scope of the appended claims along with their full scope of equivalents.

The term "some" as used herein is defined as "none, or one, or more than one, or all." Accordingly, the terms "none," "one," "more than one," "more than one, but not all" or "all" would all fall under the definition of "some." The term "some embodiments" may refer to no embodiments or to one embodiment or to several embodiments or to all embodiments. Accordingly, the term "some embodiments" are defined as meaning "no embodiment, or one embodiment, or more than one embodiment, or all embodiments."

The terminology and structure employed herein are for describing, teaching, and explaining some embodiments and their specific features and elements and do not limit, restrict, or reduce the spirit and scope of the claims or their equivalents.

More specifically, terms used herein such as but not limited to "includes," "comprises," "has," "consists," and grammatical variants thereof do NOT specify an exact limitation or restriction and certainly do NOT exclude the possible addition of one or more features or elements, unless otherwise stated, and furthermore must NOT be taken to exclude the possible removal of one or more of the listed features and elements, unless otherwise stated with the limiting language "MUST comprise" or "NEEDS TO include."

Whether or not a certain feature or element was limited to being used only once, either way, it may still be referred to as "one or more features" or "one or more elements" or "at least one feature" or "at least one element." Furthermore, the use of the terms "one or more" or "at least one" feature or element do NOT preclude there being none of that feature or element, unless otherwise specified by limiting language such as "there NEEDS to be one or more . . . " or "one or more element is REQUIRED."

Unless otherwise defined, all terms, and especially any technical and/or scientific terms, used herein may be taken to have the same meaning as commonly understood by one having an ordinary skill in the art.

Reference is made herein to some "embodiments." It should be understood that an embodiment is an example of a possible implementation of any features and/or elements presented in the attached claims. Some embodiments have been described for the purpose of illuminating one or more of the potential ways in which the specific features and/or elements of the attached claims fulfill the requirements of uniqueness, utility, and non-obviousness.

Use of phrases and/or terms such as but not limited to "a first embodiment," "a further embodiment," "an alternate embodiment," "one embodiment," "an embodiment," "multiple embodiments," "some embodiments," "other embodiments," "further embodiment", "furthermore embodiment", "additional embodiment" or variants thereof do NOT necessarily refer to the same embodiments. Unless otherwise specified, one or more particular features and/or elements described in connection with one or more embodiments may be found in one embodiment, or may be found in more than one embodiment, or may be found in all embodiments, or may be found in no embodiments. Although one or more features and/or elements may be described herein in the context of only a single embodiment, or alternatively in the context of more than one embodiment, or further alternatively in the context of all embodiments, the features and/or elements may instead be provided separately or in any appropriate combination or not at all. Conversely, any features and/or elements described in the context of separate embodiments may alternatively be realized as existing together in the context of a single embodiment.

Any particular and all details set forth herein are used in the context of some embodiments and therefore should NOT be necessarily taken as limiting factors to the attached claims. The attached claims and their legal equivalents can be realized in the context of embodiments other than the ones used as illustrative examples in the description below.

Typically, wearable glasses include sensors along with one or more cameras in communication with a processor. The sensors and the cameras may be located at the outside portion of the wearable glasses. The cameras may be mounted near the eyes of a user. When the user wears the wearable glasses, the cameras may capture an image similar to an image received through the eyes of the user. Further, the sensors capture user's viewing interactions, for example, the eye-ball movement of the user, with respect to objects being viewed in the real world. The information captured by the cameras and sensors is transmitted to the processor to be processed and interpreted. The processor accordingly determines the objects of the surrounding real world that are being viewed by the user of the wearable device and outputs appropriate AR content for the objects being viewed. Some of the sensors and cameras may further include depth sensors to measure the depth value of the objects being captured by the cameras. Microsoft HoloLens is one such device which includes two depth sensing cameras that work in tandem to perform depth sensing tasks. One of the functions of the various sensors fitted on the outside portion of the wearable glasses is to track the eye-gaze of the user while the user is viewing objects in the real world. The wearable glasses may include an eyeball-tracking camera or an eye-tracker device to detect a gaze of the user by tracking the pupil of the user. The eye-tracking data can include various kinds of information about the user's eye-movement as he/she observes the viewable objects in the surrounding environment. The information may be used to measure either the point of gaze, i.e., a point where the user is looking, or the motion of the eye relative to the user's head. Many AR applications benefit from eye-tracking for visualization and interaction purposes between users and objects being viewed by the users. The AR applications may analyze the eye-tracking data and understand a state of the user viewing a particular object and then provide output AR content based on the state.

Presently, AR content that is provided for display on an AR device to an end-user is pre-set for a corresponding object and once the corresponding object is detected by the AR device, the pre-set content is fetched and displayed to the end-user. Thus, the AR content as fetched is static in nature without any consideration of the user's interest in that AR content.

Some recent AR related technologies use methods for adaptively changing AR content so as to enhance the AR viewing experience for the end-user. In one such case, AR content to be displayed may be adaptively selected based on a speed associated with an AR device. For example, AR content as displayed to the end-user when the AR device is detected to be stationary is different from AR content displayed when the AR device is detected to be in a walking state or a driving state. This ensures that the end-user wearing, for example, AR glasses, is less distracted when his/her concentration level is required to be high for real world activities, for example, in a driving state, so that less AR content is displayed by the AR glasses. In other cases, the position of AR content displayed on a display of an AR device may be dynamically changed so as to have minimum viewing obstructions or overlapping with the real objects in the real world being viewed by the end-user. In this context, eye-tracking data captured by eye-tracking cameras may be used to understand the user's viewpoint with respect to the real objects being viewed in the real world, and accordingly, AR content is positioned relative to the corresponding real objects so as to have minimum overlapping with these objects. In yet other cases, the eye-tracking data is also used to limit the number of AR contents to be displayed by removing the AR content which may be available in the field of view but not within the direction of the eye-gaze of the end-user. This enhances the user's focus on only AR content in the line of sight of the user. In yet some other cases, the eye-tracking data is used to determine the focus of the user's sight towards a particular AR content which may be used to zoom in on the AR content for better viewing experience of the user.

Figure 1A:
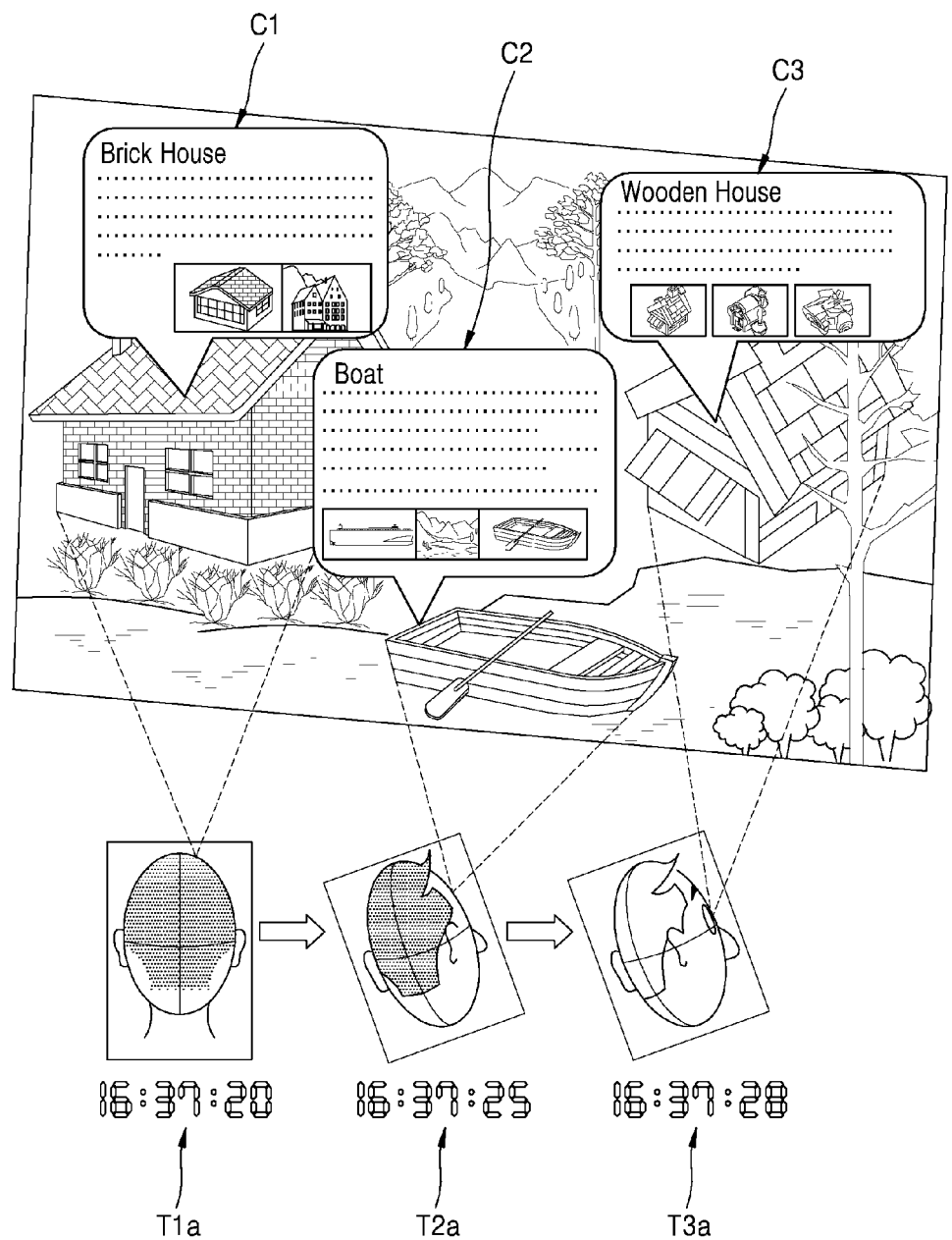
Figure 1B:
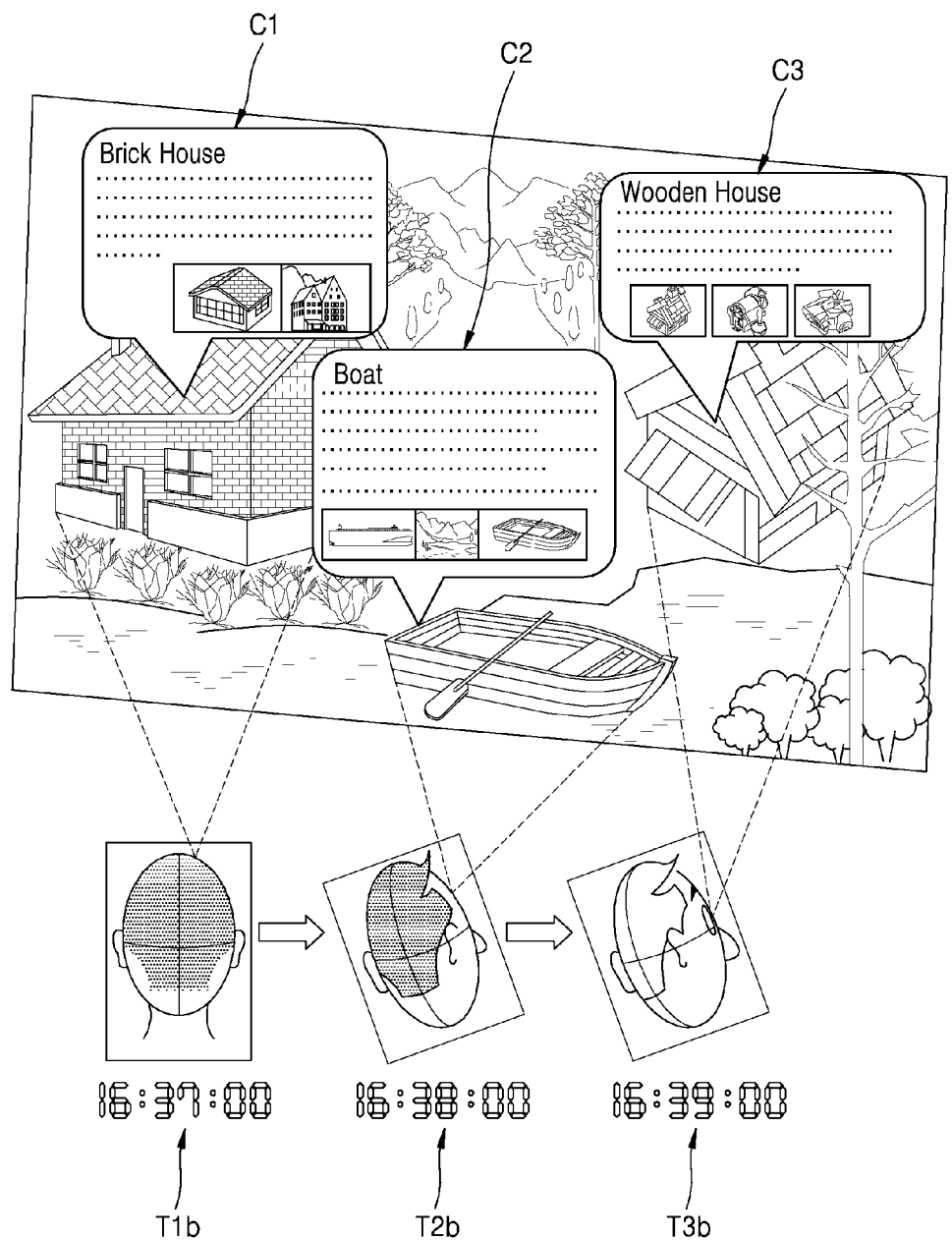

In each of the above cases, there is no improvement in terms of a change of the static AR content since the same AR content is provided to the user at a particularly detected state. Thus, the present technologies fail to focus user's attention on real objects or respective AR contents while selecting the AR content to be provided to the end-user. To illustrate the drawback of the existing technologies, FIGS. 1A and 1B are views illustrating the same AR content being displayed to an end-user in spite of different viewing patterns of the user according to related art. As apparent from FIGS. 1A and 1B, when a user is found viewing a certain real object depicted as a brick house, AR content C1 is displayed to the user. Similarly, when the user is found viewing another real object depicted as a boat, AR content C2 is displayed to the user and when the user is found viewing yet another real object, which could be a wooden house, AR content C3 is displayed to the user. As apparent from FIG. 1A, the viewing times for contents C1, C2, and C3 are found at time intervals at time T1$a$, in-between time T1$a$ and time T2$a$, and in-between time T2$a$ and time T3$a$, respectively. Further, as seen in FIG. 1B, the viewing times for contents C1, C2, and C3 are found in time intervals at time T1$b$, in-between time T1$b$ and time T2$b$, and in-between time T2$b$ and time T3$b$, respectively. Thus, it can be inferred from the different time intervals in FIG. 1A that the user was moving his head quickly when viewing the real objects in FIG. 1A, whereas as observed from the time intervals in FIG. 1B, the user was slowly exploring the real objects. However, in both situations, the same static contents C1, C2, and C3 were displayed irrespective of the viewing patterns observed for the user. In reality, the user's real-time viewing and exploration pattern is changeable as every human has a different perceptive of exploring the real world in different situations. For example, when viewing the real objects in a surrounding real world, the user can either be a slow explorer or a fast explorer based on different situations. Thus, the present technologies may be required to display AR content which keeps attracting the user's attention and this is only possible if the corresponding AR device understands the user's viewing behaviour/pattern. Thus, the presently existing technologies lack at least features of understanding the user's real-time interest and observed viewing patterns and accordingly fail to provide adaptive AR content according to the user's interest.

Thus, none of the current AR related technologies takes into consideration the user' real-time viewing and explorations patterns which are changeable c in different situations (referring to FIGS. 1A and 1B). In particular, at least one of the disadvantages of the existing technologies is that the same AR information is displayed for a particular object, which may no longer be useful to the user in the next instance. Displaying static AR content without accounting for the user's changing interests in real-time may result in user's loss of interest and less effective user experience, and may even be frustrating for the user. Another factor which has not been taken into consideration by the existing technologies is the user's available time for viewing AR information of the real world objects. Thus, regardless of the available time, the same AR content is displayed by the AR device every time.

In accordance with various embodiments of the present disclosure, augmented reality (AR) content is rendered on an AR device while a user is viewing real objects in a real-world environment. According to an embodiment, the AR device may include wearable glasses or a similar near-eye display device that may be worn by a user to provide an image in front of the eyes of the user. However, the present disclosure is not limited to wearable glasses and is also applicable to a head-mounted display (HMD) apparatus. Further, the present disclosure may also be used to provide AR content using AR related mobile applications on electronic devices equipped with a view-capturing module, such as smartphones, mobile devices, tablets, etc.

Figure 2A:
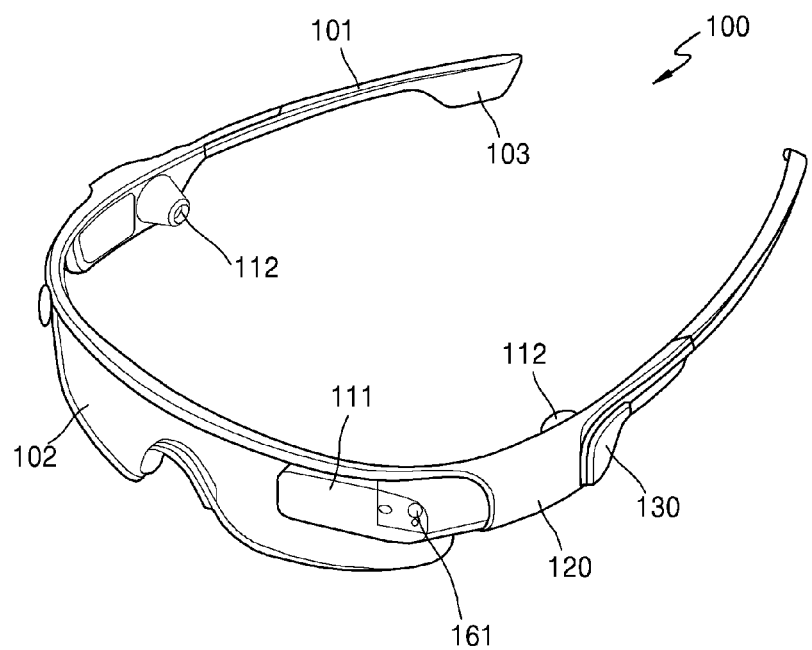
Figure 2B:
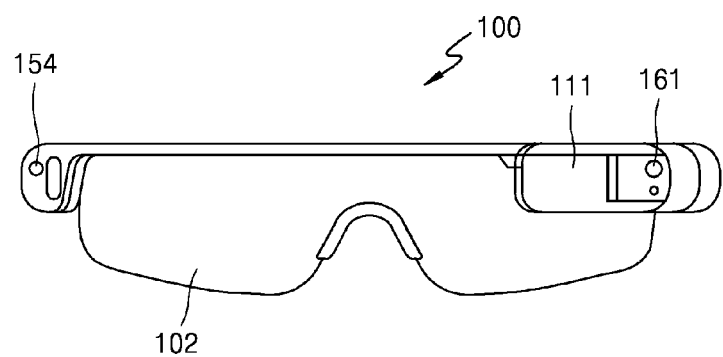

FIGS. 2A, 2B, 3A, and 3B are block diagrams illustrating an external appearance of wearable glasses 100 according to embodiments. According to embodiments of FIGS. 2A, 2B, 3A, and 3B, the wearable glasses 100 may display content in the form of augmented reality (AR), mixed reality (MR), or virtual reality (VR). Referring to FIGS. 2A and 2B, the wearable glasses 100 may include a frame 101, a lens 102, a power source 103, a display 111, a sound outputter 112 such as a speaker, a controller 120, a user input interface 130 such as buttons, an image sensor 161, and a depth sensor 154. However, the elements illustrated in FIGS. 2A and 2B are not all necessary elements of the wearable glasses 100. The wearable glasses 100 may include more or fewer elements than those illustrated in FIGS. 2A and 2B. Some of the elements included in the wearable glasses 100 may be mounted inside the wearable glasses 100, and some other elements may be mounted on an outer portion of the wearable glasses 100. In an embodiment, the power source 103 and the controller 120 may be mounted inside the wearable glasses 100. The display 111, the sound outputter 112, the user input interface 130, the image sensor 161, and the depth sensor 154 may be mounted on the outer portion of the wearable glasses 100. The elements mounted inside the wearable glasses 100 and the elements mounted on the outer portion of the wearable glasses 100 are not limited to the above-described elements.

The frame 101 may include a material such as a plastic and/or metal. The frame 101 may include wirings that connect the elements included in the wearable glasses 100 to one another. According to an embodiment, the frame 101 may include a connection member (not shown) having a partially foldable structure. Also, according to an embodiment, the wearable glasses 100 may further include an elastic band that allows a user to wear the wearable glasses 100 on the head regardless of the size of the head.

According to an embodiment, the lens 102 may be detachably mounted in the frame. The lens 102 may include a transparent material that allows the user to see an area in front of him/her. In an embodiment, the lens 102 may include a plastic such as a polycarbonate or a glass material, but is not limited thereto. According to an embodiment, the lens 102 may include at least one of anti-light reflection and anti-dazzling coating, anti-fog coating, and anti-ultraviolet (UV) coating.

The power source 103 may supply power to each element of the wearable glasses 100 so that the wearable glasses 100 may operate. The power source 103 may include a rechargeable battery (not shown) and a cable (not shown) or a cable port (not shown) through which power may be received from the outside. The power source 103 may be disposed at various positions on the frame 101 of the wearable glasses 100. In an embodiment, the power source 103 may be disposed at an end of the frame 101 of the wearable glasses 100.

The display 111 may include a semi-transparent optical waveguide (e.g., a prism). The semi-transparent optical waveguide may reflect light output from a projector to focus an image on the retina of the eyes of the user. According to an embodiment, the display 111 may display AR content as rendered by applying methods described in embodiments. The AR content as rendered may include at least contextual information associated with corresponding real-world objects, also referred to as 'real objects', present in the surrounding of the user. The AR content may be fetched from an AR server (not shown herein). In some cases, however, the AR content may also be provided via an intermediate AR/non-AR device which may fetch the AR content on behalf of the AR device. The AR/non-AR device may also store possible AR content to be rendered on the wearable glasses 100. In still some cases, the AR content may be generated inside the wearable glasses 100. The AR content may be in the form of multi-media, images, text, or any one or more combination forms. In some further embodiments, the AR content may also include another form of contextual information pertaining to the user, for example, location-based notifications or any other user-profile based notifications.

Also, the display 111 may be used instead of the lens 102 or a portion of the lens 102 according to embodiments. That is, the display 111 may be used in place of the lens 102 or a portion of the lens 102. In regard to wearable glasses 100, the lens 102, and a display area may be the same. In this case, the AR content may be received while the user is looking at an actual real object through the lens 102, and the received AR content may be displayed on the lens 102. The AR content for a real object may be displayed along the real object on the display area or at least partially overlaid upon the real object on the display area. However, the AR content may also be displayed outside an angle of view of the user from among the entire area of the lens 102, and in this situation, the user has to move the eye pupils to see the information contained in the AR content as rendered on the display area. On the other hand, if the AR content is displayed on an area corresponding to an angle of view of the user from among the entire area of the lens 102, the user does not have to turn his/her head or move his/her eye pupils to view the information contained in the AR content. The angle of view may be determined experimentally for each user. Alternatively, the angle of view may be set by a manufacturer of the wearable glasses 100 or may be set by the user using settings of the wearable glasses 100.

The sound outputter 112 may include earphones that are worn on the ears of the user, earbuds that are worn inside the ears, or the like. The sound outputter 112 may operate according to a wired or wireless connection. In this case, the sound outputter 112 may be mounted in the wearable glasses 100. In an embodiment, the sound outputter 112 may include a bone conduction speaker. In some embodiments, the sound outputter 112 may partially extend into the ears of the user. Also, the sound outputter 112 may be detachably mounted to the wearable glasses 100. In this case, the user of the wearable glasses 100 may selectively mount the sound outputter 112 on the ears.

The controller 120 may be connected to the wearable glasses 100 in a wired or wireless manner so as to control each element of the wearable glasses 100. For example, the controller 120 may receive data from the image sensor 161 or the user input interface 130, analyze the received data, and output AR content through at least one of the display 111 and the sound outputter 112.

The user input interface 130 may receive a user input. A user input may include, for example, a command or a request from the user to start or end an operation of the wearable glasses 100. The operation may be predetermined. According to an embodiment, the user input interface 130 may include a touch panel to receive a touch input. Throughout the specification, a "touch input" refers to a gesture performed by the user on the touch panel to control the wearable glasses 100. For example, a touch input described in various embodiments may be a tap, a touch and hold, a double tap, a drag, panning, a flick, and a drag and drop. According to an embodiment, the user input interface 130 may include a bending sensor for receiving a bending input. According to an embodiment, the user input interface 130 may receive multiple inputs. Throughout various embodiments, the term "multiple inputs" refers to a combination of at least two input methods. For example, the wearable glasses 100 may receive a touch input and a motion input from the user or may receive a touch input and a sound input from the user. Also, the wearable glasses 100 may receive a touch input and an eyeball input from the user. An eyeball input refers to a user input for adjusting eye blinking, gaze positions, an eyeball movement speed or the like to control the wearable glasses 100. Also, according to an embodiment, the wearable glasses 100 may further include a microphone (not shown). The microphone may receive a sound input corresponding to a user's voice and/or environmental sound inputs generated around the wearable glasses 100.

The image sensor 161 may include a compact camera such as a camera used in smartphones or webcams. The image sensor 161 may be mounted near the eyes of the user when the user wears the wearable glasses 100 and may capture an image similar to an image received through the eyes of a user. According to an embodiment, the wearable glasses 100 may further include the depth sensor 154. The wearable glasses 100 may recognize a three-dimensional spatial gesture of the user. For example, the depth sensor 154 may measure a depth value or the like of an inputting instrument (e.g., a hand or hands, a finger or fingers, an electronic pen, etc.) According to an embodiment, the depth sensor 154 may obtain a depth value of an inputting instrument by using various methods. For example, the depth sensor 154 may measure a depth value by using at least one of a time of flight (TOF) method, a stereoscopic vision method, and a structured light pattern method.

According to an embodiment, the image sensor 161 and the depth sensor 154 may be different sensors from each other. According to another embodiment, the image sensor 161 and the depth sensor 154 may be integrated into a single sensor. According to an embodiment, the wearable glasses 100 may further include other various sensors besides the image sensor 161 and the depth sensor 154.

In an embodiment, the wearable glasses 100 may include sensors for sensing a motion of the user, for example, an acceleration sensor, a tilt sensor, a gyro sensor, or a 3-axis magnetic sensor. Also, the wearable glasses 100 may include a sensor for sensing whether the user is wearing the wearable glasses 100. In an embodiment, the wearable glasses 100 may include a temperature sensor, a pressure sensor, an acceleration sensor, a proximity sensor, or an iris scan sensor.

The wearable glasses 100 may further include an eyeball-tracking camera (not shown) that faces the face of the user. The eyeball-tracking camera may include an infrared camera. The eyeball-tracking camera may detect a gaze of the user by tracking the pupil of the user as well as the eye ball movement. The wearable glasses 100 may further include a head-movement tracking sensors (not shown) to sense head-movements of the user with respect to the real objects and augmented objects or content being viewed by the user. A head-movement sensor may detect the head movement of the user in a three-dimensional space.

Figure 3A:
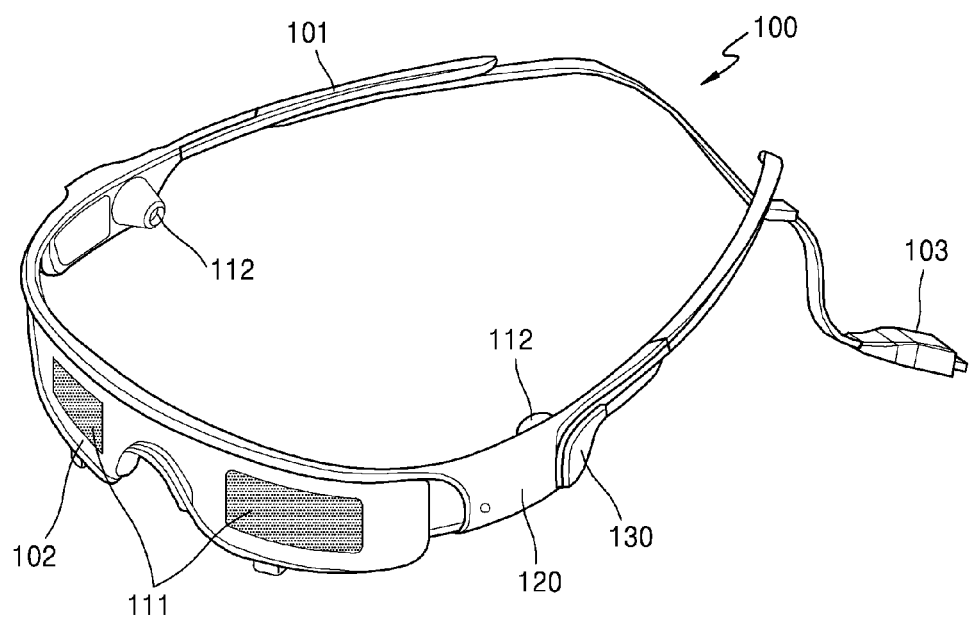
Figure 3B:
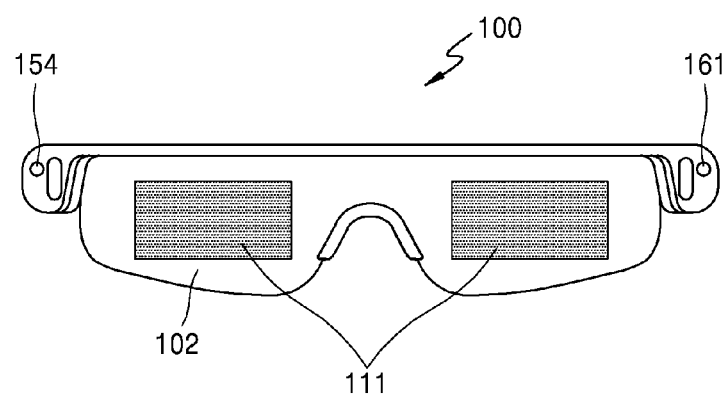

Referring to FIGS. 3A and 3C, the wearable glasses 100 may be configured such that the lens 102 functions as the display 111. In this case, the lens 102 may include a transparent display or a semi-transparent display. When the lens 102 includes a semi-transparent display, the lens 102 may include at least one of an optical waveguide (e.g., a prism), an electroluminescent display, and a liquid crystal display, but is not limited thereto.

The wearable glasses 100 are not limited to the structure described with reference to FIGS. 2A, 2B, 3A, and 3B. In another embodiment, the wearable glasses 100 may be attached to a helmet structure or to a goggles structure. According to an embodiment, the wearable glasses 100 may be a stand-alone device that is operable without the help from other devices. Also, the wearable glasses 100 may be a device linked to a mobile terminal or a cloud server. Hereinafter, an embodiment in which the wearable glasses 100 are linked with other devices will be described with reference to FIG. 4.

Figure 4:
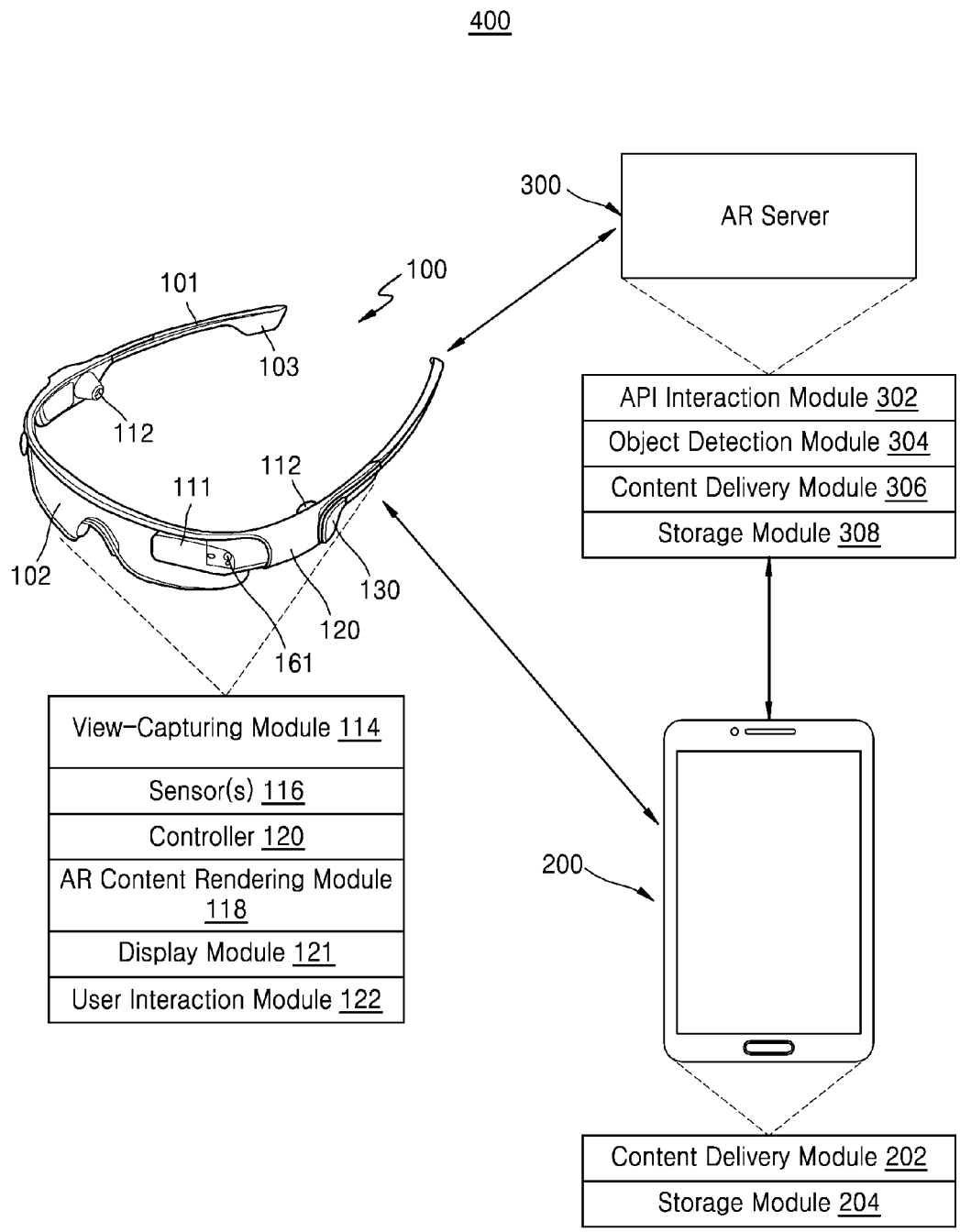
FIG. 4 is a view illustrating an AR system according to an embodiment.

FIG. 4 is a view illustrating an AR content providing system 400 according to an embodiment. The AR content providing system 400 may include an AR device such as the wearable glasses 100, a mobile device 200, and/or an AR server 300. However, not all of the elements illustrated in FIG. 4 are essential elements of the AR content providing system 400. The AR content providing system 400 may be implemented using more elements or fewer elements than the elements illustrated in FIG. 4. For example, the AR content providing system 400 may be implemented using the wearable glasses 100 and the AR server 300 and omitting the mobile device 200.

The wearable glasses 100 may be communicatively connected to the mobile device 200 or the AR server 300. In an embodiment, the wearable glasses 100 may perform short-range communication with the mobile device 200. Examples of short-range communication include, but are not limited to, Wi-Fi, Near Field Communication (NFC), Bluetooth, Bluetooth Low Energy (BLE), Wi-Fi Direct (WFD), and Ultra-wideband (UWB. The wearable glasses 100 may be directly connected to the server 300 via wireless communication or mobile communication. Moreover, in some embodiments, the wearable glasses 100 may use a plurality of communication methods. In an embodiment, the wearable glasses 100 may use both short-range communication and wireless communication or may use a plurality of short-range communication methods.

The AR content providing system 400 may include AR device modules and AR server modules which together perform various functions to determine the AR content for real objects detected in the field of view of the user. To this end, the AR device, i.e., the wearable glasses 100 as used herein, may include a view-capturing module 114, a sensor(s) 116, controller 120, an AR content rendering module 118, the display module 121, and a user interaction module 122. The view-capturing module 114, controller 120, an AR content rendering module 118, and a user interaction module 122 may be implemented as at least one hardware processor.

The AR server 300 may include an application programming interface (API) interaction module 302, an object detection module 304, a content delivery module 306, and a storage module 308. Based at least on the information received from the view-capturing module 114 and the sensor(s) 116, the AR server 300 provides the AR content to be rendered on the AR device 100. The application programming interface (API) interaction module 302, the object detection module 304, and the content delivery module 306 may be implemented as at least one hardware processor.

In some embodiments, some of the functions of the AR server 300 may be performed by the mobile device 200. In an embodiment, the mobile device 200 may include a content delivery module 202, which may be the content provider for the AR content to be rendered on the wearable glasses 100. The content delivery module 202 may be a hardware processor. The mobile device 200 may also include a storage module 204 such as a memory to store a database of AR contents mapped to a corresponding one or more real objects which may be captured in a frame of view by the view-capturing module 114. Alternately, the content delivery module 202 may fetch the AR content from the AR server 300. Further, some of the required information from the wearable glasses 100, for example, the view as captured and sensor data, may be analyzed either at the AR device, i.e., the wearable glasses 100, or at the mobile device 200 that is connected to the wearable glasses 100 via short-range communication or is communicatively connected to the wearable glasses 100. Alternately, the AR server 300 may directly transmit AR content to the wearable glasses 100 or may transmit AR content to the wearable glasses 100 via the mobile device 200 that is connected to the wearable glasses 100 via short-range communication or is communicatively connected to the wearable glasses 100. The mobile device 200 may be implemented in various forms. In an embodiment, the mobile device 200 may be a mobile phone, a smartphone, a laptop computer, a tablet PC, an e-book terminal, a digital broadcasting terminal, a personal digital assistant (PDA), a portable multimedia player (PMP), a navigation device, a MP3 player, or a digital camera, but is not limited thereto.

Further, the AR content may be determined at least in accordance with the descriptions of FIGS. 6A-7G, according to an embodiment.

Referring to FIG. 4, the view-capturing module 114 may include at least the image sensor 161 (see FIG. 2) and the depth sensor 154 (see FIG. 2). The view-capturing module 114 may capture the field of view of the user in a frame and transmit the captured frame to the API Interaction module 302. In accordance with an embodiment of the present disclosure, the captured frame may include a plurality of real-world objects as well as already displayed augmented objects or content.

Further, the sensor(s) 116 may include at least the eye-tracking module and the head tracking module to detect the eye-movement of the user and the head-movement of the user, respectively. The data captured by the sensor(s) 116 is also transmitted to the AR server 300 in accordance with an embodiment.

The controller 120 may control the complete flow from capturing of the field of view including a plurality of objects to displaying the AR content on the display of the wearable glasses 100.

The AR content rendering module 118 may receive the AR content from the content delivery module 306 or the content delivery module 202 and render the AR content to be displayed on the AR device.

The display module 121 may display the rendered AR content for the related real objects present in the field of view of the user.

The user interaction module 122 may allow the user to provide user inputs for interacting with the AR content and the AR device.

The AR server 300 may be a cloud server that controls the wearable glasses 100. Also, the server 300 may be a content provider providing AR content to be rendered on the AR device. The AR server's API interaction module 302 may receive the transmitted data from the wearable device 100. The API interaction module 302 may further provide the captured frame information to an object detection module 304 of the AR server 300. In some embodiments, the AR device may also include the object detection module 304. The object detection module 304 may detect a plurality of objects from a view captured by the view-capturing module 114. The objects being detected may include real objects as well as augmented content which correspond to different part of image elements within the captured frame. The object detection module 304 may apply one or more image processing techniques and may also be trained using deep learning techniques to recognize and detect the objects. Object recognition may be performed on a still image or a series of images as received from the view-capturing module 114.

Based on the detection of the objects by the object detection module 304, the content delivery module 306 may identify relevant AR content which may be contextually related to the real objects viewable through the view-capturing module 114 of the wearable glasses 100. The AR server 300 may also include a storage module 308 to store a database of AR content mapped to corresponding one or more real objects which may be detected by the object detection module 304.

In further embodiments, the AR server 300 may also include a scene detection module (not shown) to recognize a current scene or environment current being viewed by a user via the AR device, i.e., the wearable glasses 100. The scene detection module may be trained using various learning techniques to understand the surrounding view and detect an associated scene or environment of the AR device. In a further embodiment, the AR server 300 may include an Artificial Intelligence (AI) module to determine the current scene of the AR device based on one or more parameters. The one or more parameters employed in understanding the current scene may include at least a category of objects being detected in the surrounding view captured by the camera detection module. The one or more parameters may also include a location of the AR device. The AR device may include a Global Positioning System (GPS) unit (not shown) to provide location coordinates of the AR device.

Hereinafter, AR content providing methods and systems according to various embodiments are described with respect to the AR server 300 directly transmitting to the AR device, i.e., the wearable glasses 100.

Figure 5:
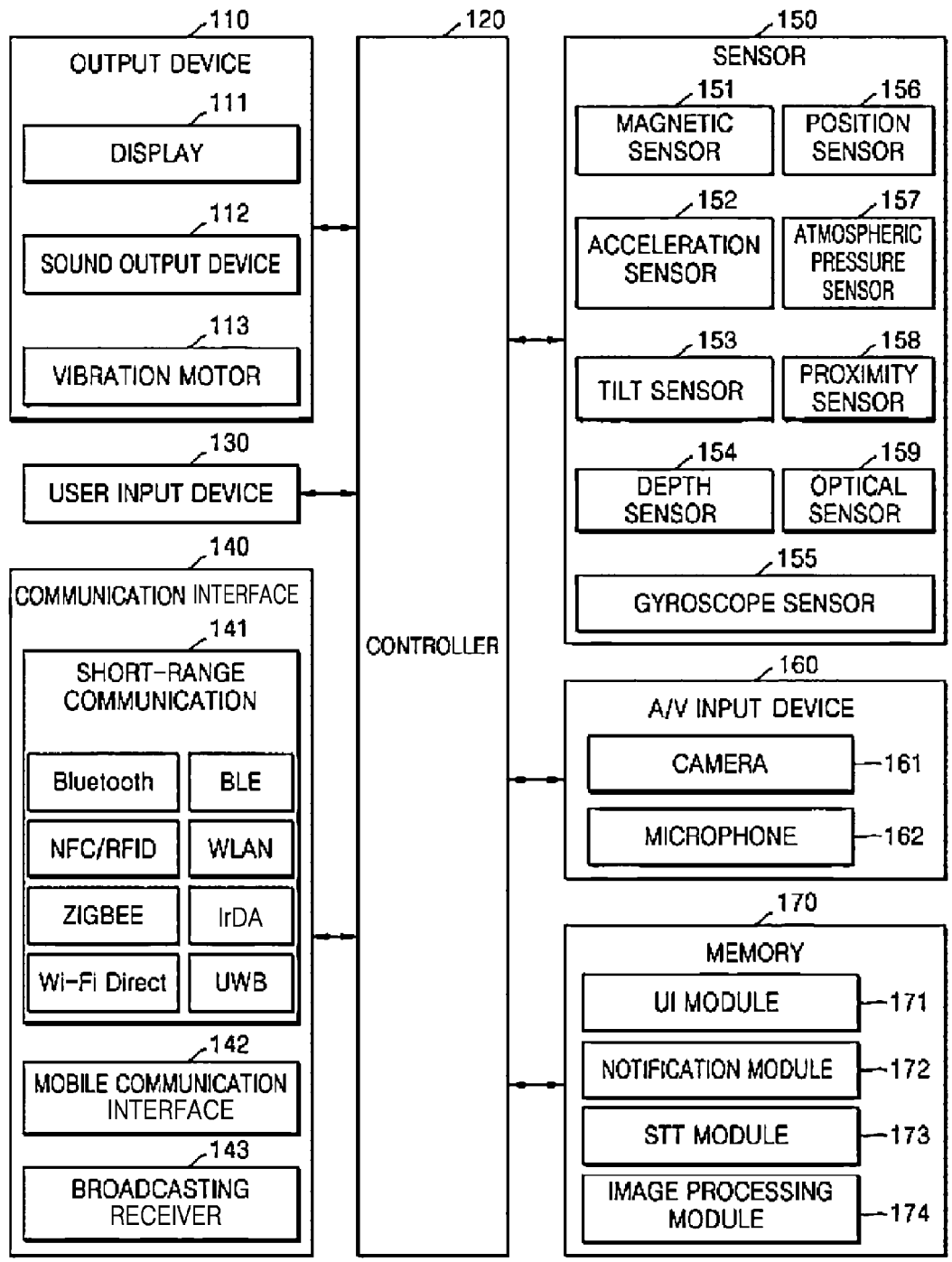
FIG. 5 is a block diagram illustrating a structure of wearable glasses according to an embodiment.

FIG. 5 is a block diagram illustrating a structure including various components of an AR device, for example, the wearable glasses 100, according to an embodiment. In some embodiments, the structure as shown in FIG. 5 may form, for example, the whole or part of the wearable glasses 100 as shown in FIGS. 2A, 2B, 3A, and 3B.

As illustrated in FIG. 5, the wearable glasses 100 according to an embodiment may include a user input device 130, a communication interface 140, a sensor 150, an audio/video (A/V) input device 160, and a memory 170 in addition to the output device 110 and the controller 120. The sensor 150 may also be referred to as a sensor circuit. However, not all of the illustrated elements are necessary. The wearable glasses 100 may be implemented by using more elements or fewer elements than the illustrated elements. Hereinafter, the above-described elements will be described in detail.

The output device 110 may output an audio signal, a video signal, or a vibration signal, and may include the display 111, a sound output device 112, and a vibration motor 113. The display 111 may display AR content on the basis of information processed by the wearable glasses 100. In an embodiment, the display 111 may display AR content corresponding to the real-objects present in the field of view of a user.

In an embodiment, the display 111 may be configured as a touch screen by forming a layer structure with a touchpad, and in an embodiment, the display 111 may also be used as a user input device as well as an output device. The display 111 may include at least one of a liquid crystal display (LCD), a thin-film transistor-liquid crystal display (TFT-LCD), an organic light-emitting diode (OLED), a flexible display, a 3D display, and an electrophoretic display. According to an embodiment, the wearable glasses 100 may include at least two displays 111.

The sound output device 112 may output audio data received from the communication interface 140 or stored in the memory 170. Also, the sound output device 112 may output a sound signal related to a function performed by the wearable glasses 100, such as a call signal reception sound, a message reception sound, or a notification sound. The sound output device 112 may include a speaker or a buzzer.

The vibration motor 113 may output a vibration signal. In an embodiment, the vibration motor 113 may output a vibration signal corresponding to an output of audio data or video data, for example, a call signal reception sound or a message reception sound. Also, the vibration motor 113 may output a vibration signal when a touch screen is touched.

The output device 110 may provide AR content in accordance with various embodiments disclosed in the foregoing description.

The controller 120 may control an overall operation of the wearable glasses 100. In an embodiment, the controller 120 may control the output device 110, the user input device 130, the communication interface 140, the sensor 150, and the A/V input device 160 by executing programs stored in the memory 170 or in a memory implemented in the controller 120.

Further, the controller 120 may control various parameters for controlling the viewing observations of the user, which are required to be taken into consideration for determining AR content to be displayed to the user.

In accordance with an embodiment of the present disclosure, the controller 120 may determine a possible viewing time of AR content associated with a real object present in the field of view of the user. Further, the controller 120 may also determine a media type of the AR content to be displayed. In accordance with a further embodiment of the present disclosure, the controller 120 may also determine a size of the AR content associated with a real object based on the possible viewing time of the AR content thus determined.

The controller 120 may also determine whether the user is wearing the wearable glasses 100 via at least one sensor included in the wearable glasses 100, and when it is determined that the user is wearing the wearable glasses 100, the controller 120 may obtain eye-gaze, eye-movement, and head-movement information of the user.

The controller 120 may also obtain movement information of the user by analyzing a movement of the user based on at least one of acceleration information, tilt information, and position information measured by the wearable glasses 100.

The controller 120 may determine a time to provide the AR content corresponding to a real-object based on movement information of the user.

The controller 120 may monitor, using at least one sensor of the wearable glasses 100, for example, the eye-tracking sensors and the head-movement sensors, the viewing activity of at least one user with respect to a plurality of objects present in the field of view of the user. The viewing activity of the user may be determined based on at least one of the eye-gaze events, eye-blinking, eye ball movement, and head movement of the user with respect to the plurality of objects present in the field of view of the user.

The controller 120 may further determine an aggregated value corresponding to at least one of the eye-gaze events, eye-blinking, eye ball movement, and head movement as monitored for the user. Further, the controller 120 may determine if the aggregated value is greater than a minimum threshold prior to the determination of at least one of a possible viewing time of the AR content, the AR content from a set of AR content and the size of the AR content.

The controller 120 may cause the determined AR content to be rendered during viewing of a future object on the wearable glasses 100.

The controller 120 may filter out the viewing activity of the user which has an associated viewing time less than a minimum threshold view time and greater than a maximum threshold view time.

The controller 120 may update the minimum threshold view time and the maximum threshold view time based on at least one of an observation category, historical viewing activity data, real-time viewing activity data, and user-specific profile data.

The controller 120 may detect via one or more sensor(s) of the AR device at least one of a change in one or more of the plurality of objects, a new group of plurality of objects, a change in surrounding view of the AR device, change in Global Positioning System (GPS) location corresponding to the AR device, change in Indoor Positioning System (IPS) location corresponding to the AR device, change in context of view, where the change in the context of view is determined based on at least one or more of user-specific profile data, historical viewing activity data and real-time viewing activity data, change in motion corresponding to the AR device, change in orientation of the AR device and expiry of a pre-determined time period. Based on any of the detected changes, the controller 120 may reset the monitoring of the viewing activity of the user.

The controller 120 may determine a number of AR contents for simultaneous providing during viewing of a plurality of future objects.

The controller 120 may further monitor at least one of user-profile data, calendar schedule data associated with the user of the AR device, clock-time data associated with the user of the AR device, and another profile data corresponding to another user associated with the user of the AR device.

The controller 120 may further determine an observation category of the user. Based on the observation category, a possible viewing time of an AR content associated with a future object may be determined. Further, based on the possible viewing time thus determined, the AR content from a set of AR contents and a size of the AR content may also be determined.

The controller 120 may detect an environment or a current scene being viewed on the AR device based at least on an external image obtained using a camera 161.

The controller 120 may determine whether the user is wearing the wearable glasses 100 based on a signal output from at least one sensor included in the sensor 150, and when it is determined that the user is wearing the wearable glasses 100, the controller 120 may control the sensor 150 to sense a movement of the user.

The user input device 130 is used by the user to input data used to control the wearable glasses 100. The user input device 130 is described above with reference to FIG. 2, and thus repeated description will be omitted.

The communication interface 140 may include at least one component enabling the wearable glasses 100 to communicate with an external device or a server. In an embodiment, the communication interface 140 may include a short-range communication interface 141, a mobile communication interface 142, and a broadcast receiving circuit (broadcasting receiver) 143.

The short-range wireless communication interface 141 may include a Bluetooth communication interface, a BLE communication interface, an NFC/RFID interface, a wireless local area network (WLAN) communication interface, a Zigbee communication interface, an infrared data association (IrDA) communication interface, a Wi-Fi Direct (WFD) communication interface, an UWB communication interface, and an Ant+ communication interface, but components included in the short-range communication interface 141 are not limited thereto.

The mobile communication interface 142 may transmit and receive a wireless signal to and from at least one of a base station, an external terminal, and a server, on a mobile communication network. In this situation, a wireless signal may include data having various formats according to transmission and reception of a voice call signal, a video telephone call signal, or a text/multimedia message. The broadcasting receiver 143 receives a broadcast signal and/or broadcast related information from an external source, through a broadcast channel. The broadcast channel may include a satellite channel or a terrestrial broadcasting channel. In some embodiments, the wearable glasses 100 may not include the broadcasting receiver 143. The communication interface 140 may receive the AR content.

The communication interface 140 may request movement information of the user and receive the movement information from an external device connected to the wearable glasses 100. The communication interface 140 may request movement information of the user while transmitting acceleration information, tilt information, position information or the like measured using the wearable glasses 100 to the external device.

The communication interface 140 may request an analysis of a captured external image while transmitting the captured external image to the mobile terminal 200 or the server 300. The communication interface 140 may receive at least one of variation information of an external image, color information of an external image, and object information about objects included in an external image, from the mobile device 200 or the server 300.

The sensor 150 may sense a state of the wearable glasses 100, a state of surroundings of the wearable glasses 100, a state of the user wearing the wearable glasses 100, and a movement of the user and may transmit sensed information to the controller 120. For example, the sensor 150 may sense a movement of the user and output a signal related to the movement of the user to the controller 120. The signal may be an electrical signal. The sensor 150 may include, but is not limited to, at least one of a magnetic sensor 151, an acceleration sensor 152, a tilt sensor 153, a depth sensor 154, a gyroscope sensor 155, a position sensor 156 such as a global positioning system (GPS), an atmospheric pressure sensor 157, a proximity sensor 158, and an optical sensor 159. The sensor 150 may also include a temperature sensor, an illuminance sensor, a pressure sensor, or an iris scan sensor.

The A/V input device 160 may receive an audio signal or a video signal and may include a camera (image sensor) 161 and a microphone 162. The camera (image sensor 161) may obtain an image frame of a still image or a video in a video telephone mode or a photographing mode. An image captured via the camera (image sensor) 161 may be processed by the controller 120 or a separate image processor (not shown).

An image frame processed by the camera (image sensor) 161 may be stored in the memory 170 or transmitted to an external device through the communication interface 140. According to an embodiment of the wearable glasses 100, the wearable glasses 100 may include at least two cameras (the image sensors) 161. The microphone 162 may receive an external sound signal and process the external sound signal into electric voice data. In an embodiment, the microphone 162 may receive a sound signal from an external device or a narrator. The microphone 162 may use any one of various noise removing algorithms to remove noise generated while receiving the external sound signal.

The memory 170 may store a program for processes and control of the controller 120 and may store input/output data such as a list of non-output contents, a list of previously output contents, captured images, biometric information, schedule information of a user, or life pattern information of a user. The memory 170 may include at least storage medium from among a flash memory, a hard disk, a multimedia card micro type memory, a card type memory (for example, a secure digital (SD) card or an extreme digital (XD) card), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. Also, the wearable glasses 100 may operate a web storage server or a cloud server that performs a storage function of the memory 170 on the Internet. Programs stored in the memory 170 may be classified into a plurality of modules based on functions, for example, into a UI module 171, a notification module 172, an STT module 173, and an image processing module 174.

The UI module 171 may provide a specialized UI or GUI linked with the wearable glasses 100 according to applications. The notification module 172 may generate a signal for notifying the occurrence of an event in the wearable glasses 100. The notification module 172 may output a notification signal in the form of a video signal via the display 111, in the form of an audio signal via the sound outputter 112, or in the form of a vibration signal via the vibration motor 113.

The STT module 173 may convert voice included in the multimedia content into text, thereby generating a transcript corresponding to the multimedia content.

The image processing module 174 may obtain object information about objects included in a captured image, edge information, atmosphere information, and color information by analyzing the captured image.

The methods described above may be implemented as program commands that may be executed using various computer components and may be recorded on a computer-readable recording medium. The computer-readable recording medium may include a program command, a data file, a data structure, etc., alone or in combination. The program commands recorded in the computer-readable recording medium may be specially designed or well known to one of ordinary skill in the computer software field. Examples of the computer-readable recording medium include magnetic storage media (e.g., hard disks, floppy disks, magnetic media such as magnetic tapes, etc.), optical recording media (e.g., CD-ROMs or DVDs), magneto-optical media (e.g., floptical disks), and hardware devices specifically configured to store and execute program commands (e.g., ROM, RAM, flash memories, etc.). Examples of the program command include mechanical codes prepared by a compiler and high-level languages executable by a computer by using an interpreter.

Figure 6A:
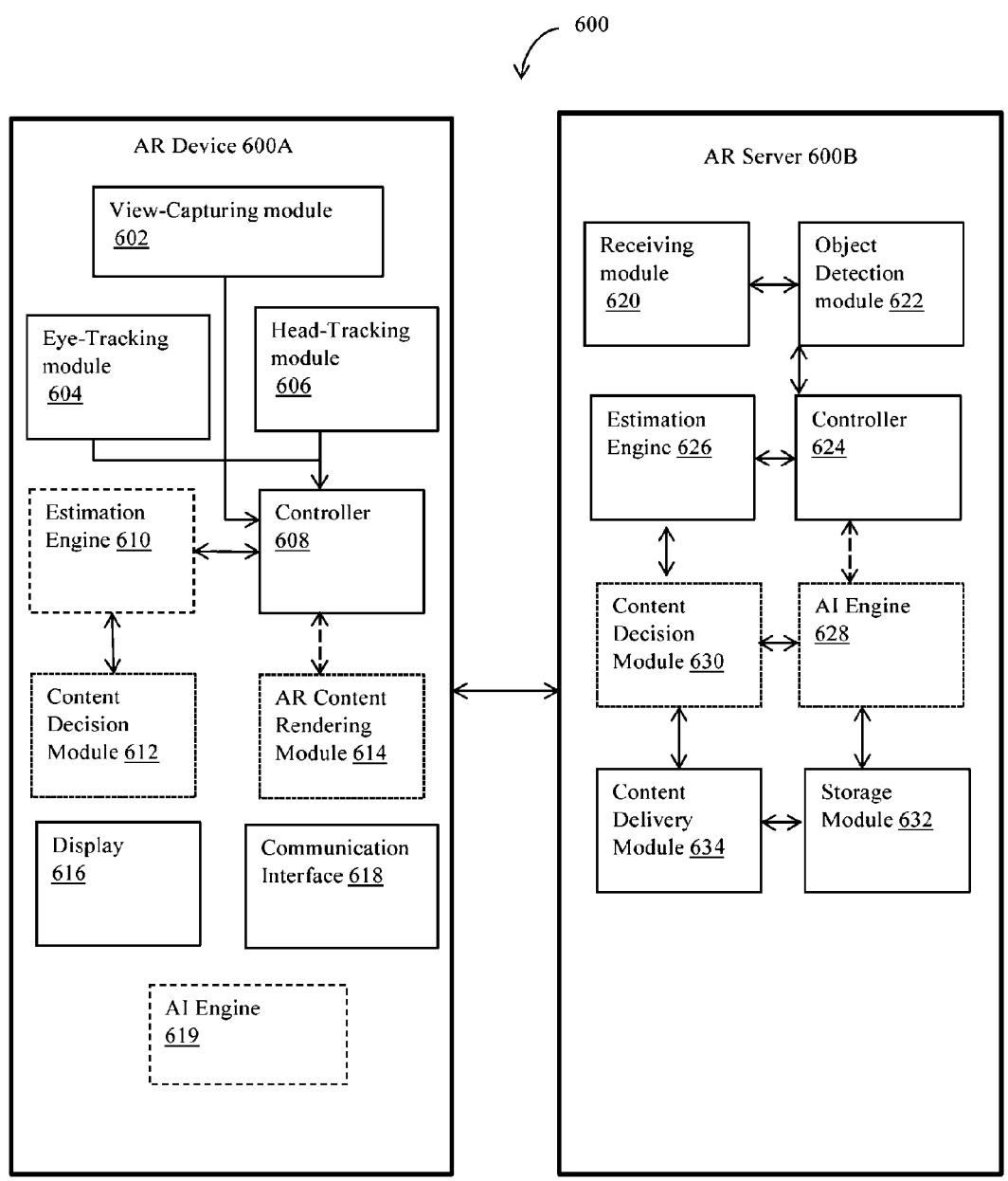
FIG. 6A is a block diagram illustrating an AR system including an AR device and an AR server according to an embodiment.

FIG. 6A is a block diagram illustrating an AR system 600 including an AR device 600A and an AR server 600B directly transmitting AR content to the AR device 600A, in accordance with an embodiment of the present disclosure. In an embodiment, the AR device 600A includes at least some or all of the components of the basic AR device, i.e., the wearable glasses 100, such as the ones shown in FIG. 4. The AR device 600A may also form whole or part of the AR device 100 such as the ones shown in FIG. 5. In an embodiment, the AR server 600B may include at least some or all of the components of the basic AR server 600B such as the ones shown in FIG. 4. In accordance with an embodiment, the AR device 600A may perform some or all of the operations performed by the AR server 600B. In such case, the AR device 600A may function as a stand-alone AR device. In yet some cases, all the analysis of data may be performed on the AR device 600A, and the AR content as determined on the basis of the analysis may be fetched from the AR server 600B.

Referring to FIG. 6A, the AR device 600A may include a view-capturing module 602, an eye-tracking module 604, a head-tracking module 606, a controller 608, a display 616, and a communication interface 618. The AR device 600A may further include an estimation engine 610, a content decision module 612 and an AR content rendering module 614. In additional embodiments of the present disclosure, the AR device may also optionally include an artificial intelligence (AI) engine 619. The view-capturing module 602, the eye-tracking module 604, the head-tracking module 606, the controller 608, the communication interface 618, the estimation engine 610, the content decision module 612, and the AR content rendering module 614 may be implemented as at least one hardware processor. Alternately, the view-capturing module 602, the eye-tracking module 604, and the head-tracking module 606 may be implemented as corresponding sensor(s).

Further, the AR server 600B may include a receiving module 620, an object detection module 622, a controller 624, an estimation engine 626, a content decision module 630, a content delivery module 634, and a storage module 632. The AR server 600B may also include an artificial intelligence (AI) engine 628. The receiving module 620, the object detection module 622, the controller 624, the estimation engine 626, the content decision module 630, the content delivery module 634, and the artificial intelligence (AI) engine 628 may be implemented as at least one hardware processor.

In accordance with an embodiment of the present disclosure, the sensor(s) of the AR device 600A, for example, the eye-tracking module 604, and the head-tracking module 606 are used to obtain at least one of viewing parameters such as eye-gaze events, eye-gaze time, eye-ball movement, and head movement of the user. The viewing parameters are obtained with respect to the real objects appearing in the field of view of the user as well as the AR contents already displayed on the display 616 of the AR device 600A. The already displayed AR contents also referred as AR objects, may be the AR contents which have been determined in the near past for the related real objects appearing in the field of view of the user. Based on one or more viewing parameters obtained from the one or more sensors of the AR device 600A, the viewing activity of the user is monitored. 'Viewing activity' as used herein may be understood as the viewing behaviour of the user, which is based on data or values obtained from the eye-gaze time, eye-ball movement, and head-movement of the user. Accordingly, in an embodiment, the 'viewing activity' has been referred to as the 'viewing activity data'.

The viewing activity may also be referred to as the viewing pattern or the real-time viewing behavior of the user when the viewing parameters are monitored in real-time. The viewing activity may also be monitored and may be further stored as past viewing activity data for the user. In accordance with an embodiment of the present disclosure, based on the viewing activity data as monitored, a possible viewing time of the user with respect to AR content associated with a future object may be determined. Herein, a 'future object' may also be referred as 'the next appearing object', and the 'AR content associated with a future object' may also be referred to as 'the next appearing AR content'.

In accordance with a further embodiment of the present disclosure, the viewing activity data is continuously observed as a time-based series of data. The possible viewing time of the next appearing AR content may accordingly be based on the viewing activity data continuously monitored in the near past. In accordance with further embodiments of the present disclosure, the artificial intelligence modules, i.e., either the AI engine 628 of the AR server 600B, or the AI engine 619 if included in the AR device 600A, may continuously learn to predict a possible viewing time of a user with respect to the next appearing augmented content based on the viewing activity data as monitored currently as well as in the near past. In accordance with yet another further embodiment of the present disclosure, the AI engine 628 or the AI engine 619 may be continuously trained to predict a possible viewing time of the next appearing augmented content based on the accuracy of the predicted possible viewing time of the user in the near past.

In accordance with an embodiment of the present disclosure, the possible viewing time as determined enables determining the AR content as well as adjusting the AR content that best fits within the possible viewing time of the user. Thus, according to an embodiment of the present disclosure, based on the monitored viewing activity, a possible viewing time of AR content associated with a future object, the AR content from a set of AR contents associated with the future object, and the size of the AR content associated with the future object, may be also determined.

In accordance with an embodiment of the present disclosure, an estimation module either present at the AR server 600B (i.e., the estimation engine 626) or the AR device 600A (i.e., the estimation engine 610) may estimate the possible viewing time with respect to AR content for the next appearing AR content. According to various embodiments of the present disclosure, the possible viewing time may be expressed as the eye-gaze time with respect to a respective object. Thus, the 'viewing time' may also be referred to as the 'view time' and the 'gaze-time' in various embodiments. The 'possible viewing time' may also be referred to as the 'estimated eye-gaze time' or the 'estimated gaze time' in various embodiments.

In accordance with an embodiment of the present disclosure, the estimation module (the estimation engine 626 or the estimation engine 610) may use a rule-based method to estimate the eye-gaze time of the user with regard to augmented content for the next appearing object, i.e., the future object in the field of view of the user. In accordance with another embodiment of the present disclosure, the estimation module (the estimation engine 626 or the estimation engine 610) may adopt an adaptive-method to estimate the eye-gaze time of the user with respect to an augmented content for the next appearing object, i.e., the future object in the field of view of the user. The rule-based method and the adaptive-method are described in further detail below. In accordance with an embodiment of the present disclosure, the adaptive method may be an artificial intelligence (AI) driven method. Further, in an embodiment, the estimation engine (estimation engine 626, or the estimation engine 610) may employ the AI engine present either at the AR server 600B, (i.e., the AI engine 628) or at the AR device 600A (i.e., the AI engine 619), to estimate the eye-gaze time of the user using the adaptive method. As explained in an embodiment, the AI engine (i.e., the AI engine 628 or the AI engine 619) may continuously observe the viewing activity data, and based on the observed data, may keep learning and getting trained in order to predict the possible viewing time of the AR content associated with a future object. In an embodiment, the AI engine (i.e., the AI engine 628 or the AI engine 619) may employ a reinforcement technique as a learning process to improve its prediction capabilities based on a feedback of the past predicted values. In an embodiment, if the user spends a viewing time gazing at AR content and the viewing time is the same as a predicted gaze-time in the near past by the AI engine (i.e., the AI engine 628 or the AI engine 619), this may be considered as a positive feedback for the AI engine. Whereas, if the user's viewing time with respect to gazing at AR content is different from the predicted gaze-time in the near past by the AI engine (i.e., the AI engine 628 or the AI engine 619), this may be considered as a negative feedback by the AI engine (i.e., the AI engine 628 or the AI engine 619). Accordingly, the AI engine (i.e., the AI engine 628 or the AI engine 619) utilizes a reinforcement technique to learn to predict the eye-gaze time of the user with respect to augmented content for the next appearing object, i.e., the future object in the field of view of the user. Thus, the AI engine (i.e., the AI engine 628 or the AI engine 619) relies on continuously monitored viewing activity data in the near past as well as a feedback mechanism to accurately predict the eye-gaze time of the user for the next appearing AR content. The estimation module (the estimation engine 626 or the estimation engine 610) accordingly employs the AI engine (i.e., the AI engine 628 or the AI engine 619) to estimate the eye-gaze time of the next appearing AR content when using the adaptive method.

In accordance with a further embodiment of the present disclosure, one or more sets of viewing activity data may be used for an analysis to determine a viewing pattern of the user. The viewing pattern may include viewing parameters continuously monitored over a period of time, a specific instance of time, or in different situations or in different locations. Accordingly, a 'viewing pattern' may also be referred to as a 'viewing activity data pattern'.

In accordance with an embodiment of the present disclosure, a viewing pattern may be indicative of an observation category of the user, for example, a fast explorer or a slow explorer, or may be indicative of location-based preferences of the user, a user-profile, etc., which may in turn be used to predict the possible viewing time of the next appearing AR content in the field of view of the user.

In accordance with an embodiment of the present disclosure, the monitoring of the viewing activity is re-set on detecting a change in one or more environmental parameters affecting the possible viewing time with respect to the future objects. Accordingly, the AR content is re-adjusted according to a changing viewing behavior of the user, which may be detected in terms of the viewing parameters as well as any other environmental parameters affecting the possible viewing time with respect to the future objects.

Referring to FIG. 6A, the eye-tracking module 604 and the head-tracking module 606 may be included in the sensors(s) 116 as shown in FIG. 4 and the sensing circuit 150 as shown in FIG. 5. The eye-tracking module 604 may also be employed as the camera device 161 as shown in FIG. 5. The camera (image sensors) 161 used to track eye-gazes and eye-movements may include a plurality of high definition HD scene cameras or rear cameras provided on the AR device 600A. The eye-movements, which may include the eye-ball movement, as well as the head-movement, may be used to determine the viewing instances over at least one of the plurality of time instances with respect to one particular real object. Further, the eye-gaze time may be used to obtain the fixed eye-gaze event of viewing one particular real object.

In accordance with an embodiment of the present disclosure, the viewing activity being monitored includes at least one of viewing instances over at least one of the plurality of time instances and a plurality of eye-gazes. Further, monitoring of the viewing activity includes monitoring at least one of eye gaze events with respect to a plurality of objects, an eye ball movement of the user in relation to the plurality of objects, and a head-movement of the user in relation to the plurality of objects. In accordance with an embodiment of the present disclosure, an aggregate rate of change in one or more viewing parameters is determined based on one or more monitored values of eye-gaze events (eye-gaze time), eye-ball movement, and head-movement.

Figure 6B:
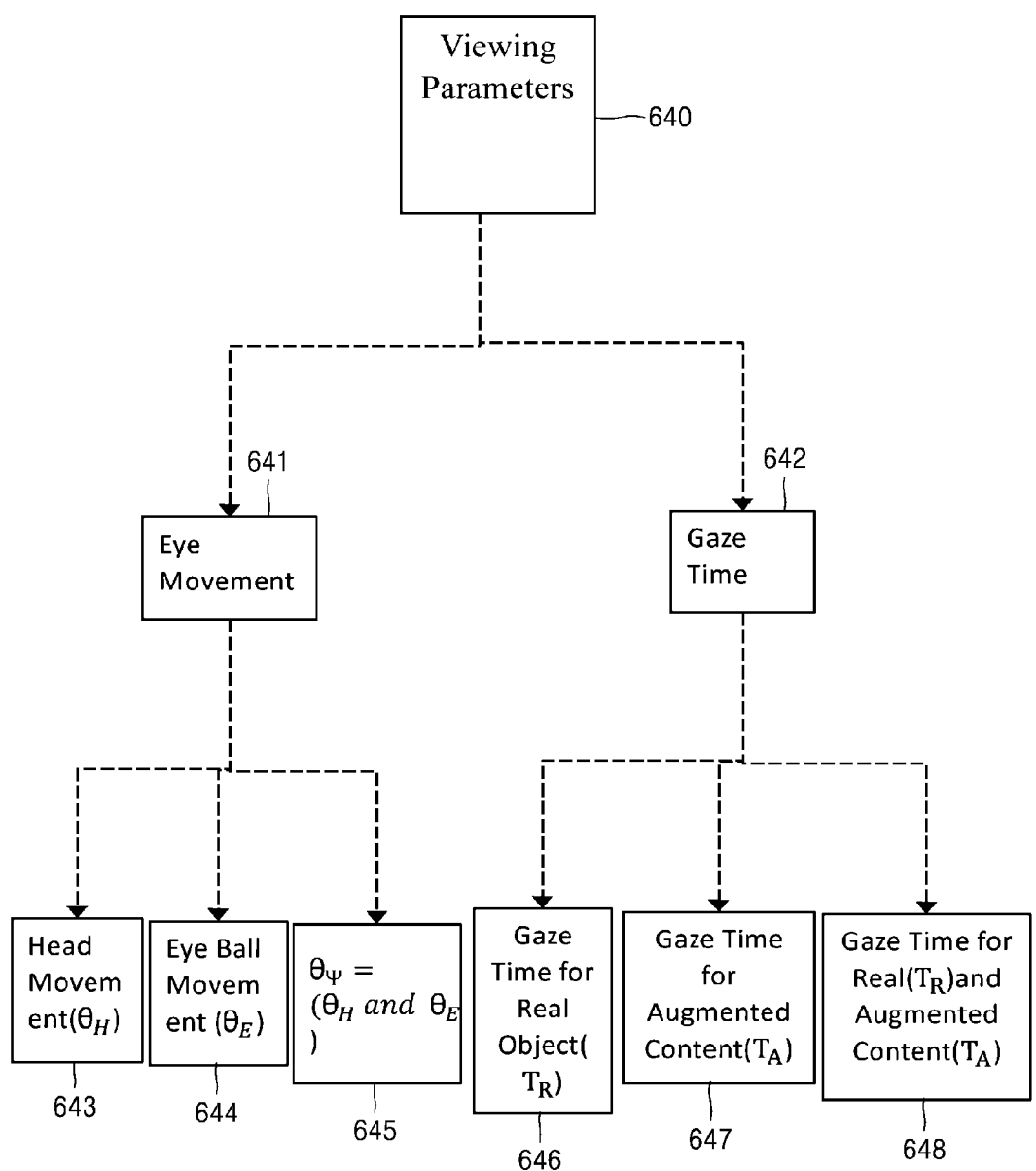
FIG. 6B is a flow diagram illustrating various viewing parameters which may be considered for determining the possible viewing time of the next appearing AR content according to an embodiment.

In accordance with an embodiment of the present disclosure, FIG. 6B illustrates the categorization of the viewing parameters 640 which are taken into consideration for detecting or monitoring the viewing activity of the user of the AR device 600A. Based on the monitoring of the viewing activity of the user, the possible viewing time of a next appearing AR content for a future object is estimated. The estimation may be performed by the estimation module (the estimation engine 626 or the estimation engine 610) of the AR server 600B. However, the estimation may also be performed at the AR device 600A if the estimation engine 610 is provided on the AR device 600A. Estimation operations will be described in further detail below.

Referring to FIG. 6B, the eye-movement data may be based on two different sources used to measure the eye-movement of the user 641. As such, the eye-movement is either measured or determined by the head-tracking module 606 as the head movement $(\theta_H)$ 643 or by the eye-tracking module 604 as the eye-ball movement $(\theta_E)$ 644. The eye-movement data 641 may also be captured as a combination of the head movement $(\theta_H)$ 643 and the eye-ball movement $(\theta_E)$ 644, which is represented as $(\theta_\Psi)$ 645. The eye-movement data 641 as captured may basically represent an angular velocity of the eye-ball during exploration of the real objects in the field of view of the user. The other viewing parameter 640, which is the eye-gaze time 642, is further categorized or determined based on the type of object being currently viewed or currently in-focus of the user. The object herein may be a real object or an augmented object as discussed above, according to an embodiment. Accordingly, a gaze-time for a real object may be represented as $(T_R)$ 646 and a gaze-time for an augmented object may be represented as $(T_A)$ 647. A combination 648 of both the gaze-time for a real object $(T_R)$ and gaze-time for an augmented object $(T_A)$ may also be considered as one of the categories of the gaze-time.

Figure 7A:
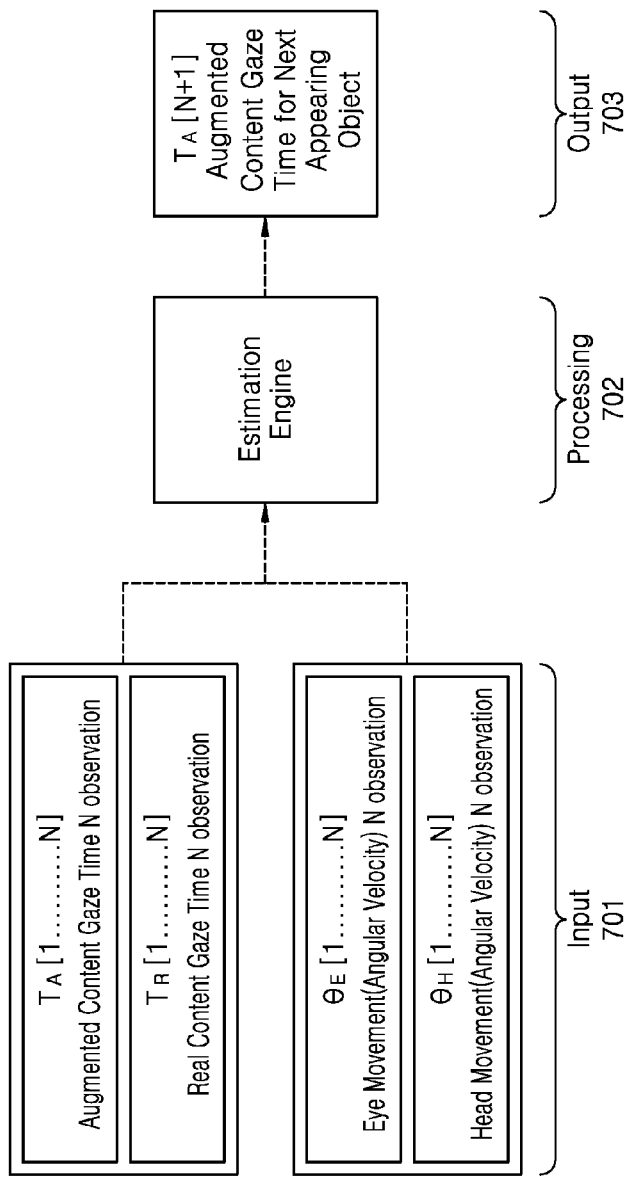
FIG. 7A is a flow diagram illustrating a workflow of presentation according to an embodiment.

In accordance with an embodiment of the present disclosure, any combination of the above-described viewing parameters selected from any of the categories, i.e., the eye-movement and the gaze time, may be used to estimate the possible viewing time of further appearing augmented content. FIG. 7A is a flow diagram illustrating a work-flow of processing the viewing parameters to provide an output of the estimated gaze time $T_A$ with respect to augmented content for the next appearing object, i.e., the future object, according to an embodiment. The data as provided to the estimation engine 626 (or the estimation engine 610) is processed based on either the rule-based method or an adaptive method to provide an output of the estimated gaze time $T_A$ of the next appearing AR content.

As shown in FIG. 7A, a time-based series of sequences of each of the above-described viewing parameters, i.e., the eye-ball movement, the head-movement, the gaze time of real objects, and the gaze time of augmented objects, are provided as input 701 to the estimation engine 626 (or the estimation engine 610). Each of the sequences of the viewing parameters is a time-based series monitored for up to N number of observations with respect to a plurality of objects in the field of view of the user. The estimation engine 626 (or the estimation engine 610) processes the viewing parameters 702 data for up to N observations to estimate the possible viewing time of the (N+1)th observation corresponding to the further appearing AR content for a future object. Based on the estimated possible viewing time, the AR content is determined along with a size of the AR content as well as a type (for example, a media type) of the AR content to be displayed on the AR device 600A. Thus, the AR content as displayed on the AR device 600A is adjusted in terms of the outcome of the processing of the estimation module (the estimation engine 626 or the estimation engine 610), i.e., the possible viewing time 703.

In accordance with a further embodiment of the present disclosure, any combination of the above-described viewing parameters may be used to determine an observation category of the viewer from a set of observation categories. According to an embodiment of the present disclosure, the observation category may be determined based on comparing a current viewing activity data pattern with a past viewing activity data pattern. As disclosed above, the viewing pattern is indicative of the observation category of the user, which may be in turn used to predict the possible viewing time of the next appearing AR content in the field of view of the user. In an embodiment, the AI engine (i.e., the AI engine 628, or the AI engine 619) may record an observation category based on a certain viewing pattern observed for the user. When the same viewing pattern is observed again in the near future, the AI engine (i.e., the AI engine 628, or the AI engine 619) may quickly detect the observation category of the user and use the same to predict the possible viewing time of the next appearing AR content. Accordingly, the AI engine i.e., (the AI engine 628, or the AI engine 619) may quickly present an adjusted AR content to the user which best fits within the possible viewing time thus predicted.

In accordance with an embodiment of the present disclosure, the comparing of the currently recorded viewing activity pattern with the past viewing activity pattern may be performed by an artificial intelligence (AI) method and learning techniques, including, but not limited to, reinforcement learning techniques. In an embodiment, the estimation engine (i.e., the estimation engine 626, or the estimation engine 610) may employ the AI engine 628 residing on the AR server 600B, or the AI engine 619 if present on the AR device 600A, to determine an observation category of the user to estimate the expected gaze time of the user with respect to the next appearing AR content. According to a further embodiment of the present disclosure, based on the observation category, the possible viewing time regarding the further appearing augmented content related to future objects is determined.

In accordance with another embodiment of the present disclosure, the estimated gaze-time provided as an outcome of the processing done by the estimation engine (i.e., the estimation engine 626, or the estimation engine 610), is used to determine the user's observation category from a set of observation categories. According to an embodiment of the present disclosure, the set of observation categories may be predefined. Each predefined observation category may have a minimum threshold value and a maximum threshold value. In an embodiment, the minimum threshold value and the maximum threshold value may be determined adaptively by the AI engine (i.e., the AI engine 628, or the AI engine 619). As explained above, the AI engine (i.e., the AI engine 628, or the AI engine 619) may employ deep learning techniques and reinforcement training to predict the possible viewing time over continuously monitored viewing activity data. Further, the AI engine (i.e., the AI engine 628, or the AI engine 619) may also utilize a feedback mechanism to adaptively update the threshold values set for the viewing parameters to keep improving its performance for accurate prediction of the possible viewing time of the next appearing AR content.

Table 1 below provides a range of possible viewing time in terms of an eye-gaze time of the user for different observation categories, according to an embodiment of the present disclosure.

TABLE 1

| Expected Gaze Time ($T_A$) | Observation Category |
|---|---|
| $TH_{min}$-3 | Category 1 |
| 4-6 | Category 2 |
| 7-15 | Category 3 |
| 16-25 | Category 4 |
| 26-35 | Category 5 |
| 36-45 | Category 6 |
| 46-55 | Category 7 |
| 56-70 | Category 8 |
| 71-85 | Category 9 |
| 86-$TH_{max}$ | Category 10 |

The estimated gaze-time is indicative of the user's predicted viewing behavior with respect to the next appearing augmented content based on past viewing behaviors of the user. The above-indicated categories may be determined based on an above-explained comparison of the current viewing activity pattern data with the past viewing activity pattern data. Gaze-time ranges shown in the above category table are for representational purpose of an embodiment, and thus, they may be changed based on suitability. Category 1, Category 2, and so on, are defined as different categories with respect to a viewer. In an embodiment, the observation category may be categorized based on exploration patterns of the user. Herein, Category 1 with a lower gaze time range may indicate a fast explorer user, whereas Category 10 with a maximum gaze time may indicate a slow explorer user, that is, a user who may be into research-centric thinking.

In accordance with an embodiment of the present disclosure, the viewing activity which has an associated viewing time less than a minimum threshold view time and greater than a maximum threshold view time is filtered out before processing the monitored viewing activity for estimating the possible view time of the next appearing AR content. In accordance with a further embodiment of the present disclosure, the viewing parameters which have their respective absolute values (the eye-gaze time or eye-gaze events, the eye-ball movement data, the head-movement data) less than a minimum threshold value and greater than a maximum threshold value are filtered out before processing the monitored viewing activity for estimating the possible view time of the next appearing AR content. In accordance with yet another embodiment of the present disclosure, when aggregate values of one or more viewing parameters are taken into consideration for monitoring the viewing activity, the aggregated values which are less than a minimum threshold value and greater than a maximum threshold value are filtered out before processing the monitored viewing activity for estimating the possible view time of the next appearing AR content. The filtering of the viewing activity (i.e., the viewing time in terms of the eye-gaze time), the respective absolute values of any of the viewing parameters, or the aggregate values of one or more viewing parameters may be performed by the controller 624 at the AR server 600B. The filtering may be performed before estimation of the possible viewing time with respect to the next appearing AR content.

In another embodiment, the controller 608 of the AR device 600A, which may incorporate the controller 120 explained with respect to FIGS. 2 to 5, may also include an advanced controller module which may be responsible for controlling the viewing parameters to be provided to the estimation module (the estimation engine 626 or the estimation engine 610) before processing the viewing parameters for estimation of the possible viewing time of the next appearing AR content. In an embodiment, the minimum eye gaze time and the maximum eye gaze time corresponding to the minimum threshold view time and the maximum threshold view time, respectively, may be controlled by the advanced controller module at the controller 608 of the AR device 600A.

In accordance with an embodiment of the present disclosure, the minimum threshold view time and the maximum threshold view time may be adaptive-based on at least one of the observation category, historical or past viewing activity data (i.e., one or more viewing parameters), and real-time or current viewing activity data and user-specific profile data.

In accordance with an embodiment of the present disclosure, the minimum threshold view time and the maximum threshold view time may be determined by the controller 624 at the AR server 600B. In another embodiment, the minimum threshold view time and the maximum threshold view time may be determined by the controller 608 at the AR server 600B.

In accordance with another embodiment of the present disclosure, the minimum threshold view time and the maximum threshold view time may be determined by the AI engine (i.e., the AI engine 628 or the AI engine 619) using past learning techniques.

In accordance with a further embodiment of the present disclosure, the minimum threshold value and the maximum threshold value for each of the absolute values of the viewing parameters, i.e., the eye-gaze events, gaze-time, eyeball-movement, and head-movement, may be adaptive-based on at least one of the observation category, historical or past viewing activity data (i.e., one or more viewing parameters), real-time or current viewing activity data, and user-specific profile data. In accordance with yet another embodiment of the present disclosure, the minimum threshold value and the maximum threshold value for aggregate values of one or more viewing parameters may be adaptive-based on at least one of the observation category, historical or past viewing activity data (i.e., one or more viewing parameters), real-time or current viewing activity data, and user-specific profile data. The minimum threshold value and the maximum threshold value may be determined by the controller 624 at the AR server 600B. In another embodiment, the minimum threshold view time and the maximum threshold view time may be determined by the controller 608 at the AR server 600B.

In another embodiment, the minimum threshold value and the maximum threshold value for the absolute values of each of the viewing parameters or aggregate values of one or more viewing parameters may be determined by the AI engine (i.e., the AI engine 628 or the AI engine 619) using past learning techniques.

The filtering activity with respect to a threshold set for the viewing activity or the respective viewing parameters as discussed above is performed prior to the estimation of the possible viewing time of the next appearing AR content.

The detailed description of each part for the input, processing mechanism, and the output as represented in the workflow diagram in FIG. 7A is explained hereinafter according to various embodiments.

In accordance with an embodiment of the present disclosure, the viewing parameters may be selected in any combination from the two categories described with respect to FIG. 6B in order to generate an output, i.e., adjusted AR content which may be the best fit in the field of view of the user considering the possible viewing time. Each of the viewing parameters that may be taken into consideration for monitoring the viewing activity of the user is described below.

(a) Gaze-Time Analysis

The eye-gaze time is monitored using the eye-tracking module 604 of the AR device 600A. According to an embodiment, multiple observations of eye-gaze time with respect to real objects as well as augmented objects in the field of view of the user are monitored and recorded. The multiple observations of the eye-gaze time may be provided as a continuous sequence of inputs to the estimation module (the estimation engine 626 or the estimation engine 610).

(1) Gaze-Time Analysis for Augmented Content

Figure 7B:
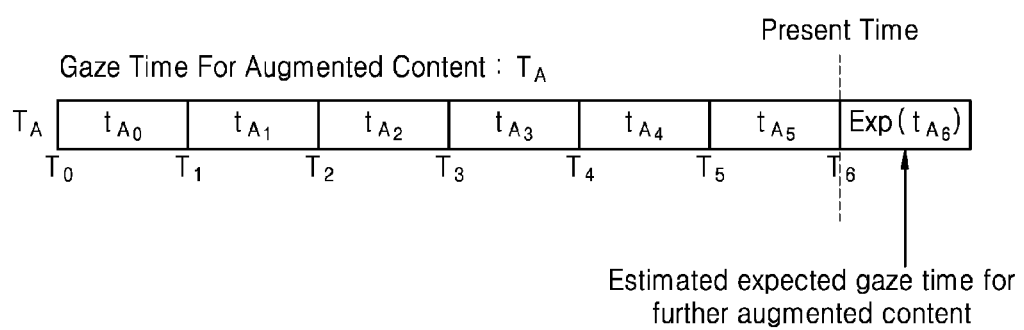
FIG. 7B is a view illustrating gaze-time observations with respect to augmented objects considered as viewing parameter according to an embodiment.

An expected gaze time for augmented content for next appearing AR content related to a future object is measured using a sequence of gaze time of augmented content in near past. FIG. 7B is a view illustrating an example of multiple observations of eye-gaze time $T_A$ with respect to augmented content according to an embodiment.

Referring to FIG. 7B, a time series based gaze-time for multiple observations is monitored in a continuous manner with respect to augmented objects in the field of view of the user. In an embodiment, a gaze time ($T_A$) for augmented content is recorded up to six instances, i.e., from time T0 to T1 as $t_{A0}$, from time T1 to time T2 as $t_{A1}$, from time T2 to time T3 as $t_{A2}$, from time T3 to time T4 as $t_{A3}$, from time T4 to time T5 as $t_{A4}$, from time T5 to a present as $t_{A5}$, where T0 to the present time is a continuous series of time instances. Based on the past observed eye-gaze time with respect to the augmented contents, the possible viewing time represented in FIG. 7B as the 'estimated expected gaze time for further augmented content' at time T6, is given as 'Exp ($t_{A6}$)', which may be obtained by using an average of Ta1-Ta5. Thus, a time series based gaze time observations as available in real time is used in an exemplary embodiment to estimate the expected gaze time of upcoming augmented content (respective to next real object user will gaze).

In accordance with an embodiment of the present disclosure, the gaze time at one particular instance $\{t_{A_x}\}$, which is the gaze-time of the user with respect to augmented content, is greater than the predetermined minimum threshold view time ($TH_{min}$) and less than the predetermined maximum threshold view time ($TH_{max}$). Thus, the gaze-time considered for monitoring the current viewing activity of the user is after filtering out the viewing activity. According to an embodiment, a time-series based analysis may be performed on the time series based gaze-time observations to estimate the expected gaze time, i.e., the possible viewing time for the next appearing augmented content. Feasibility of such analysis methods is described in the forgoing description.

In accordance with an embodiment of the present disclosure, the expected gaze-time calculated on the basis of a time-series based analysis for a series of gaze-time observations may belong to at least one of the observation category.

FIG. 7C is a view illustrating estimation of the gaze-time, i.e., a possible view time for the next appearing AR content for four different users ('user 1'; 'user 2'; 'user 3'; and 'user 4') based on the past gazing time observations of the respective users over a continuous series of time-instances ($t_{A1}, t_{A2}, t_{A3}, t_{A4}, t_{A5}$) with respect to augmented content, according to an embodiment. The estimated gaze-time, i.e., the possible view time thus estimated for each of the users is indicated in column: 'Exp($t_{A6}$)'. As shown in the table in FIG. 7C, the expected gaze time may be indicative of at least one observation category indicated in the column 'Observational Category'.

(2) Gaze-Time Analysis of Real Objects

Figure 7D:
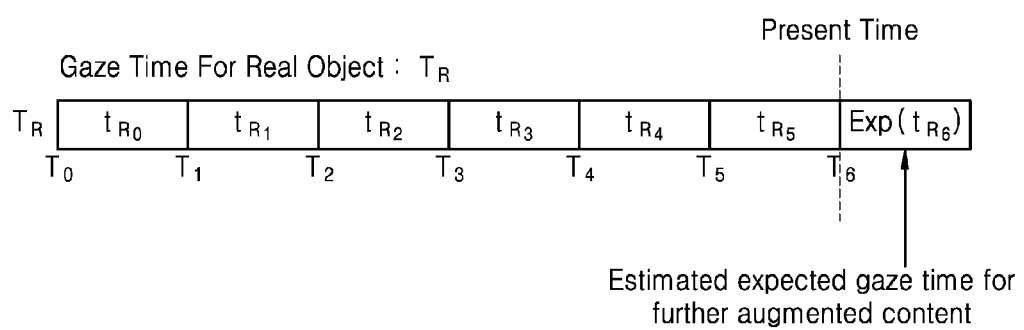
FIG. 7D is a view illustrating gaze-time observations with respect to real objects considered as viewing parameters according to an embodiment.

An expected gaze time for augmented content for next appearing AR content related to a future object is measured using a sequence of gaze time with respect to real objects in the near past. FIG. 7D is a view illustrating multiple observations of eye-gaze time $T_R$ with respect to real objects in the near past, according to an embodiment. As seen in FIG. 7D, a time series based gaze-time for multiple observations are monitored in a continuous manner with respect to real objects in the field of view of the user. For example, a gaze time ($T_R$) for augmented content is recorded up to six instances, i.e., from time T0 to T1 as $t_{R0}$, from time T1 to time T2 as $t_{R1}$, from time T2 to time T3 as $t_{R2}$, from time T3 to time T4 as $t_{R3}$, from time T4 to time T5 as $t_{R4}$, from time T5 to a present as $t_{R5}$, where T0 to the present time is a continuous series of time instances. Based on the past observed eye-gaze time with respect to the real contents, the possible viewing time represented in FIG. 7D as the 'estimated expected gaze time for further augmented content' at time T6, is given as 'Exp ($t_{A6}$)', which may be an average of Tr1 to Tr5. Thus, a time series based gaze time observations as available in real time is used in an embodiment to estimate the expected gaze time of upcoming augmented content (respective to next real object user will gaze). In accordance with an embodiment of the present disclosure, the gaze time at one particular instance $\{t_{Rx}\}$, which is the gaze-time of the user with regard a real object, is greater than the minimum threshold view time ($TH_{min}$) and less than maximum threshold view time ($TH_{max}$). Thus, the gaze-time with regard to the real object that is considered for monitoring the current viewing activity of the user is after filtering out the viewing activity. According to an embodiment, a time-series based analysis may be performed on the observations the time series based gaze-time observations till the current moment to estimate the expected gaze time, i.e., the possible view time for the next appearing augmented content.

FIG. 7E is a view illustrating estimation of the gaze-time, i.e., the possible view time for the next appearing AR content for four different users ('user 1'; 'user 2'; 'user 3'; and 'user 4') based on the past gazing time observations of the respective users over a continuous series of time-instances ($t_{A1}$, $t_{A2}$, $t_{A3}$, $t_{A4}$, $t_{A5}$) with respect to real objects, according to an embodiment. The estimated gaze-time, i.e., the possible view time thus estimated for each of the users is indicated in column 'Exp($t_{A6}$)'. As shown in the table in FIG. 7D, the expected gaze time may be indicative of at least one observation category indicated in column 'Observational Category'.

(3) Gaze-Time Analysis Combined for Real Objects and Augmented Content

Figure 7F:
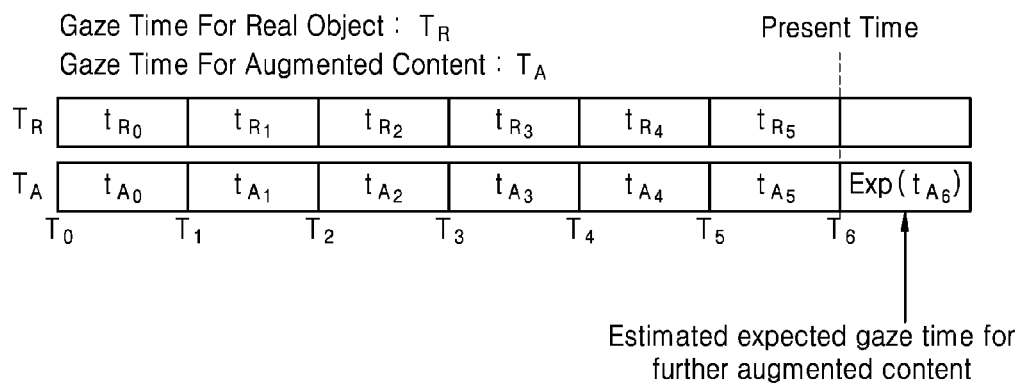
FIG. 7F is a view illustrating gaze-time observations with respect to real objects and augmented objects considered as viewing parameters according to an embodiment.

The gaze-time observations with respect to augmented content in the near past, explained with respect to FIG. 7B, and the gaze-time observations with respect to the real objects in the near past, explained with respect to FIG. 7D, may be combined to estimate the expected gaze time for augmented content for the next appearing object. FIG. 7F is a view illustrating the sequence of gaze-time for real objects and the sequence of gaze-time with respect to augmented content in the near past, which are used together to measure the expected gaze time Exp($t_{A6}$) for the augmented content of the next appearing object, i.e., the future object, according to an embodiment. Herein, the set of gaze time at a moment $\{t_{A_x}, t_{R_x}\}$, which is a combination of a gaze time with respect to a real object and its augmented content, is used to prepare for an observation at that moment. Series of such observations based on time are used to create a time series data of observations. This series of such observations is used until the current moment to perform a time series based analysis to estimate the expected gaze time Exp($t_{A6}$) for upcoming augmented content.

In accordance with an embodiment of the present disclosure, the aggregate values of the combined gaze-time with respect to the augmented content and the gaze time for the real objects considered for estimating the expected gaze-time Exp($t_{A6}$) for upcoming augmented content are greater than a minimum threshold view time and less than a maximum threshold view time, where the minimum threshold view time and the maximum threshold view time values correspond to an aggregated values of the gaze-time of the augmented content and the gaze-time of the real objects.

FIG. 7G is a view illustrating estimation of the gaze-time, i.e., the possible view time for the next appearing AR content for four different users ('user 1'; 'user 2'; 'user 3'; and 'user 4') based on the combined past gazing time observations of the respective users with respect to real objects as well as augmented content over a continuous series of time-instances ($t_{A1}$, $t_{A2}$, $t_{A3}$, $t_{A4}$, $t_{A5}$), according to an embodiment. The estimated gaze-time, i.e., the possible view time thus estimated for each of the users, is indicated in column 'Exp($t_{A6}$)'. As shown in the table in FIG. 7G, the expected gaze time may be indicative of at least one observation category indicated in column 'Observational Category'.

(b) Eye-Movement Analysis

Figure 8:
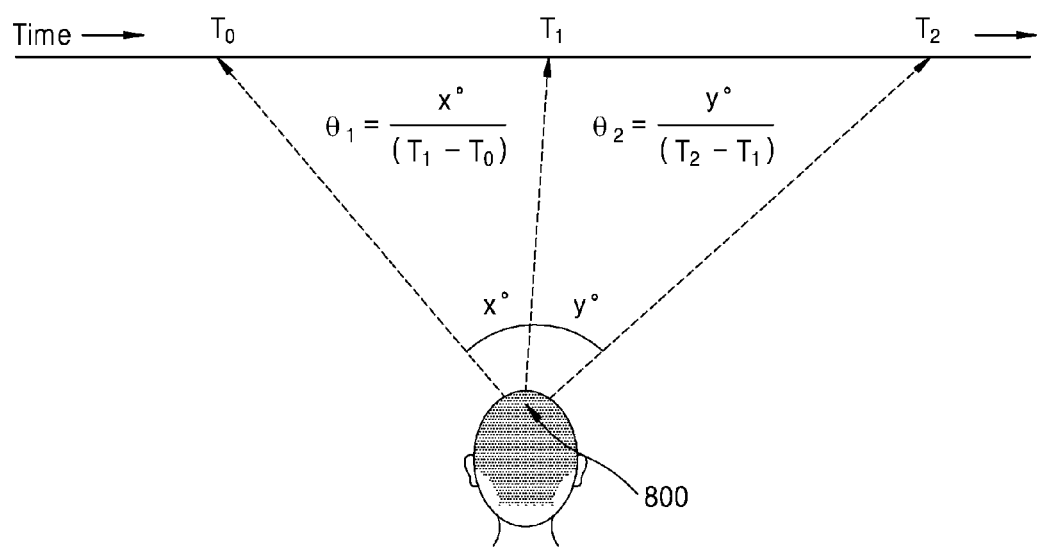
FIG. 8 is a view illustrating eye-movement data in terms of angular velocity according to an embodiment.

The eye-movement is monitored in real-time using the eye-tracking module 604 of the AR device 600A. The eye-movement observations as recorded by the eye-tracking module 604 are in the form of an angular velocity (degrees per second of a movement of the eye balls). According to an embodiment, multiple observations of the eye-movement are recorded, which are processed in a continuous manner by the estimation module (the estimation engine 626 or the estimation engine 610). FIG. 8 is a view illustrating an eye-movement measured in terms of angular velocity according to an embodiment. As seen from FIG. 8, a user's eye-movement 800 from time $T_0$ to time $T_1$ is given by $$\theta_1 = \frac{x^0}{T1 - T0},$$

where $x^0$ is the vision span between $T_0$ and $T_1$ measured in terms of the angular velocity in degrees. Similarly, the vision span between $T_1$ and $T_2$ is measured in terms of the angular velocity in degrees as given by $$\theta_2 = \frac{y^0}{T2 - T1},$$

where $y^0$ is the vision span between $T_1$ and $T_2$ measured in terms of the angular velocity in degrees. In an additional embodiment, user's eye-movement data may be measured in terms of the angular acceleration, which may be utilized as a viewing parameter affecting the viewing activity of the user in one or more situations. The different categories of the eye movement observations used in an exemplary embodiment and briefly mentioned in FIG. 6B are now explained in detail below.

(1) Eye Ball Movement

Figure 9A:
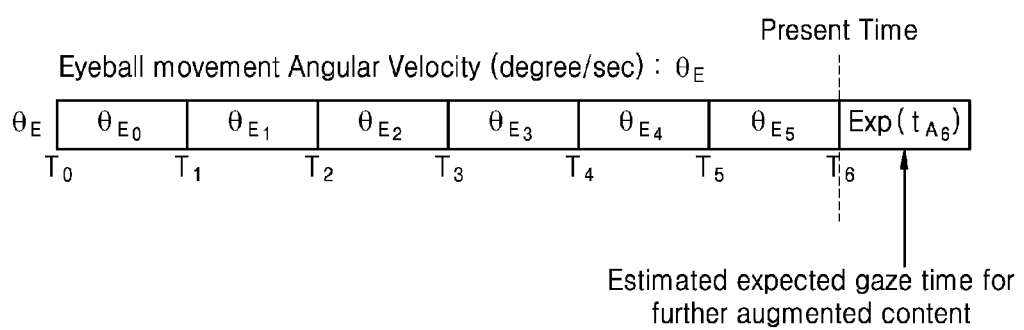
FIG. 9A is a view illustrating eyeball-movement observations sequence in terms of angular velocity according to an embodiment.

An expected gaze time for augmented content for next appearing AR content related to a future object is measured using a sequence of eye-ball movements during viewing of a plurality of objects in the field of view of the user in the near past. FIG. 9A is a view illustrating multiple observations of the eye ball movement in terms of the angular velocity (degrees per second) $\theta_E$ according to an embodiment.

As illustrate in FIG. 9A, a series of eyeball-movement observations based on time is used to create a time series data of observations. Using this time series data of observations till the current moment, a time series based analysis is performed to estimate the expected gaze time for the next appearing AR content, which is also referred to as the upcoming AR content in an embodiment.

In accordance with one of the embodiments of the present disclosure, the eyeball-movement data $\{\theta_{E_x}\}$ taken into consideration for estimating the expected gaze-time of the upcoming AR content may be greater than the minimum threshold value and less than maximum threshold value corresponding to the eyeball-movement data. In accordance with an embodiment of the present disclosure, the expected gaze-time calculated on the basis of a time-series based analysis for a series of eyeball movement observations may belong to at least one of the observation category.

FIG. 9B is a view illustrating estimation of the gaze-time, i.e., the possible view time for the next appearing AR content for four different users ('user 1'; 'user 2'; 'user 3'; and 'user 4') based on the past eyeball-movement observations of the respective users over a continuous series of time-instances as ($\theta_{E1}$, $\theta_{E2}$, $\theta_{E3}$, $\theta_{E4}$, $\theta_{E5}$) according to an embodiment. The estimated gaze-time, i.e., the possible view time thus estimated for each of the users is indicated in column 'Exp($t_{46}$)'. As shown in the table in FIG. 9B, the expected gaze time may be indicative of at least one observation category indicated in column 'Observational Category'.

(2) Eye-Blinking

An expected gaze time for augmented content for next appearing AR content related to a future object is measured using a sequence of eye-blinking data. Eye-blinking by the eye-tracking module 604 is determined in terms of a number of eye blinks within a predetermined period, the eye(s) that blinks, or both. A series of eye-blinking observations is used to create a time series data observations regarding the eye-blinking. Using this time series data of eye-blinking observations till the current moment, a time series based analysis is performed to estimate the expected gaze time for the next appearing AR content also referred to as the upcoming AR content in this disclosure.

(3) Head-Movement

Figure 9C:
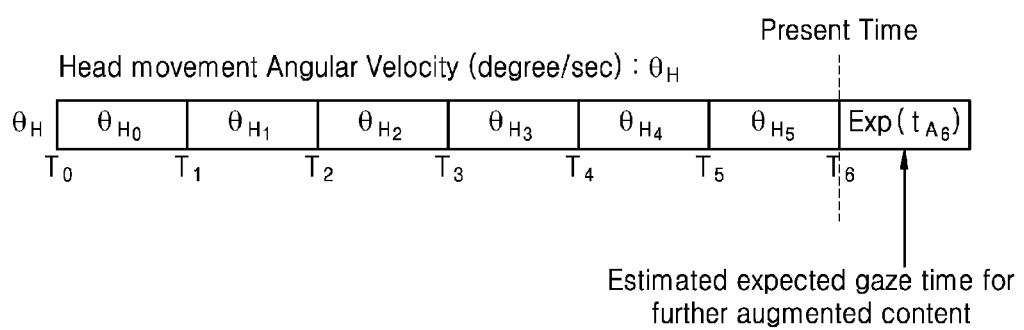
FIG. 9C is a view illustrating head-movement observations sequence in terms of angular velocity according to an embodiment.

An expected gaze time for augmented content for next appearing AR content related to a future object is measured using a sequence of head-movement data. Herein, eye-tracking by the eye-tracking module 604 is measured in terms of a head-movement itself, which is also measured in terms of the angular velocity (i.e., degrees per second). FIG. 9C is a view illustrating multiple observations of head-movement data measured in terms of angular velocity $\theta_H$ (degrees per second) according to an embodiment.

As seen in FIG. 9C, a series of head-movement observations based on time is used to create a time series data of observations regarding the head-movement. Using this time series data of head-movement observations till the current moment, a time series based analysis is performed to estimate the expected gaze time for the next appearing AR content also referred to as the upcoming AR content in an exemplary embodiment.

In accordance with one of the embodiments of the present disclosure, the head-movement data $\{\theta_{H_x}\}$ taken into consideration for estimating the expected gaze-time of the upcoming AR content may be greater than the minimum threshold value and less than maximum threshold value corresponding to the head-movement data. In accordance with an embodiment of the present disclosure, the expected gaze-time calculated on the basis of a time-series based analysis for a series of head movement observations may belong to at least one of the observation category.

(4) Eyeball Movement Combined with Head Movement

The eye-ball movement observations recorded in the near past explained with respect to FIG. 9A and the head-movement observations recorded in the near past explained with respect to FIG. 9C may be combined to estimate the expected gaze time for augmented content for the next appearing object. FIG. 9D is a view illustrating an embodiment where the sequence of eyeball movement data and the sequence of head movement data of the near past are used together to measure the expected gaze time Exp($t_{46}$) for the augmented content of the next appearing object, i.e., the future object according to an embodiment. Herein, the set of head movement observations and the eyeball movement observations are measured in terms of angular velocity at the current moment. $\{\theta_{H_x}, \theta_{E_x}\}$, which is a combination of head movement data and eyeball movement data, and thus, a time series data of observations is created. This series of such observations is used until the current moment to perform a time series based analysis to estimate the expected gaze time Exp($t_{46}$) for upcoming augmented content.

In accordance with an embodiment of the present disclosure, the aggregate values of the combined head-movement data and the eye-ball movement data considered for estimating the expected gaze-time Exp($t_{46}$) for upcoming augmented content are above a minimum threshold value and below a maximum threshold value, where the minimum threshold value and the maximum threshold values correspond to an aggregated values of the eyeball movement data and the head movement data.

In accordance with an embodiment of the present disclosure, the expected gaze-time Exp($t_{46}$) estimated on the basis of the combined head-movement data and the eye-ball movement data may also be indicative of an observation category of the user.

In accordance with an embodiment of the present disclosure, the eye-ball movement observations recorded in the near past explained with respect to FIG. 9A may also be combined with eye-blinking observations recorded in the near past to estimate the expected gaze time for augmented content for the next appearing object. In another embodiment, the eye-ball movement observations may be combined with both the head-movement observations recorded in the near past and the eye-blinking observations recorded in the near past, or only the head-movement observations recorded in the near past may be combined with the eye-blinking observations recorded in the near past to estimate the expected gaze time for augmented content for the next appearing object.

As explained above, the expected gaze-time Exp($t_{46}$) for next appearing augmented content may be easily measured using multiple input parameters which may include any combination of the viewing parameters, i.e., an eye gaze with respect to real objects, an eye gaze with respect to augmented content, a head movement, and an eye movement. Once estimated, the next appearing augmented content related to a future object may be accordingly adjusted to best fit in the field of view of the user. Thus, monitoring the viewing activity, which includes monitoring one or more viewing parameters explained above, provides the best suited AR content at a very first sight based on the user's real-time viewing behavior. Additionally, the viewing parameters which are not adapted to fit within the estimated gaze time for the AR content the user may be filtered out during the filtering process described above. Further, the threshold values set for filtering out the viewing activity, or the viewing parameters, may be changeable based on a detected change in user's viewing behavior.

In accordance with an embodiment of the present disclosure, the monitoring of each of the viewing parameters which may be used to monitor the viewing activity of the user in order to estimate the expected gaze time $Exp(t_{46})$ for next appearing augmented content may be reset. According to an embodiment, the monitoring may be reset upon determining any change in environmental factors with respect to the AR device 600A, a change in the field of view including the plurality of objects which are being viewed by the user via the AR device 600A, or a change in the context of the view of the user. In an embodiment, the detected changes which may be used to re-set the monitoring of the viewing activity of the user may include a change in one or more of the plurality of objects, a new group of the plurality of objects, and a change in a surrounding view of the AR device 600A. In an embodiment, these changes may be detected by the controller 608 of the AR device 600A based on the processing of the image frame, as captured by the view-capturing module 602, by an image processing unit (not shown). In another embodiment, the image processing unit may transmit the information to the AR server 600B, where the controller 624 may be able to detect these changes. In other embodiments, the detected changes which may be used to reset the monitoring of the viewing activity of the user may include a change in Global Positioning System (GPS) location corresponding to the AR device and a change in Indoor Positioning System (IPS) location corresponding to the AR device. In an embodiment, these changes may be detected by the controller 608 of the AR device 600A based on a location-based information accessed from a respective GPS module (not shown) or a respective IPS module (not shown). In another embodiment, these changes may be detected by the controller 608 on the basis of certain image processing techniques indicating a change in location of the AR device, as applied by the image processing unit (not shown). In another embodiment, the controller 624 at the AR server 600B may be able to detect changes in the location of the AR device 600A on the basis of information as received from the GPS module or the IPS module or the image processing unit of the AR device 600A. In yet some other embodiments, the detected changes may be used to re-set the monitoring of the viewing activity of the user may include a change in a motion and/or an orientation of the AR device 600A. These changes may be detected by the controller 608 of the AR device 600A on the basis of information as received from a sensing circuit such as the sensing circuit 150 as shown in FIG. 5, which includes, according to an embodiment, the position sensor 156, the acceleration sensor 152, and the gyroscope sensor 155. In other embodiments, the detected changes which may be used to re-set the monitoring of the viewing activity of the user may include a change in the context of view and expiry of a pre-determined time period, where the change in the context of view may be determined based on at least one or more of user-specific profile data, historical viewing activity data, and real-time viewing activity data. The pre-determined time period may be determined by the controller 624 of the AR server 600B. In an embodiment, the predetermined time period may be adaptive-based on the past viewing patterns observed for the user based on one or more viewing parameters monitored for the user. In one embodiment, the pre-determined time period may be determined by the AI engine (i.e., the AI engine 628 or the AI engine 619).

In accordance with an embodiment of the present disclosure, in response to the resetting of the monitoring of the viewing activity/viewing parameters, the estimation module (the estimation engine 626 or the estimation engine 610) may restart the processing of the viewing activity to estimate the expected gaze time $Exp(t_{46})$ for next appearing augmented content.

Referring back to FIG. 6A, the view-capturing module 602 of the AR device 600A may include, according to an embodiment, the image sensor 161 of the wearable glasses 100 as explained above with respect to FIG. 2A, where the image sensor 161 may be a compact camera such as a camera used in smartphones or webcams. In another embodiment, the view-capturing module 602 may include the camera (image sensor) 161 of the A/V input device 160 of the AR device 100 as explained above with respect to FIG. 5. Further, the view-capturing module 602 may include the view-capturing module, i.e., the sensor(s) 116 of the wearable glasses 100 explained with respect to FIG. 4. As explained with respect to FIG. 4, the view-capturing module 602 may capture a surrounding view including a plurality of objects and the surrounding view may include at least the current field of view of the user. Herein, the plurality of objects may include real objects, augmented objects, or a combination of both real objects and augmented objects. The estimation engine 610, the controller 608, content decision module 612, AR content rendering module 614, and the AI engine 619 may be implemented as at least one hardware processor.

In accordance with one embodiment of the present disclosure, the image frame of the field of view of the user along with the information on the eye-movement and gaze tracking of the user as captured by the eye-tracking module 604 and the head-tracking module 606 may be transmitted to the receiving module 620 of the AR server 600B for further processing.

The receiving module 620 may include the API interaction module 302 of the AR server 300, as explained with respect to FIG. 4. Further, the AR device 600A may include a communication interface 618 which may include, in an embodiment, the communication interface 140 including the mobile communication interface 142 and the broadcasting receiver 143, as explained above with respect to FIG. 5, in order to communicate the information captured by the view-capturing module 602 and the sensors(s) (eye-tracking module 604, head-tracking module 606) to the receiving module 620 of the AR server 600B. In an embodiment, the receiving module 620 may receive at least one of the viewing parameters that may be used to estimate the expected gaze time $Exp(t_{46})$ for next appearing augmented content. The at least one viewing parameters may include, but are not limited to, eye gaze events with respect to the plurality of objects as detected by an eye-tracking module of the AR device, an eye ball movement of the user with respect to the plurality of objects as detected by the eye-tracking module of the AR device, and a head-movement of the user with respect to the plurality of objects as detected by a head-tracking module of the AR device.

The receiving module 620 may provide the received image frame to the object detection module 622. The object detection module 622 may include the object detection module 304 of the AR server 300. The object detection module 622 may apply various image processing techniques and deep learning techniques to identify the objects in the captured image frame to identify the real objects and/or the augmented objects as present in the captured frame. In an embodiment, the object detection module 622 may recognize the image elements included in the image frame and search for boundary points by filtering the received images and recognizing a closed surface generated by the boundary points as one object. The object detection module 622 may use an object mapper (not shown) to map the closed surface image elements with a recognized or a known object. However, the embodiment should not be construed as limiting the present disclosure and other forms of deep learning techniques may be applied to detect and recognize the objects either as a real object or an augmented object, if present in the field of view of the user. The information of the objects as detected by the object detection module 622 may be provided to the controller 624. Further, the receiving module 620 may also provide the received information on the eye-tracking data, i.e., the gaze time and eye-movement data, as received from the sensors (604, 606) to the controller 624.

The controller 624 may monitor a viewing activity of the user of the AR device 600A as captured by the one or more sensors (604, 606) of the AR device 600A. The viewing activity, as explained earlier, may include at least one of viewing instances over at least one of the plurality of time instances and a plurality of eye-gazes. The viewing activity indicates the current viewing observation or a current viewing pattern of the user with respect to a plurality of objects which are in the field of view of the user. To monitor the viewing activity, the controller 624 may monitor the viewing parameters which are to be used to estimate the expected gaze time $Exp(t_{46})$ for next appearing augmented content.

Further, the controller 624 may filter out the viewing activity which has an associated viewing time less than a minimum threshold view time and greater than a maximum threshold view time. The filtering process has been discussed in detail above according to an embodiment. Also, as discussed above, the controller 624 may include an AI engine 628 that may adaptively determine the minimum threshold view time and the maximum threshold view time. Further, the AI engine 628 may update the minimum threshold view time and the maximum threshold view time based on one or more factors, which may include at least the user-profile data and a type of the observation category of the user.

Further, the controller 624 may determine an aggregated value corresponding to at least one of the eye-gaze events, the eye ball movement, and the head-movement, as monitored, and may further determine if the aggregated value is greater than a minimum threshold value prior to the estimation of the expected gaze time $Exp(t_{46})$ for next appearing augmented content.

Further, the controller 624 may reset the monitoring of the viewing activity based on various factors, as discussed above according to an embodiment.

In accordance with an embodiment of the present disclosure, in addition to the monitoring of the viewing activity for the estimation of the expected gaze time $Exp(t_{46})$ for next appearing augmented content, the controller 624 may further monitor user-data and the location data of the AR device 600A which may affect the possible viewing time of the AR content related to a future object. Such data may include at least one of user-profile data, location data corresponding to the AR device 600A, calendar schedule data associated with the user of the AR device 600A, clock-time data associated with the user of the AR device 600A, and another profile data corresponding to another user associated with the user of the AR device, where the other user may at least include a second user accompanying the first user of the AR device 600A. In accordance with an embodiment of the present disclosure, the user data may be obtained in real-time from one or more applications monitoring the user-data on an electronic device of the user, such as the mobile device 200 shown in FIG. 4.

In accordance with an embodiment of the present disclosure, the estimation module (the estimation engine 626 or the estimation engine 610) may determine a possible viewing time of AR content associated with a future object based on the viewing activity as monitored by the controller 624. Based on the processing, as explained with respect to FIGS. 7A to 9D, the estimation module 626 may estimate the expected gaze time, i.e., the possible viewing time, $Exp(t_{46})$, for next appearing augmented content associated with a future object. The estimation module (the estimation engine 626 or the estimation engine 610) may further determine, based on the possible viewing time thus estimated, AR content from a set of AR content that may be associated with the future object and size of the AR content associated with the future object. The different types of AR content available for a real object and the different media types available for each of the AR content may be stored in the storage module 632 on the AR server 600B.

In accordance with an embodiment of the present disclosure, the estimation module (the estimation engine 626 or the estimation engine 610) may determine the observation category from a set of observation categories. The observation category may be determined in accordance with any of the methods disclosed above according to an embodiment. The estimation module (the estimation engine 626 or the estimation engine 610) further determines based on the observation category, at least one of the possible viewing time of the AR content associated with the future object, the AR content from the set of AR content associated with the future object, and the size of the AR content associated with the future object.

In accordance with an embodiment of the present disclosure, the estimation module (the estimation engine 626 or the estimation engine 610) may also determine the number of AR content for simultaneous providing during viewing of a plurality of future objects. The number of AR content is within a limit set for the number of AR content to be simultaneously provided during viewing of the plurality of future objects. Herein, the limit may also be determined by the estimation module (the estimation engine 626 or the estimation engine 610).

In accordance with an embodiment of the present disclosure, the estimation module (the estimation engine 626 or the estimation engine 610) may provide the estimated gaze time for the next appearing AR content, i.e., the possible viewing time of the AR content for the future object to a content decision module 630. The content decision module 630 may further receive information from the AI engine 628 to obtain information on past viewing activity data and the past viewing activity pattern monitored for the user. The content decision module 630 may filter out the AR content of the next appearing object based on the estimated gaze time by the estimation module (the estimation engine 626 or the estimation engine 610). The content decision module 630 may be responsible for summarization of the content based on the value of the estimated gaze-time $Exp(t_{46})$, for next appearing augmented content associated with a future object. In one embodiment, the content decision module 630 may select the right type of media for the AR content based on the prediction done by the estimation engine for of the possible viewing time of the AR content along with the AR content.

In accordance with another embodiment of the present disclosure, the various functions associated with the controller 624 of the AR server 600B may be performed by the advanced controller module of the controller 608 present on the AR device 600A. In accordance with further embodiment of the present disclosure, the various functions associated with the estimation module (the estimation engine 626 or the estimation engine 610) may be performed by the estimation engine 610 if present on the AR device 600A. In accordance with yet another embodiment of the present disclosure, the various functions associated with the content decision module 630 may be performed by the content decision module 612 if present on the AR device 600A.

Referring to FIG. 6A, the content delivery module 634 may provide, based on the determination of the estimated gaze-time $Exp(t_{46})$, for next appearing augmented content associated with a future object, and the respective AR content may provide the AR content to the AR content rendering module 614. The AR content rendering module 614 of the AR device 600A may control the rendering of the AR content on the display 616 of the AR device 600A.

The display 616 of the AR device 600A may include, according to an example embodiment, the display 111 explained with respect to the wearable glasses 100, as shown in FIG. 2A and FIG. 5.

In accordance with one embodiment of the present disclosure, the controller 624 may provide AR content to the AR content rendering module 614 of the AR device 600A. The AR content may be associated with a future object and may have an associated first viewing time for the user to view the AR content. The AR content as provided may either be predetermined AR content or may be determined on the basis of the estimation of the expected gaze time $Exp(t_{46})$ in accordance with an embodiment. In accordance with a further embodiment of the present disclosure, the receiving module 620 may further be configured to receive a current viewing time of the user with respect to the AR content from the AR device 600A. The current viewing time may be observed on the basis of one or more viewing parameters detected by the sensors of the AR device 600A, such as the eye-tracking module 604 and head-tracking module 606. In one such embodiment, the controller 624 may determine if the current viewing time of the user with respect to the AR content exceeds the first viewing time. In case, the current viewing time exceeds the first viewing time, controller 624 may determine enhanced AR content with respect to the previously determined AR content. In an embodiment, the content decision module 630 may determine enhanced AR content with respect to the previously determined AR content. Enhancement of the AR content may include at least one of an increase in size, an enhancement of the display effect such as colour and graphical effects including the transition of the content included in the AR content, an improved quality of media type etc. Accordingly, the best suited AR content is provided with respect to the real object where the best-fitted AR content may have a first viewing time, and when the current viewing time exceeds the first viewing time, enhancement of the AR content is provided on the display 616 of the AR device 600A.

In accordance with another embodiment of the present disclosure, the controller 608 of the AR device 600A may determine if a current viewing time of the user with respect the AR content as rendered on the display 616 and having an associated first viewing time exceeds the first viewing time. When the current viewing time exceeds the first viewing time, controller 608 may determine enhanced AR content with respect to the previously determined AR content. In an embodiment, the content decision module 612 may determine enhanced AR content with respect to the previously determined AR content.

In another embodiment of the disclosure, the estimation engine 626, controller 624, AI engine 628, the content decision module 630, and the content delivery module 634 may be implemented as at least one hardware processor.

The time-series bases analysis to estimate the expected gaze-time $Exp(t_{46})$, for next appearing augmented content associated with a future object, as depicted in FIGS. 7B, 7C, 7D, 7E, 7F, 7G, 9A, 9B, 9C and 9D, according to various embodiments are explained in further detail below.

In an embodiment of the present disclosure, a specific time series modeling method called Hidden Markov Model method may be used to estimate the expected gaze time $Exp(t_{46})$ for the next appearing augmented content related to a future object. However, this modeling method should not be construed as limiting the present disclosure and may also be achieved by using other time series based methods and rule-based methods.

In accordance with an embodiment of the present disclosure, the estimation module (the estimation engine 626 or the estimation engine 610), or the estimation engine 610 (if present on the AR device 600A), may use a rule-based method of analyzing the viewing parameters, as described below, to estimate the expected gaze time $Exp(t_{46})$ for the next appearing augmented content related to a future object.

Rule-Based Method

Although an embodiment of a rule-based method has been provided in the present disclosure, it should not be construed as limiting the present disclosure and other simple versions for analysis of the viewing parameters may also be possible. In the rule-based method according to an embodiment, estimation of a gaze time for next AR content may be performed using mean, mode & median over a sequence of gaze time & eye movement observations with any of the following two parameters adjustments:

(a) AR Content Gaze Time ($T_{A_x}$): Gaze time for augmented content for observation x.

(b) Real Object Gaze Time ($T_{R_x}$): Gaze time for the real object for observation x.

(c) Minimum Threshold ($TH_{min}$): A minimum threshold (also referred to as the 'minimum threshold view time' in the present disclosure) may be set to decide that a gaze time observation above the threshold value is considered as part of the analysis.

(d) Maximum Threshold ($TH_{max}$): A maximum threshold (also referred to as the 'maximum threshold view time' in the present disclosure) may be set to decide that a gaze time observation lower the maximum threshold value is considered as part of the analysis.

(e) Length of Sequence (L): This parameter may be used decide how many past gaze time observations are to be considered.

(f) Real Object Gaze Effectiveness ($\alpha$): This parameter may be used to fine-tune the estimation of gaze time using the effect of real object gaze time in the previous sequence. A value of this parameter may vary from 0 to 1.
(g) Eye Movement Effectiveness (β): This parameter may be used to fine-tune the estimation of gaze time using the effect of real object gaze time in the previous sequence. A value of this parameter may vary from 0 to 1.

The estimation module (the estimation engine 626 or the estimation engine 610) (if present on the AR device 600A), may perform the following rule-based method of analyzing the viewing parameters to estimate the expected gaze time $Exp(tA6)$ of the next appearing future object.

$$Exp(T_{A_{next}}) = \frac{1}{L} \sum_{count=1}^{L} (TH_{max} \geq T_{A_{count}} \geq TH_{min}) + \frac{\alpha}{L} \sum_{count=1}^{L} (TH_{max} \geq T_{R_{count}} \geq TH_{min}) + \frac{\beta}{L} \left( 1 \Big/ \sum_{count=1}^{L} (\theta_{\Psi_{count}}) \right)$$

By setting appropriate values of defined effectiveness parameters (α, β) and length of observation (L) with threshold values ($TH_{min}$, $TH_{max}$), the estimation of gaze time for next real object is performed by the estimation module (the estimation engine 626 or the estimation engine 610) (if present on the AR device 600A).

In accordance with an embodiment of the present disclosure, the estimation module (the estimation engine 626 or the estimation engine 610) (if present on the AR device 600A), may use an artificial intelligence (AI) based method of analyzing the viewing parameters, as described below, to estimate the expected gaze time $Exp(t_{A6})$, for the next appearing augmented content related to a future object. The AI-based method may be used to determine an observation category of the user by the AI engine (i.e., the AI engine 628 or the AI engine 619).

Adaptive Method

A Hidden Markov Method (HMM) may be used to handle undefined patterns in the gaze time sequences and eye-movement sequences obtained for a user. A trained HMM model may perform at least one of estimation of next observation, i.e., the expected eye-gaze time $Exp(t_{A6})$, for the next appearing augmented content related to a future object and an estimation of a hidden state that may be indicative of the user's observation category. Based on the user's observation category, the possible viewing time, i.e., the expected gazing time $Exp(t_{A6})$, may be determined as disclosed above. In the HMM, λ is defined by λ=(S,O,A,B,π). The HMM, as depicted in FIG. 10, is trained over gaze time & eye movement observation sequences.

Figure 10:
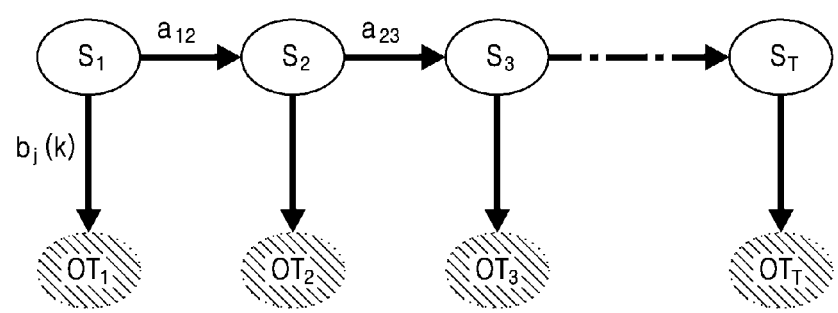
FIG. 10 is a view illustrating a Hidden Markov Model (HMM) used as an adaptive method to estimate a gaze-time for next appearing AR content according to an embodiment.

The symbols depicted in FIG. 10 are defined as follows.
(a) Hidden State: A set of N hidden states $S=\{S_1=OT_1, S_2=OT_2 \ldots S_m=OT_m\}$ is considered. $OT_1$, $OT_2$ ... signify the observation category of a viewer. A user's category is not directly known to the whole system in a concrete manner, however, it is observable through gaze time & eye movement observation $Tx=\{t_{A_x}, t_{R_x}, \theta_{\Psi_x}\}$ sequence. At time t, the state of the system is represented as $S_t$.
(b) Observation Symbols: A set of gaze time & eye movement observation $O=\{T_1, T_2 \ldots T_M\}$ includes M distinct observation symbols per state. The system state at time t may be inferred from observation $O_T$ at time t.
(c) Transition Probability: The state transition probability distribution $A=\{a_{ij}\}$, $a_{ij}=P(q_t=S_j|q_{t-1}=S_i)$. The probability of changing from one observation category ($S_j$) to another observation category ($S_i$) from time t−1 to t.
(d) Emission probability: The emission probability b (k) distribution in state $S_j$ signifies that the probability of observing the observation $T_k=\{t_{A_k},t_{R_k},\theta_{\Psi_k}\}$ for media type $S_j=OT_j$ at time t is $b_j(k)=P(T_k$ at t$|q_t=S_j)$.
(e) Initial probability: $\pi_i$ initial probability for observation category Ci. $\pi_i=P(q_1=S_i)$ The complete model is λ=(S, O, A, B, π).

The top node of the Hidden Markov Model (HMM) depicted in FIG. 10 represents the multinomial variable observation category and the bottom node represents the observable variable gaze time & eye movement observation. Using this trained HMM Model, the following may be achieved as intrinsic part of the HMM features:
1) Estimating the next observation when a sequence of observation is provided—This is the expected gaze time for upcoming AR content for that user.
2) Estimating the next hidden state when the sequence of observation with their respective hidden states is provided—This is best suitable observation category for the user at that time.

FIGS. 11-24 are flowcharts illustrating methods of providing AR content for at least one object in accordance with various embodiments of the present disclosure, as described above. In accordance with an embodiment of the disclosure, the methods illustrated in FIGS. 11-24 may be performed either by the AR device 600A or the AR server 600B. In some embodiments, some of the functions or method operations may be performed by the AR device 600A while the other operations may be performed by the AR server 600B.

The methods as illustrated in FIGS. 11-24 employ the user's eye-movement, head-movement, and eye-gaze time with respect to real objects and the corresponding augmented content as observed in the near past. Further, these observations are modeled based on above-defined rules to determine the user's viewing activity, based on which the expected AR gaze time for future objects may be determined. Once the expected AR gaze time is determined, the AR content adjustments are performed, i.e., the content may be summarized or detailed based on the determined viewing time. Based on the viewing activity, the viewing pattern data may be determined, which provides the user's observation category. Determination of the viewing activity involves at least one or more of the following viewing parameters:

1. Eye Gaze Time: Receives a sequence of gaze time observations for a real object and AR content thereof through eye tracking sensors (for example, the eye-tracking module 604).
2. Eyeball Movement: Receives a sequence of eye movement observations through eye tracking sensors (for example, the eye-tracking module 604).
3. Head Movement: Receives a sequence of head movement observations through head movement sensors (for example, the head-tracking module 606).
4. AR Gaze Time: The gaze time with respect to next appearing AR content is measured using gathered observation sequences of eye gaze time, eyeball movement, and head movement. Optionally, observation category of the user may be decided based on an estimated gaze time.

Based on the measured AR gaze time of next appearing object, the best fit AR content for the future object is provided.

Figure 11:
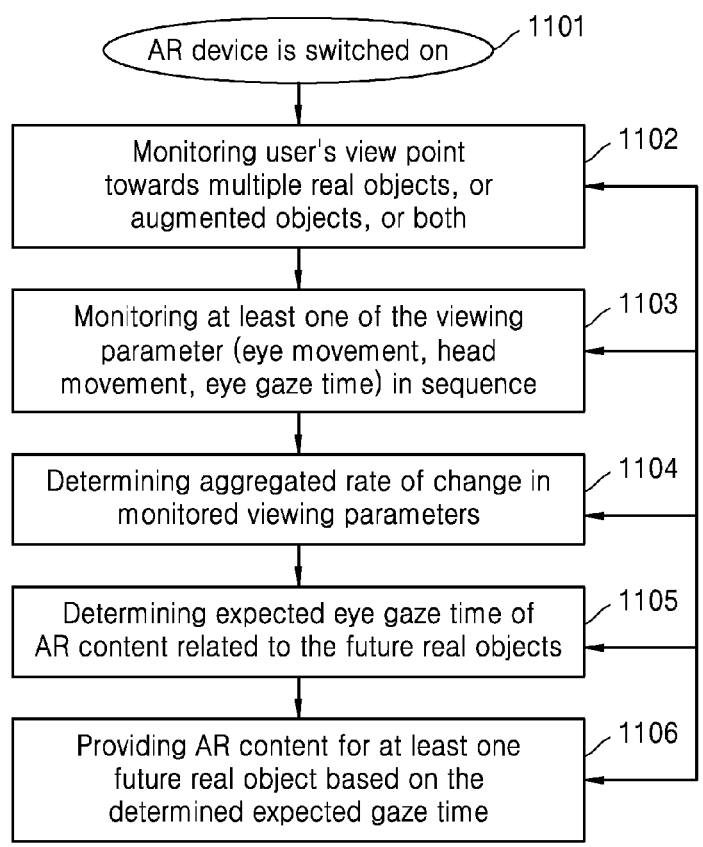
FIG. 11 is a flowchart illustrating a method of providing AR content for at least one future real object based on an expected gaze time for next appearing AR content according to an embodiment.

FIG. 11 is a flowchart illustrating a method of providing AR content for at least one further object, i.e., a future object, based on the determined expected gaze time, in accordance with an embodiment of the present disclosure. In operation 1101, an AR device 600A is switched to ON (turned on). The AR device 600A includes the same elements as the AR device 600 described previously according to an embodiment. In operation 1102, based on a view captured by a view-capturing module 602, a controller 608 of the AR device 600A starts monitoring a user's viewpoint with respect to multiple real objects, augmented objects, or both. In operation 1103, the controller 608, based on the eye-movement tracking by an eye-tracking module 606 and head-movement data by a head-tracking module 606, monitors a viewing activity of a user by monitoring at least one of the viewing parameters i.e., the eye-movement, the head-movement, and the gaze-time in a time-based sequence. In operation 1104, the controller 608 determines an aggregated rate of change in the at least one of the viewing parameters monitored in operation 1103. The operations 1103 and 1104 may be performed by a controller 624 at an AR server 600B based on information received from the view-capturing module 602, the eye-tracking module 604, and the head-tracking module 606 of the AR device 600A. In operation 1105, an estimation engine 610, if available on the AR device 600A or an estimation engine 626 at the AR server 600B determines an expected eye-gaze time of AR content related to a future object. In operation 1106, the AR content is provided on a display 616 of the AR device 600A for at least one further or future real object based on the expected gaze-time determined in operation 1105. The method is re-set based on one or more conditions, as described earlier.

Figure 12:
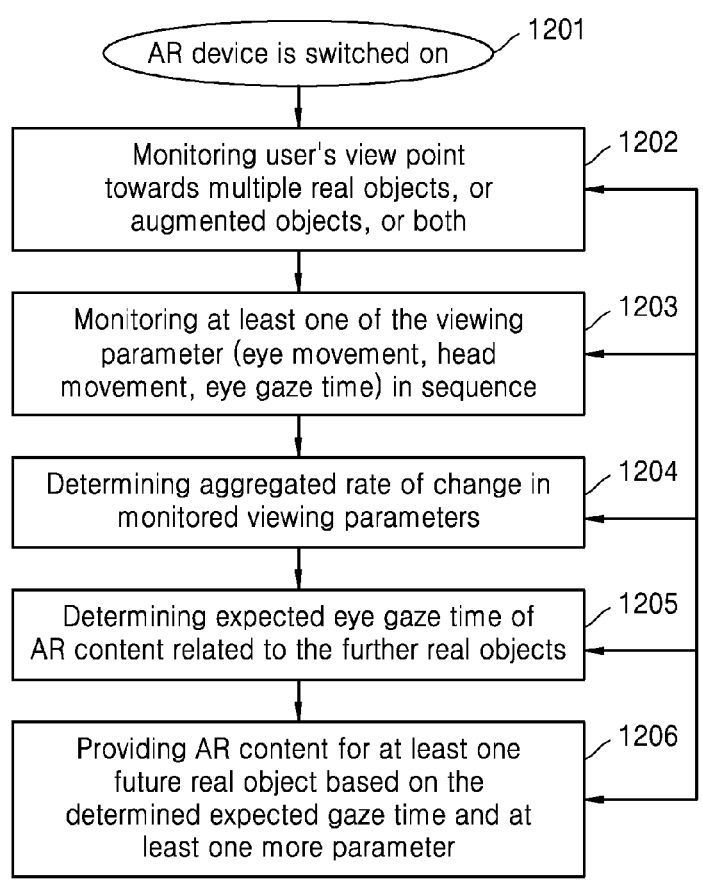
FIG. 12 is a flowchart illustrating a method of providing AR content for at least one future real object based on an expected gaze time for next appearing AR content and at least one or more further parameter according to an embodiment.

FIG. 12 is a flowchart illustrating a method of providing AR content for at least one further object, i.e., a future object, based on the determined expected gaze time and at least one or further parameters, in accordance with an embodiment of the present disclosure. The at least one or more further parameters may include contextual information, a user-profile, calendar schedule data associated with the user of the AR device, clock-time data associated with the user of the AR device, another profile data corresponding to another user associated with the user of the AR device, a location corresponding to the AR device 600A, a viewing history of the user of the AR device 600A, etc. The at least one or more parameters may be monitored by the controller 608 of the AR device 600A or the controller 624 of the AR server 600B based on information accessed from the AR device 600A or an intermediate device, for example, the mobile device 200 of the user, as shown in FIG. 4. In operation 1201, the AR device 600A is switched to ON (turned on). In operation 1202, based on a view captured by the view-capturing module 602, the controller 608 of the AR device 600A starts monitoring a user's viewpoint with respect to multiple real objects, or augmented objects, or both. In operation 1203, the controller 608, based on the eye-movement tracking by the eye-tracking module 604 and head-movement data by the head-tracking module 606, monitors the viewing activity of the user by monitoring at least one of the viewing parameters i.e., the eye-movement, the head-movement, and the gaze-time, in a time-based sequence. The monitoring of the viewing activity, in operation 1203, may further include monitoring by the controller 608 at least one further parameter, as described above. In operation 1204, the controller 608 determines an aggregated rate of change in the at least one of the viewing parameters monitored in operation 1203. The operations 1203 and 1204 may be performed by the controller 624 at the AR server 600B based on information received from the view-capturing module 602, the eye-tracking module 604, and the head-tracking module 606 of the AR device 600A. In operation 1205, the estimation engine 610, if available on the AR device 600A, or the estimation engine 626 at the AR server 600B, determines an expected eye-gaze time of AR content related to a future or further object based on the viewing activity and one or more further parameters. In operation 1206, the AR content is provided on the display 616 of the AR device 600A for at least one further real object based on the expected gaze-time determined in operation 1205 and at least one or more further parameters monitored by the controller 608. The method is re-set based on one or more conditions as described earlier.

Figure 13:
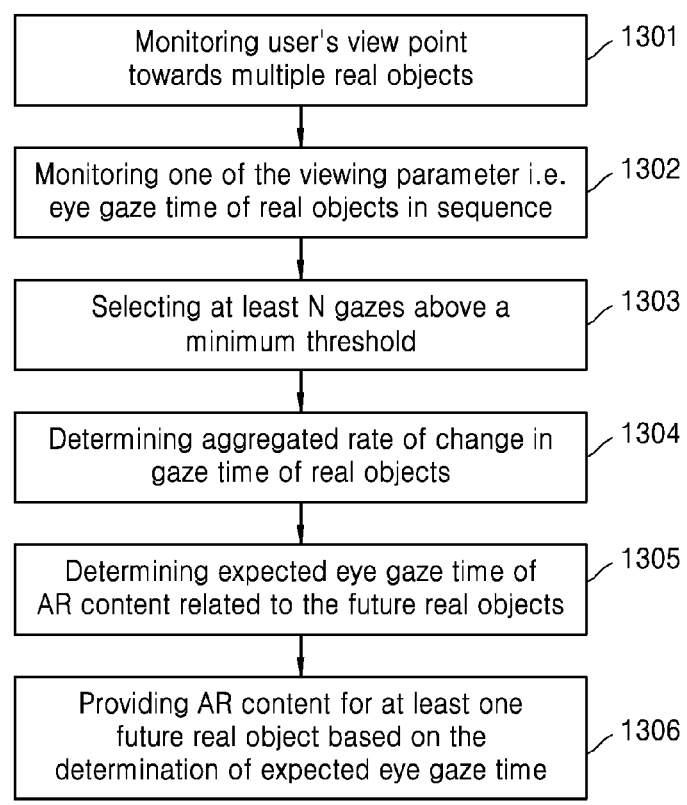
FIG. 13 is a flowchart illustrating a method of providing AR content for at least one future real object based on an expected gaze time for next appearing AR content with only eye-gaze duration for real objects as the available or used viewing parameter according to an embodiment.

FIG. 13 is a flowchart illustrating providing AR content for at least one further object, i.e., a future object, based on a determined expected gaze time with only an eye-gaze time/duration with respect to real objects as a viewing parameter available or used, in accordance with an embodiment of the present disclosure. The method does not rely on a maximum view time threshold for the eye-gaze duration. In operation 1301, based on a view captured by the view-capturing module 602, the controller 608 of the AR device 600A starts monitoring a user's viewpoint with respect to multiple real objects. In operation 1302, the controller 608, based on the eye-movement tracking by the eye-tracking module 604, monitors a viewing activity of the user by monitoring a viewing parameter, i.e., a gaze-time with respect to real objects, in a time-based sequential manner. In operation 1303, at least N gazes above a minimum threshold, i.e., the minimum threshold view time described earlier, are selected by the controller 608. In operation 1304, the controller 608 determines an aggregated rate of change in the gaze time with respect to the real objects. The above operations performed by the controller 608 may be performed by the controller 624 at the AR server 600B, based on information received from the view-capturing module 602, and the eye-tracking module 604 of the AR device 600A. In operation 1305, the estimation engine 610, if available on the AR device 600A, or the estimation engine 626 at the AR server 600B, determines an expected eye-gaze time of AR content related to a future object. In operation 1306, the AR content is provided on the display 616 of the AR device 600A for at least one further real object based on the expected gaze-time determined in operation 1305.

Figure 14:
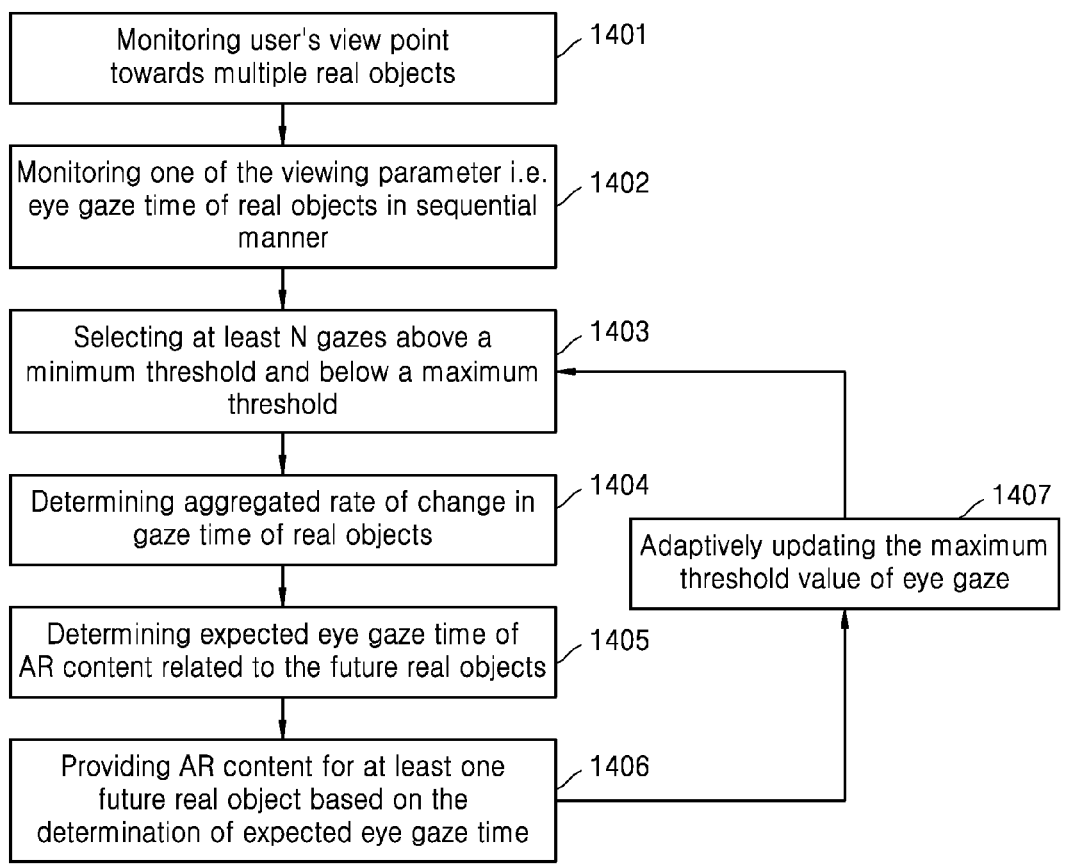
FIG. 14 is a flowchart illustrating a method of providing AR content for at least one future real object based on an expected gaze time for next appearing AR content with only eye-gaze duration of real objects as the available or used viewing parameter according to an embodiment.

FIG. 14 is a flowchart illustrating a method of providing AR content for at least one further object, i.e., a future object, based on a determined expected gaze time with only an eye-gaze time/duration with respect to real objects as a viewing parameter available or used, in accordance with an embodiment of the present disclosure. In the method, at least N gazes above a minimum threshold value and below a maximum threshold value are selected for monitoring where the minimum threshold value and the maximum threshold value are, the minimum threshold view time, and the maximum threshold view time, respectively, as described above. In operation 1401, based on a view captured by the view-capturing module 602, the controller 608 of the AR device 600A starts monitoring a user's viewpoint towards multiple real objects. In operation 1402, the controller 608, based on the eye-movement tracking by the eye-tracking module 604, monitors a viewing activity of the user by monitoring the viewing parameter, i.e., the gaze-time with respect to real objects, in a time-based sequential manner. In operation 1403, at least N gazes above a minimum threshold and below a maximum threshold are selected by the controller 608. In operation 1404, the controller 608 determines an aggregated rate of change in the gaze time with respect to the real objects. The above operations performed by the controller 608 may be performed by the controller 624 at the AR server 600B, based on information receiving from the view-capturing module 602, and the eye-tracking module 604 of the AR device 600A. In operation 1405, the estimation engine 610, if available on the AR device 600A, or the estimation engine 626 at the AR server 600B, determines an expected eye-gaze time with respect to AR content related to a future object. In operation 1406, the AR content is provided on the display 616 of the AR device 600A for at least one further real object based on the expected gaze-time determined, in operation 1405. The maximum threshold value of eye-gaze may be updated in an adaptive manner, in operation 1407, in accordance with an embodiment of the present disclosure described above. The operation 1403 is re-performed when the maximum the threshold value of the eye-gaze is adaptively updated after providing the AR content for at least one future object. Although in an embodiment, the maximum threshold value is updated in an adaptive manner, this is not limiting to the disclosure. In various embodiments, a minimum threshold value may be updated in an adaptive manner such that based on the determined expected eye-gaze time with respect to AR content related to a future object, the minimum threshold value of eye-gaze may be updated in an adaptive manner in operation 1407 instead of the maximum threshold value. In various embodiments, both the minimum threshold value and the maximum threshold value may be updated in operation 1407 based on the determined expected eye-gaze time.

Figure 15:
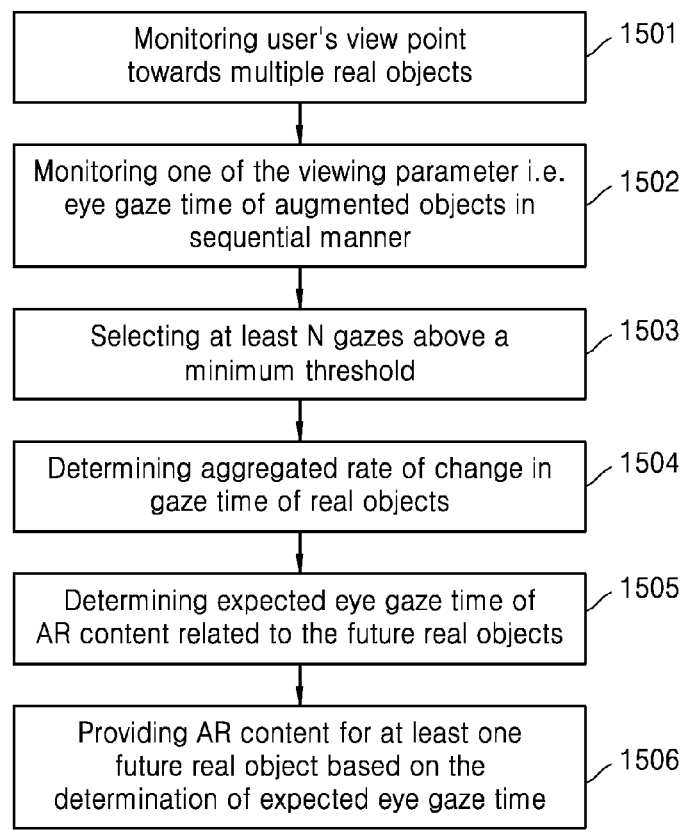
FIG. 15 is a flowchart illustrating a method of providing AR content for at least one future real object based on an expected gaze time for next appearing AR content with only eye-gaze duration of augmented objects as the available or used viewing parameter according to an embodiment.

FIG. 15 is a flowchart illustrating a method of providing AR content for at least one further object, i.e., a future object, based on a determined expected gaze time with only an eye-gaze time/duration with respect to augmented objects as a viewing parameter available or used, in accordance with an embodiment of the present disclosure. The method does not rely on a maximum view time threshold for the eye-gaze duration. In operation 1501, based on a view captured by the view-capturing module 602, the controller 608 of the AR device 600A starts monitoring a user's viewpoint towards multiple augmented objects. In operation 1502, the controller 608, based on the eye-movement tracking by the eye-tracking module 604, monitors a viewing activity of the user by monitoring the viewing parameter i.e., the gaze-time with respect to augmented objects, in a time-based sequential manner. In operation 1503, at least N gazes above a minimum threshold, i.e., the minimum threshold view time as described earlier, are selected by the controller 608. In operation 1504, the controller 608 determines an aggregated rate of change in the gaze time with respect to the augmented objects. The above operations performed by the controller 608 may be performed by the controller 624 at the AR server 600B, based on information received from the view-capturing module 602, and the eye-tracking module 604 of the AR device 600A. In operation 1505, the estimation engine 610, if available on the AR device 600A, or the estimation engine 626 at the AR server 600B, determines an expected eye-gaze time of AR content related to a future object. In operation 1506, the AR content is provided on the display 616 of the AR device 600A for at least one further real object based on the expected eye gaze-time determined in operation 1505.

Figure 16:
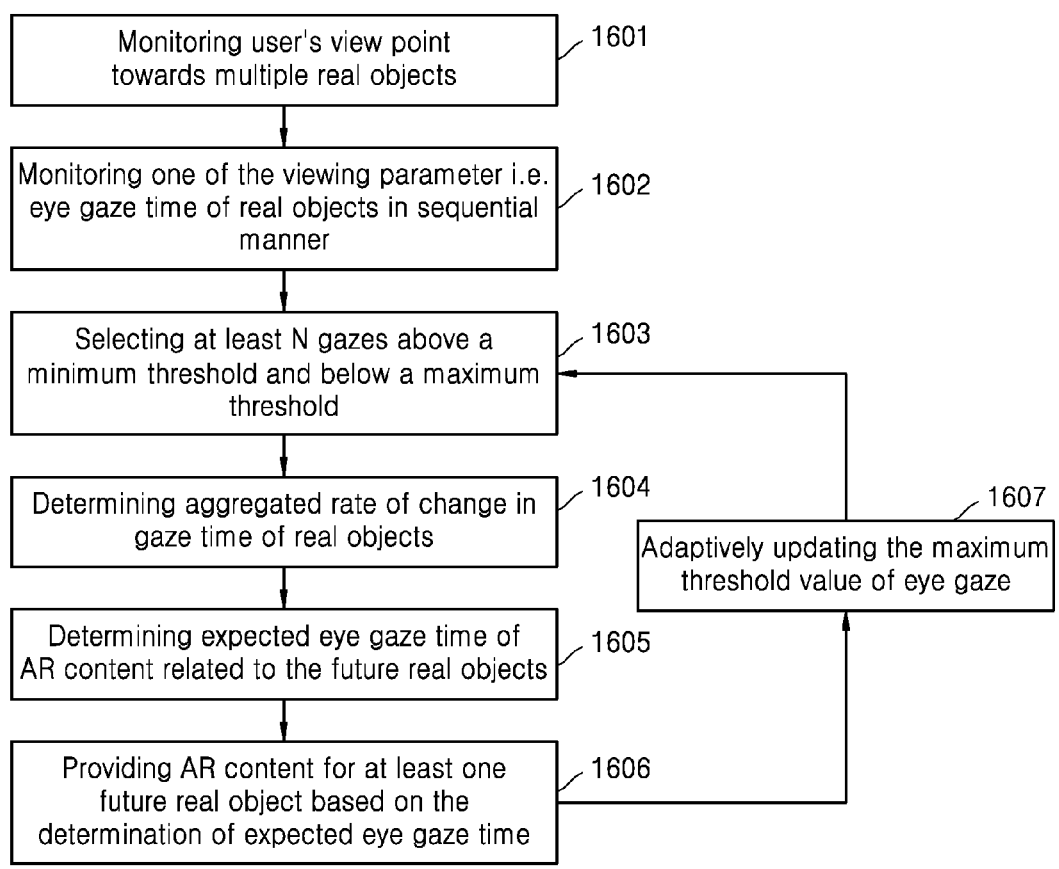
FIG. 16 is a flowchart illustrating a method of providing AR content for at least one future real object based on an expected gaze time for next appearing AR content with only eye-gaze duration of augmented objects as the available or used viewing parameter according to an embodiment.

FIG. 16 is a flowchart illustrating a method of providing AR content for at least one further object, i.e., a future object, based on a determined expected gaze time with only an eye-gaze time/duration with respect to augmented objects as a viewing parameter available or used, in accordance with an embodiment of the present disclosure. In the method, at least N gazes above a minimum threshold value and below a maximum threshold value are selected for monitoring where the minimum threshold value and the maximum threshold value are, the minimum threshold view time, and the maximum threshold view time, respectively, as described above. In operation 1601, based on a view captured by the view-capturing module 602, the controller 608 of the AR device 600A starts monitoring a user's viewpoint towards multiple augmented objects. In operation 1602, the controller 608, based on the eye-movement tracking by the eye-tracking module 604, monitors a viewing activity of the user by monitoring the viewing parameter i.e., the gaze-time with respect to the augmented objects, in a time-based sequential manner. In operation 1603, at least N gazes above a minimum threshold and below a maximum threshold are selected by the controller 608. In operation 1604, the controller 608 determines an aggregated rate of change in the gaze time with respect to the augmented objects. The above operations performed by the controller 608 may be performed by the controller 624 at the AR server 600B, based on information receiving from the view capturing module 602, and the eye-tracking module 604 of the AR device 600A. In operation 1605, the estimation engine 610, if available on the AR device 600A, or the estimation engine 626 at the AR server 600B, determines an expected eye-gaze time with respect to AR content related to a future object. In operation 1606, the AR content is provided on the display 616 of the AR device 600A for at least one further real object based on the expected gaze-time determined in operation 1605. The maximum threshold value of eye-gaze may be updated in an adaptive manner in operation 1607, in accordance with an embodiment of the present disclosure described above. The operation 1603 is re-performed when the maximum the threshold value of the eye-gaze is adaptively updated after providing the AR content for at least one future object. Although in an embodiment, the maximum threshold value is updated in an adaptive manner, this is not limiting to the disclosure. In various embodiments, a minimum threshold value may be updated in an adaptive manner such that based on the determined expected eye-gaze time with respect to AR content related to a future object, the minimum threshold value of eye-gaze may be updated in an adaptive manner in operation 1607 instead of the maximum threshold value. In various embodiments, both the minimum threshold value and the maximum threshold value may be updated in operation 1607 based on the determined expected eye-gaze time.

Figure 17:
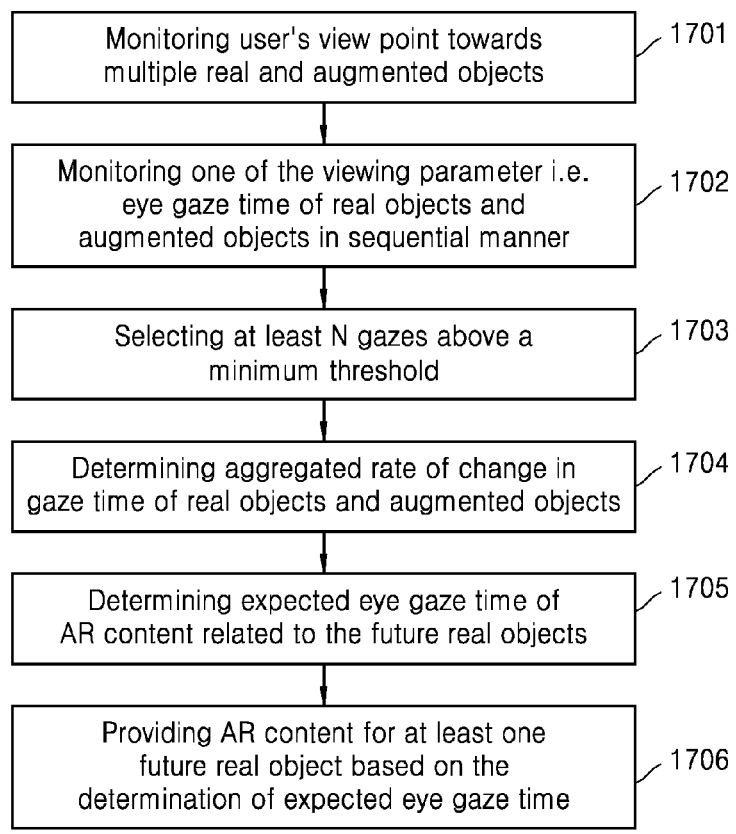
FIG. 17 is a flowchart illustrating a method of providing AR content for at least one future real object based on an expected gaze time for next appearing AR content with both eye-gaze duration of real objects and augmented objects as the available or used viewing parameters according to an embodiment.

FIG. 17 is a flowchart illustrating a method of providing AR content for at least one further object, i.e., a future object, based on a determined expected gaze time with only an eye-gaze time/duration with respect to both real objects and augmented objects as a viewing parameter available or used, in accordance with an embodiment of the present disclosure. The method does not rely on a maximum view time threshold for the eye-gaze duration. In operation 1701, based on a view captured by the view-capturing module 602, the controller 608 of the AR device 600A starts monitoring a user's viewpoint towards multiple real and augmented objects. In operation 1702, the controller 608, based on the eye-movement tracking by the eye-tracking module 604, monitors a viewing activity of the user by monitoring a viewing parameter, i.e., a gaze-time with respect to real objects and augmented objects, in a time-based sequential manner. In operation 1703, at least N gazes above a minimum threshold, i.e., the minimum threshold view time as described earlier, are selected by the controller 608. In operation 1704, the controller 608 determines an aggregated rate of change in a combined gaze time with respect to both of the real objects and augmented objects. The above operations performed by the controller 608 may be performed by the controller 624 at the AR server 600B, based on information receiving from the view capturing module 602, and the eye-tracking module 604 of the AR device 600A. In operation 1705, the estimation engine 610, if available on the AR device 600A, or the estimation engine 626 at the AR server 600B, determines an expected eye-gaze time with respect to AR content related to a future or further real object. In operation 1706, the AR content is provided on the display 616 of the AR device 600A for at least one further real object based on the expected gaze-time determined in operation 1705.

Figure 18:
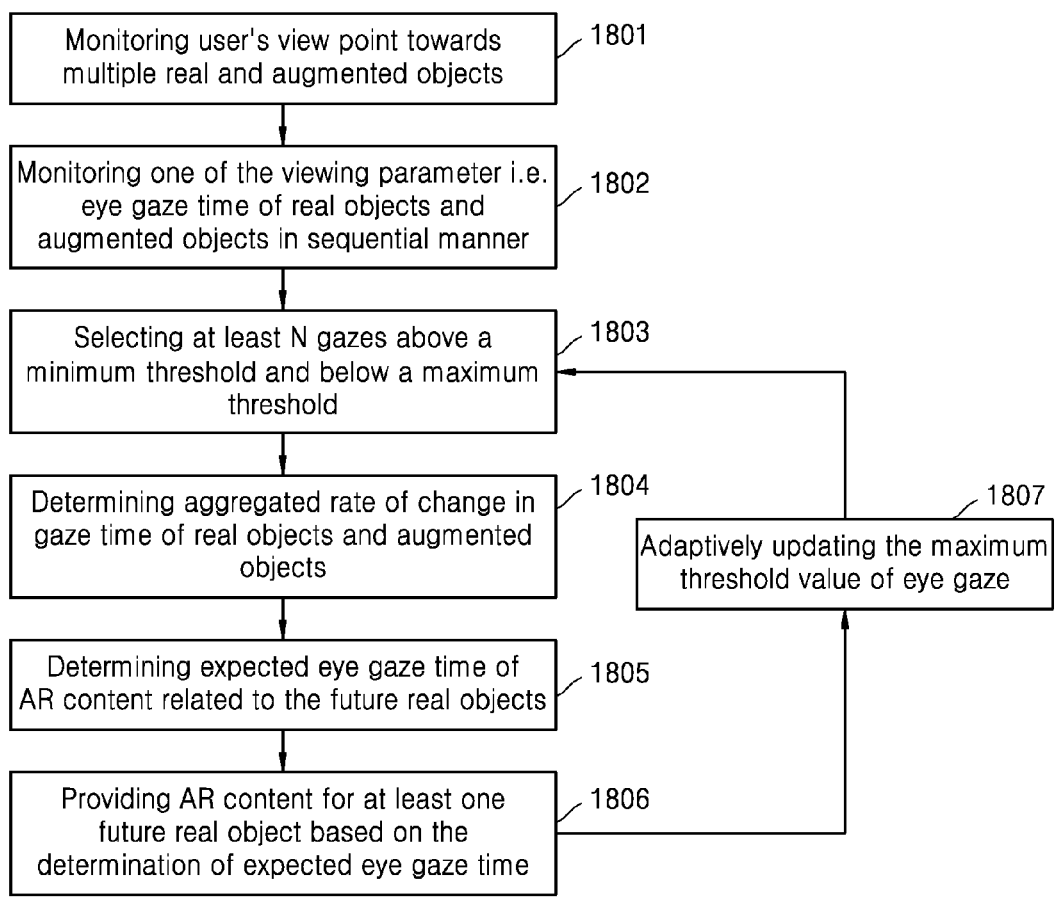
FIG. 18 is a flowchart illustrating a method of providing AR content for at least one future real object based on an expected gaze time for next appearing AR content with both eye-gaze duration of real objects and augmented objects as the available or used viewing parameters according to an embodiment.

FIG. 18 is a flowchart illustrating a method of providing AR content for at least one further object, i.e., a future object, based on a determined expected gaze time with only an eye-gaze time/duration with respect to both real and augmented objects as a viewing parameter available or used, in accordance with an embodiment of the present disclosure. In the method, at least N gazes above a minimum threshold value and below a maximum threshold value are selected for monitoring where the minimum threshold value and the maximum threshold value are, the minimum threshold view time and the maximum threshold view time, respectively, as described above. In operation 1801, based on a view captured by the view-capturing module 602, the controller 608 of the AR device 600A starts monitoring a user's viewpoint towards multiple real and augmented objects. In operation 1802, the controller 608, based on the eye-movement tracking by the eye-tracking module 604, monitors a viewing activity of the user by monitoring the viewing parameter i.e., the gaze-time with respect to real and augmented objects, in a time-based sequential manner. In operation 1803, at least N gazes above a minimum threshold and below a maximum threshold are selected by the controller 608. In operation 1804, the controller 608 determines an aggregated rate of change in a combined gaze time with respect to both the real objects and augmented objects. The above operations performed by the controller 608 may be performed by the controller 624 at the AR server 600B, based on information receiving from the view capturing module 602, and the eye-tracking module 604 of the AR device 600A. In operation 1805, the estimation engine 610, if available on the AR device 600A, or the estimation engine 626 at the AR server 600B, determines an expected eye-gaze time with respect to AR content related to a future object or further real object. In operation 1806, the AR content is provided on the display 616 of the AR device 600A for at least one further real object based on the expected gaze-time determined in operation 1805. The maximum threshold value of eye-gaze may be updated in an adaptive manner, in operation 1807, in accordance with an embodiment of the present disclosure described above. The operation 1803 is re-performed when the maximum the threshold value of the eye-gaze is adaptively updated after providing the AR content for at least one future object. Although in an embodiment, the maximum threshold value is updated in an adaptive manner, this is not limiting to the disclosure. In various embodiments, a minimum threshold value may be updated in an adaptive manner such that based on the determined expected eye-gaze time with respect to AR content related to a future object, the minimum threshold value of eye-gaze may be updated in an adaptive manner in operation 1807 instead of the maximum threshold value. In various embodiments, both the minimum threshold value and the maximum threshold value may be updated in operation 1807 based on the determined expected eye-gaze time.

Figure 19:
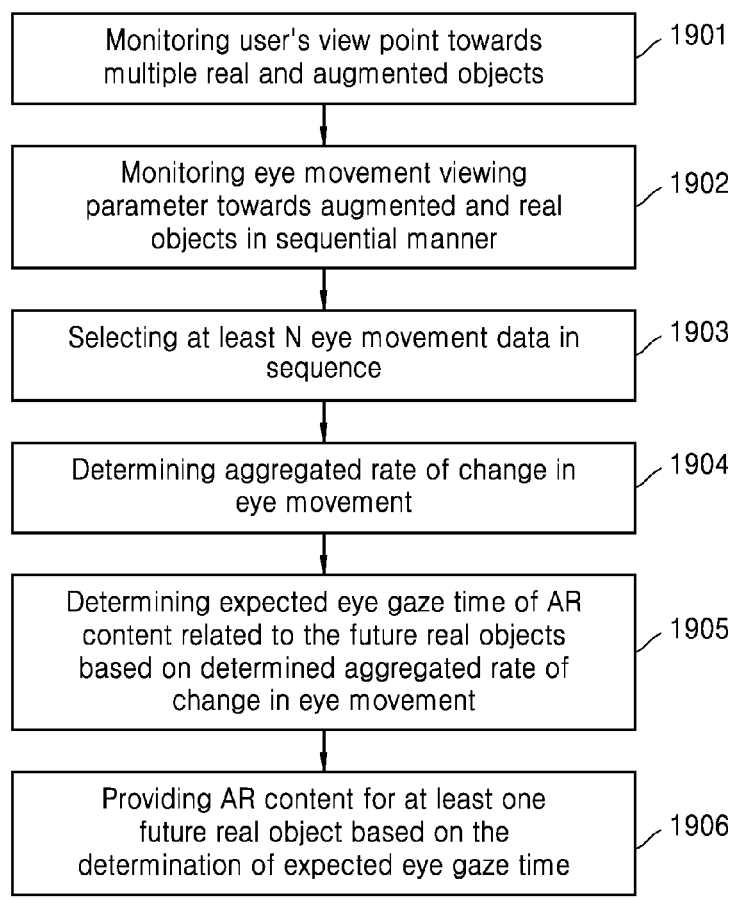
FIG. 19 is a flowchart illustrating a method of providing AR content for at least one future real object based on an expected gaze time for next appearing AR content with only eye-movement data as the available or used viewing parameter according to an embodiment.

FIG. 19 is a flowchart illustrating a method of providing AR content for at least one further object, i.e., a future object, based on a determined expected gaze time with the eye-movement data as an available or used viewing parameter with respect augmented and real objects, in accordance with an embodiment of the present disclosure. In operation 1901, based on a view captured by the view-capturing module 602, the controller 608 of the AR device 600A starts monitoring a user's viewpoint towards multiple real and augmented objects. In operation 1902, the controller 608, based on the eye-movement tracking by the eye-tracking module 604, monitors a viewing activity of the user by monitoring the viewing parameter, i.e., the eye-movement, while the user is viewing the real objects and the augmented objects in a time-based sequential manner. In operation 1903, at least N eye-movement data are selected by the controller 608 in a sequence. In operation 1904, the controller 608 determines an aggregated rate of change in the eye-movement data while the user is viewing the real objects and the augmented objects. The above operations performed by the controller 608 may be performed by the controller 624 at the AR server 600B, based on information received from the view capturing module 602, and the eye-tracking module 604 of the AR device 600A. In operation 1905, the estimation engine 610, if available on the AR device 600A, or the estimation engine 626 at the AR server 600B, determines an expected eye-gaze time with respect to AR content related to a future object based on the determined rate of change in eye-movement data. In operation 1906, the AR content is provided on the display 616 of the AR device 600A for at least one further real object based on the expected gaze-time determined in operation 1905.

Figure 20:
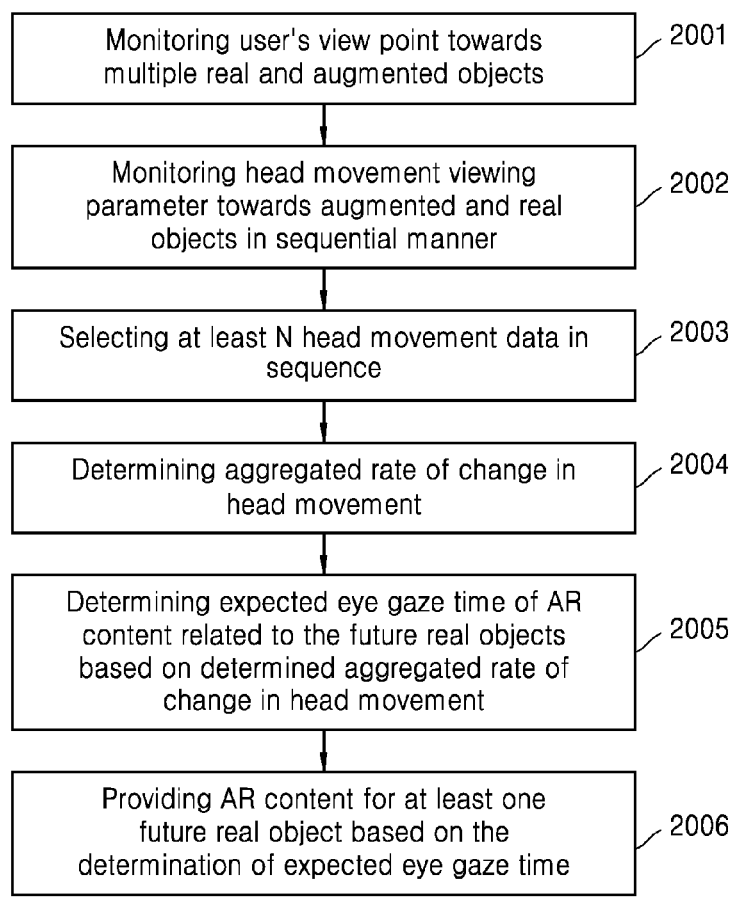
FIG. 20 is a flowchart illustrating a method of providing AR content for at least one future real object based on an expected gaze time for next appearing AR content with only head-movement data as the available or used viewing parameter according to an embodiment.

FIG. 20 is a flowchart illustrating a method of providing AR content for at least one further object, i.e., a future object, based on a determined expected gaze time with the head-movement data as an available or used viewing parameter with respect to augmented and real objects, in accordance with an embodiment of the present disclosure. At operation 2001, based on a view captured by the view-capturing module 602, the controller 608 of the AR device 600A starts monitoring user's viewpoint towards multiple real and augmented objects. In operation 2002, the controller 608, based on the head-movement tracking by the head-tracking module 606, monitors a viewing activity of the user by monitoring the viewing parameter, i.e., the head-movement, while the user is viewing the real objects and the augmented objects in a time-based sequential manner. In operation 2003, at least N head-movement data are selected by the controller 608 in a sequence. In operation 2004, controller 608 determines an aggregated rate of change in the head-movement data while the user is viewing the real objects and the augmented objects. The above operations performed by the controller 608 may be performed by the controller 624 at the AR server 600B based on information receiving from the view capturing module 602, and the head-tracking module 606 of the AR device 600A. In operation 2005, the estimation engine 610, if available on the AR device 600A, or the estimation engine 626 at the AR server 600B, determines an expected eye-gaze time of an AR content related to a future object or further real object based on the determined rate of change in the head-movement data. In operation 2006, the AR content is provided on the display 616 of the AR device 600A for at least one further real object based on the expected gaze-time determined in operation 2005.

Figure 21:
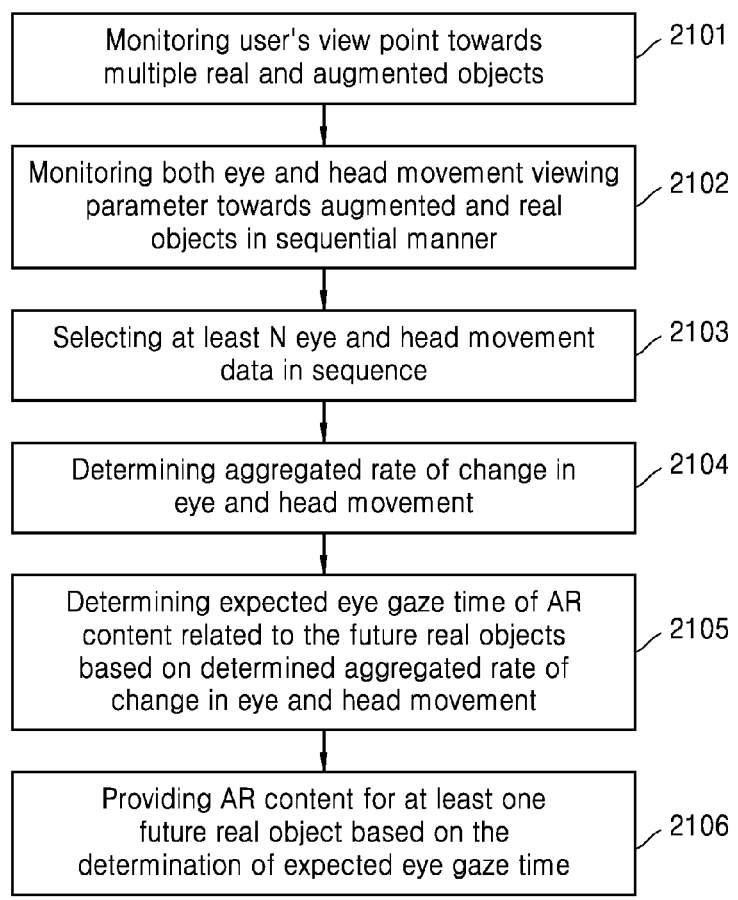
FIG. 21 is a flowchart illustrating a method of providing AR content for at least one future real object based on an expected gaze time for next appearing AR content with both eye-movement data and the head-movement data as the available or used viewing parameters according to an embodiment.

FIG. 21 is a flowchart illustrating a method of providing AR content for at least one further object, i.e., a future object, based on the determined expected gaze time with the both eye-movement data and head-movement data as the available or used viewing parameters with respect to augmented and real objects, in accordance with an embodiment of the present disclosure. In operation 2102, based on a view captured by the view-capturing module 602, the controller 608 of the AR device 600A starts monitoring a user's viewpoint towards multiple real and augmented objects. In operation 2102, the controller 608, based on the eye-movement tracking by the eye-tracking module 604 and the head-movement tracking by the head-tracking module 606, monitors a viewing activity of the user by monitoring the viewing parameters i.e., the combined eye-movement and the head-movement data while viewing the real objects and the augmented objects in a time-based sequential manner. In operation 2103, at least N eye-movement data and head-movement data are selected by the controller 608 in a sequence. In operation 2104, the controller 608 determines an aggregated rate of change in the combined eye-movement data and the head-movement data while the user is viewing the real objects and the augmented objects. The above operations performed by the controller 608 may be performed by the controller 624 at the AR server 600B based on information receiving from the view capturing module 602, the eye-tracking module 604, and the head-tracking module 606 of the AR device 600A. In operation 2105, the estimation engine 610, if available on the AR device 600A, or the estimation engine 626 at the AR server 600B, determines an expected eye-gaze time of AR content related to a future object based on the determined rate of change in the eye-movement data and the head-movement data. In operation 2106, the AR content is provided on the display 616 of the AR device 600A for at least one further real object based on the expected gaze-time determined in operation 2105.

Figure 22:
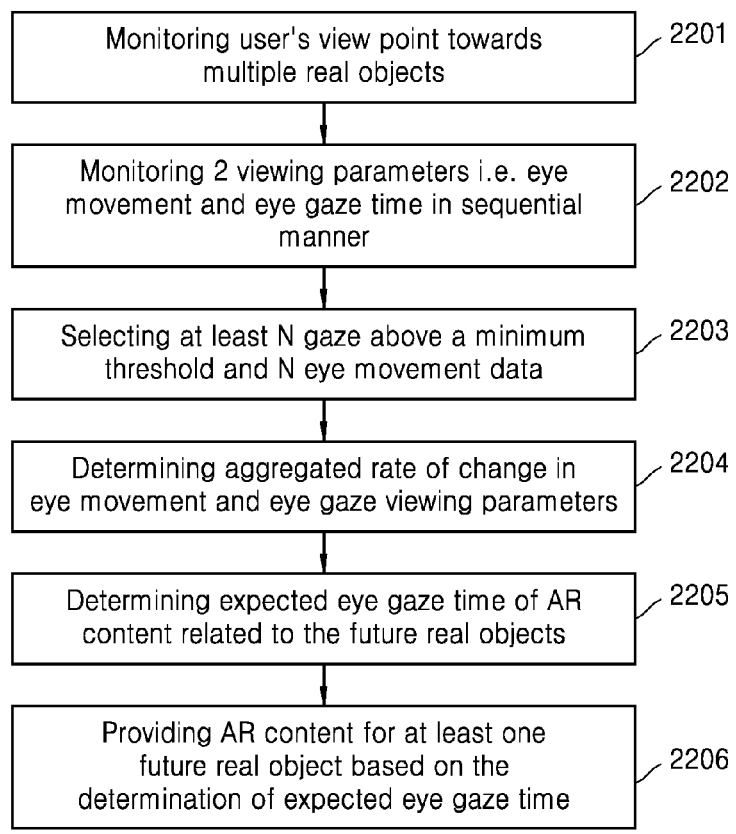
FIG. 22 is a flowchart illustrating a method of providing AR content for at least one future real object based on an expected gaze time for next appearing AR content with both eye-movement data and the gaze-duration as the available or used viewing parameters according to an embodiment.

FIG. 22 is a flowchart illustrating a method of providing AR content for at least one further object, i.e., a future object, based on the determined expected gaze time with the both eye-movement data and eye-gaze duration as the available or used viewing parameters with respect to augmented and real objects, in accordance with an embodiment of the present disclosure. In operation 2202, based on a view captured by the view-capturing module 602, the controller 608 of the AR device 600A starts monitoring a user's viewpoint towards multiple real and augmented objects. In operation 2202, the controller 608, based on the eye-movement tracking by the eye-tracking module 604, monitors a viewing activity of the user by monitoring the viewing parameters i.e., the combined eye-movement data and eye-gaze time, in a time-based sequential manner. In operation 2203, at least N eye-movement data in a sequence and at least N gazes above a minimum threshold are selected by the controller 608. In operation 2204, the controller 608 determines an aggregated rate of change in the combined eye-movement data and the gaze-durations. The above operations performed by the controller 608 may be performed by the controller 624 at the AR server 600B based on information receiving from the view capturing module 602, and the eye-tracking module 604 of the AR device 600A. In operation 2205, the estimation engine 610, if available on the AR device 600A, or the estimation engine 626 at the AR server 600B, determines an expected eye-gaze time of AR content related to a future object based on the determined rate of change in the eye-movement data and the gaze-durations. In operation 2206, the AR content is provided on the display 616 of the AR device 600A for at least one further real object based on the expected gaze-time determined in operation 2205.

Figure 23:
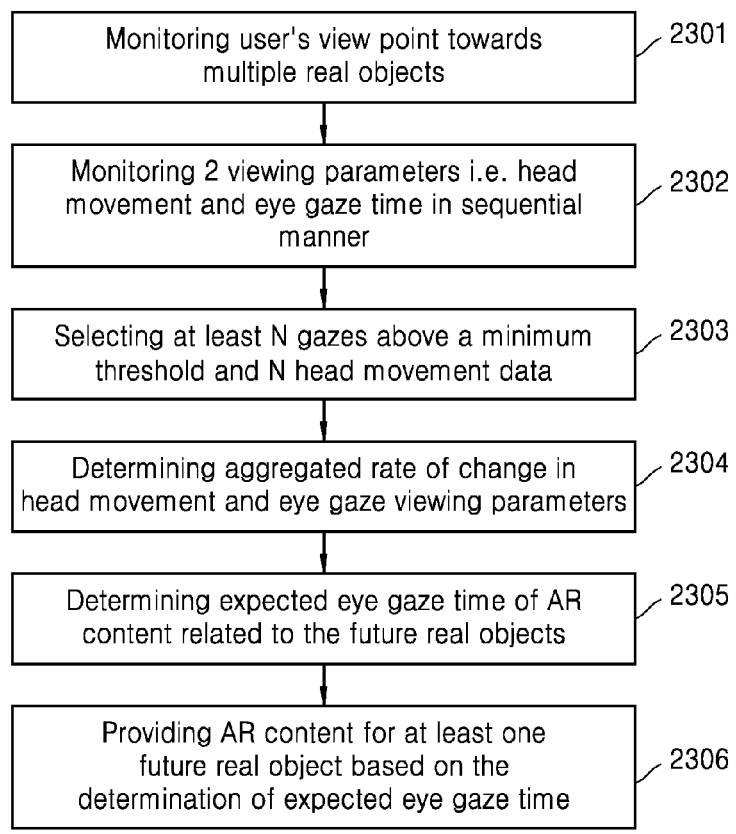
FIG. 23 is a flowchart illustrating a method of providing AR content for at least one future real object based on an expected gaze time for next appearing AR content with both head-movement data and the gaze-duration as the available or used viewing parameters according to an embodiment.

FIG. 23 is a flowchart illustrating a method of providing AR content for at least one further object, i.e., a future object, based on the determined expected gaze time with the both head-movement data and eye-gaze duration as the available or used viewing parameters with respect to augmented and real objects, in accordance with an embodiment of the present disclosure. In operation 2301, based on a view captured by the view-capturing module 602, the controller 608 of the AR device 600A starts monitoring a user's viewpoint towards multiple real and augmented objects. In operation 2302, the controller 608, based on the eye-gaze tracking by the eye-tracking module 604 and the head-movement tracking by the head-tracking module 606, monitors a viewing activity of the user by monitoring the viewing parameters, i.e., the combined head-movement data and eye-gaze time in a time-based sequential manner. In operation 2303, at least N head-movement data in a sequence and at least N gazes above a minimum threshold are selected by the controller 608. In operation 2304, the controller 608 determines an aggregated rate of change in the combined head-movement data and the gaze-durations. The above operations performed by the controller 608 may be performed by the controller 624 at the AR server 600B based on information receiving from the view capturing module 602, the eye-tracking module 604, and the head tracking module 606 of the AR device 600A. In operation 2305, the estimation engine 610, if available on the AR device 600A, or the estimation engine 626 at the AR server 600B, determines an expected eye-gaze time of an AR content related to a future object based on the determined rate of change in the head-movement data and the gaze-durations. In operation 2306, the AR content is provided on the display 616 of the AR device 600A for at least one further real object based on the expected gaze-time determined in operation 2005.

Figure 24:
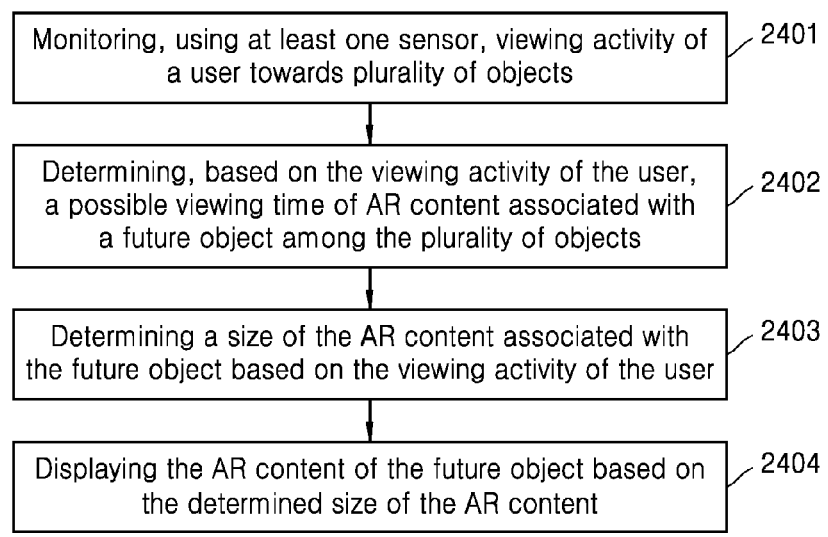
FIG. 24 is a flowchart illustrating a method of providing AR content for at least one future real object based on an expected gaze time for next appearing AR content according to an embodiment.

FIG. 24 is a flowchart illustrates a method of providing AR content in accordance with various embodiment of the present disclosure. In operation 2401, based on a view captured by the view-capturing module 602, the controller 608 of the AR device 600A starts monitoring a user's viewing activity toward at least one object based on the eye-gaze tracking by the eye-tracking module 604 and the head-movement tracking by the head-tracking module 606. When monitoring the viewing activity, the controller 608 monitors one or more viewing parameters, i.e., the eye-gaze events, the eye-ball movement data, and the head-movement data, in a sequential manner. Further, the monitored viewing activity includes at least one of viewing instances over at least one of the plurality of time instances and a plurality of eye-gazes. The above operations performed by the controller 608 may be performed by the controller 624 at the AR server 600B based on information receiving from the view capturing module 602, the eye-tracking module 604, and the head tracking module 606 of the AR device 600A. In operation 2402, based on the viewing activity as monitored in operation 2403, the estimation engine 610, if available on the AR device 600A, or the estimation engine 626 at the AR server 600B, determines a possible viewing time of AR content associated with a future object which is a next appearing object in the field of view of the user. Further, the estimation engine 626 at the AR server 600B determines further at least one of the AR content from a set of AR contents associated with the future object and a size of the AR content associated with the future object. In operation 2403, the estimation engine 610, if available on the AR device 600A, or the estimation engine 626 at the AR server 600B, determines a size of the AR content to be displayed associated with the future object based on the viewing activity of the user. In operation 2404, the AR content rendering module 614 may cause the display 616 to display the AR content as determined to be rendered during viewing of the future object based on the determined size of the AR content.

The foregoing description describes some embodiments of the above-disclosed methods in FIGS. 11-24 performed by the AR device 600A. Some further embodiments of the present disclosure will become apparent based on the following use-cases.

Figure 25A:
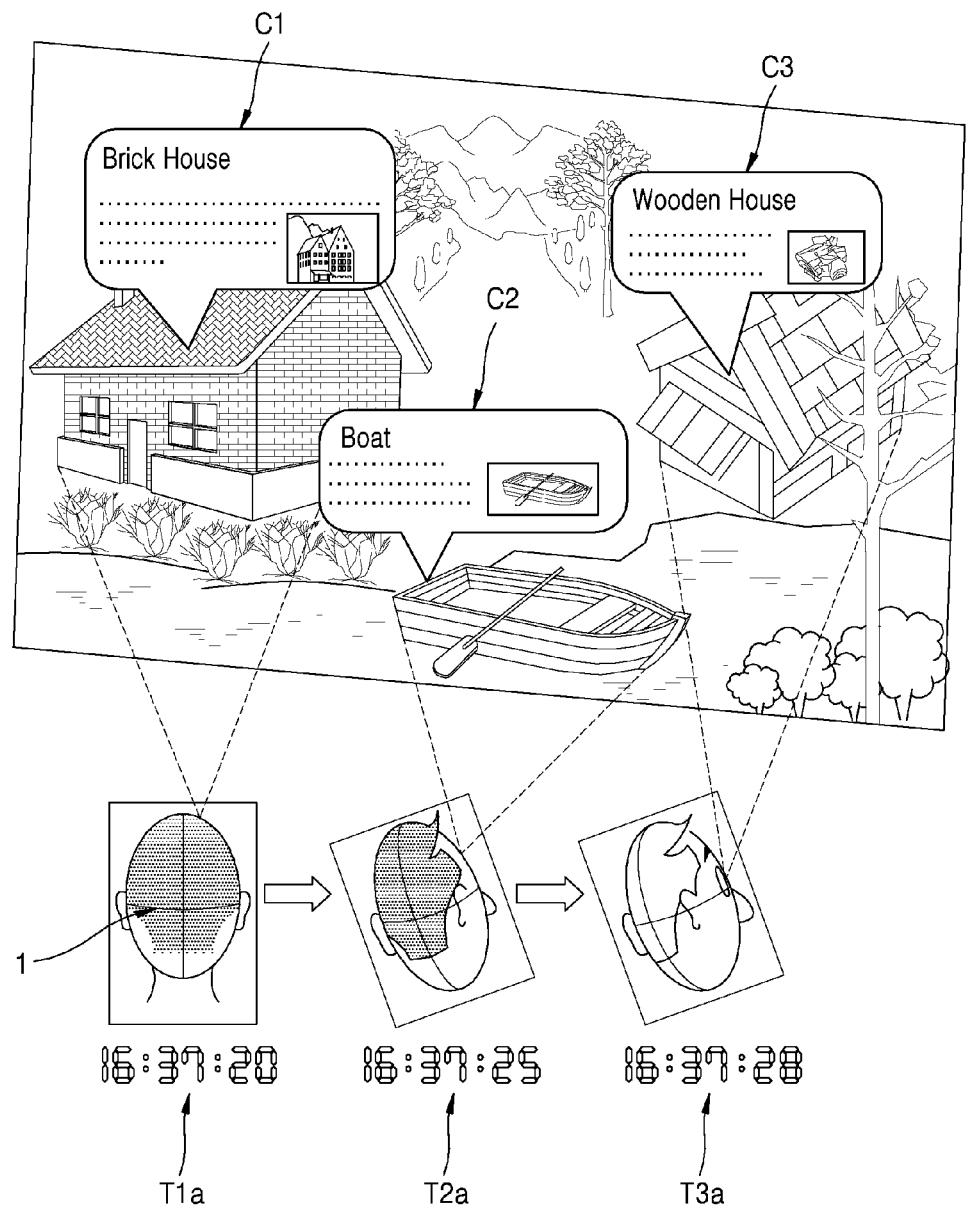
FIGS. 25A and 25B are views illustrating providing adaptive AR content based on user's viewing pattern according to an embodiment.
Figure 25B:
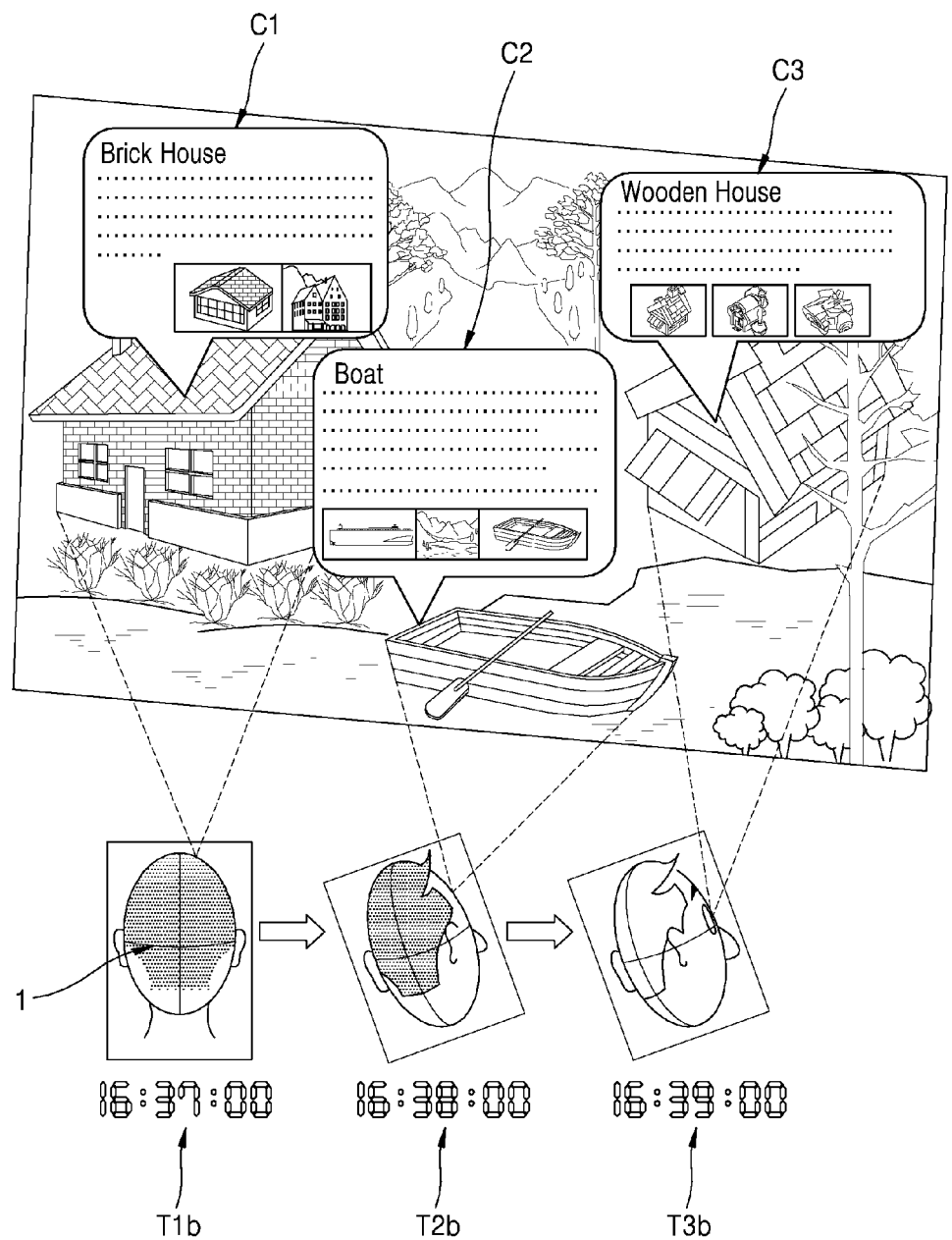

FIG. 25A and FIG. 25B are views illustrating providing best fit AR content for a real object to a user based on a user's real-time viewing behavior as captured in accordance with the present disclosure. Referring to FIG. 25A, a user's viewing pattern is analyzed and accordingly the AR content is adjusted based on the analyzed viewing pattern of the user. The user's viewing pattern is analyzed to determine if the user 1 is a fast explorer and is quickly exploring the provided AR. The same may be inferred from the head-movement of the user 1 within time-intervals in-between time T1a and time T2a, and in-between time T2a and time T3a, where a rate of head-movement is found to be changing in seconds. Thus, the estimated gaze time of the user is found to be very low and accordingly, less AR contents C1, C2, and C3 are provided to the user, where C1 is displayed until time T1a C2 is displayed for a time-period in-between time T1a and time T2a, and C3 is displayed for a time-period in-between time T2a and time T3a, respectively. Whereas, referring to FIG. 25B, the user's viewing pattern is analyzed to determine if the user 1 is a slow explorer and is slowly exploring the provided AR content. The same may be inferred from the head-movement of the user 1 within time-intervals in-between time T1b and time T2b, and in-between time T2b and time T3b, where the rate of head-movement is found to be changing in minutes. Thus, the estimated gaze time of the user is found to be comparatively higher than shown in FIG. 25A and accordingly, larger AR contents C1, C2, and C3 are provided to the user, where C1 is displayed till time T1b, C2 is displayed for a time-period in-between time T1b and time T2b, and C3 is displayed for a time-period in-between time T2b and time T3b, respectively.

Figure 26B:
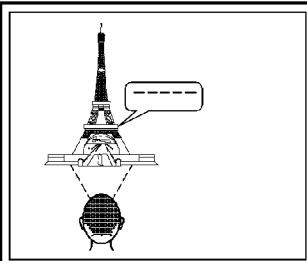
Figure 26B:
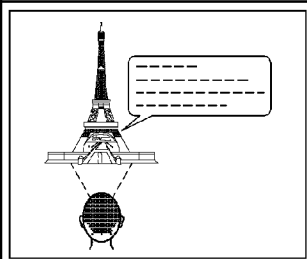
Figure 26B:
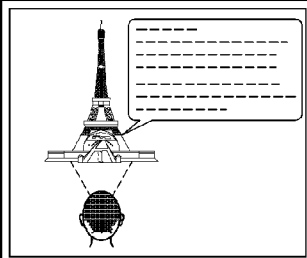

FIGS. 26A, 26B, 27, 28, 29, and 30 are views illustrating adaptively changing AR content based on user's gaze-time observations in the near past according to an embodiment. FIG. 26A is a view illustrating a table of gaze time observations with regard to real and augmented objects for five users, 'user 1', 'user 2', 'user 3', 'user 4', and 'user 5'. In the illustrated table, 'T' represents a gaze time for augmented and real objects, 'A' represents AR content, and 'x' represents ignored eye-gaze observations which are beyond the threshold values set for the eye-gaze time. Further, '$T_{HH}$' represents a very high gaze-time value, '$T_H$' represents a high gaze time value, '$T_M$' represents a moderate gaze time value, '$T_L$' represents a low gaze time value and '$T_{LL}$' represents a very low gaze time value. In particular, FIG. 26A illustrates highlighted past observations of the gaze-time of the first user, User 1. For User 1, observations 1, 2, 3, i.e., the observations with respect to Objects 1, 2, and 3, are rejected as they fall beyond threshold values and other observations, i.e., the observations with respect to Objects 4, 5 and 6 are taken into consideration to estimate a gaze time for the next appearing AR content related to a future object 'Object 7'. The estimated gaze-time values are observed between low and medium, and thus, AR content between less and Moderate ($A_L$-$A_M$) is accordingly shown to the user. Referring to FIG. 26A, since no past observations of the gaze-time meets the threshold values (a predetermined maximum threshold value or a predetermined minimum threshold value) with respect to User 5, no AR content will be displayed. In the example above, the size of the AR content will be set to zero (no AR content).

FIG. 26B is a view illustrating less AR content (AL), moderate AR content (AM), and more, detailed AR content (AH) in terms of the size of the AR content to be shown to the user based on the observed gaze time values.

FIG. 27 is a view illustrating a table similar to the table depicted in FIG. 26A of gaze time observations with respect to real and augmented objects for five users, 'user 1', 'user 2', 'user 3', 'user 4', and 'user 5'. In particular, FIG. 27 represents highlighted past observations with respect to gaze-time of the second user, User 2. For User 2, all observations, i.e., the observations with respect to object 1, 2, 3, 4, 5 and 6, till the present time, are taken into consideration to estimate a gaze time for the next appearing AR content related to a future object 'Object 7'. The estimate gaze-time for the next appearing augmented content is a low gaze-time value ($A_L$). Accordingly, less AR content ($A_L$) is shown for the Object 7. FIG. 26B illustrates less AR content ($A_L$), moderate AR content ($A_M$), and more AR content ($A_H$) to be shown to the user based on the observed gaze time values.

FIG. 28 is view illustrating a table similar to the table depicted in FIG. 26A of gaze time observations with respect to real and augmented objects for five users, 'user 1', 'user 2', 'user 3', 'user 4', and 'user 5'. In particular, FIG. 28 represents highlighted past observations of a gaze-time of the third user, User 3. For User 3, observations 3 and 4, i.e., the observations with respect to Objects 3 and 4, are rejected as they fall beyond threshold values and other observations, i.e., the observations with respect to Objects 1, 2, 5, and 6 are taken into consideration to estimate a moderate gaze time for the next appearing AR content related to a future object 'Object 7'. Accordingly, moderate AR content ($A_M$) is shown for Object 7. FIG. 26B illustrates less AR content ($A_L$), moderate AR content ($A_M$), and more AR content ($A_H$) to be shown to the user based on the observed gaze time values.

FIG. 29 is a view illustrating a similar table to the table shown in FIG. 26A of gaze time observations with respect to real and augmented objects for five users, 'user 1', 'user 2', 'user 3', 'user 4', and 'user 5'. In particular, FIG. 29 represents highlighted past observations of gaze-time of the fourth user, User 4. For User 4, observations 4, 5, and 6, i.e., the observations with respect to Objects 4, 5, and 6, are rejected as they fall beyond threshold values and other observations, i.e., observations with respect to Objects 1, 2, and 3 are taken into consideration to estimate a high gaze time for the next appearing AR content related to a future object 'Object 7'. Accordingly, more AR content ($A_H$) is shown for Object 7. FIG. 26B illustrates less AR content ($A_L$), moderate AR content ($A_M$), and more AR content ($A_H$) to be shown to the user based on the observed gaze time values.

FIG. 30 is a view illustrating a similar table to the one depicted in FIG. 26A of gaze time observations with respect to real and augmented objects for five users, 'user 1', 'user 2', 'user 3', 'user 4', and 'user 5'. In particular, FIG. 30 represents highlighted past observations of a gaze-time of the fifth user, User 5. For User 5, all the eye-gaze observations with respect to Objects 1, 2, 3, 4, 5, and 6, are rejected as they all fall beyond threshold values. Thus, no AR content is shown for the future object, 'Object 7'. It may be inferred from the observation of the eye-gaze values of the fifth user that he/she is least interested in viewing AR content and may not even watch it even if shown to him/her.

FIGS. 31 A and B are views illustrating limiting the number of AR contents simultaneous provided during viewing of a plurality of future objects according to an embodiment. By knowing the estimated gaze time and the observation category of a user, only best fit AR content will be selected to be in a field of view of the user. In this way, the AR content which does not qualify for user's estimated gaze time will not appear. FIG. 31A and FIG. 31B are views illustrating a difference in AR experience when the disclosure is not used and when the present disclosure is used, respectively. As illustrated in FIG. 31A, AR contents for all the real objects are shown to the user, and as a result, the field of view of the user appears messy. However, as illustrated in FIG. 31(B), based on user's time availability, limited AR content is shown to the user which best fits within the limited viewing time available for the AR contents. Other AR content which does not qualify for the user's estimated gaze time remains hidden.

FIG. 32A is a view illustrating determining the expected gaze time of the user based on an observation category determined for the user according to an embodiment. Once the observation category is determined based on comparing the current viewing activity pattern data with a past viewing activity pattern data, the best fit AR content is provided to the user at a first sight. As seen in FIG. 32A, if the user's observation category is that of a fast explorer, reduced and introductory AR content appears to the user for viewing, if the user's observation category is that of a moderate explorer, intermediate level AR content appears to the user for viewing, and if the user's observation category is that of a slow explorer, detailed AR content appears to the user for viewing.

FIG. 32B is a view illustrating enhancing already appearing AR content, in accordance with an embodiment of the present disclosure. According to the embodiment, the AR content for a currently in focus real object is at least enriched, enhanced, or increased as the eye gaze time is increased on the real object or its AR content. AR content based on a determined eye-gaze time having a first associated viewing time is shown to the user. For example, as illustrated in FIG. 32B, less AR content is initially shown to the user. As the current viewing time of the very less AR content exceeds a minimum threshold, as may be inferred from the eye-gaze time versus AR content graph of FIG. 32B, the size of the AR content is increased to a moderate level AR content. Further, as the current viewing time for the moderate level AR content also exceeds the minimum threshold level, as may be inferred from the eye-gaze time versus AR content graph of FIG. 32B, the size of the AR content is increased to a detailed level AR content.

FIG. 32C is a view illustrating a determination of a suitable media type based on an estimated gaze time ($T_{Ax}$) of the next appearing AR content related to a future object, in accordance with an embodiment of the present disclosure. As illustrated in FIG. 32C, the media type may be selected from a video type, audio type, text type, image type, or one or more combined media types, based on the estimated gaze-time.

FIG. 33A and FIG. 33B are views illustrating another example of adjusting AR content according to a viewing pattern observed for a user as a reader using AR glasses, in accordance with an embodiment of the present inventive concept. FIG. 33A illustrates providing a summarized version of the digital AR content to a reader who is observed to be a fast explorer. FIG. 33B illustrates providing a detailed version of the digital AR content to a reader who is observed to be a slow explorer.

FIG. 34 is a view illustrating adjusting AR content according to a viewing pattern observed for a user through continuous capturing of eye-gaze events, eye-movement, and head-movement data of the user, and further based on an identified location corresponding to the AR device of the user. FIG. 34 illustrates a user whose location is identified to be in a shopping mall and the viewing pattern determined for the user is indicative of a wandering interest. Accordingly, a number of shopping offers related AR content is provided to the user which best fits within the expected gaze-time of the user for the AR content. If the user's viewing pattern is indicative of a user in a hurry, no AR content is shown to the user.

FIG. 35 is a view illustrating brief or detailed AR audio content, as appropriate, being delivered to the user according to an embodiment. An AR duration of the AR audio content may be based on a user's observation category.

FIG. 36 is a view illustrating real-time adaptive AR content being presented to a viewer in a virtual reality (VR) playback scene, the real-time adaptive AR content being based on the viewer's viewing activity as monitored, in accordance with an embodiment of the present disclosure.

While certain embodiments have been illustrated and described herein, it is to be understood that the inventive concept is not limited thereto. Clearly, the inventive concept may be otherwise variously embodied and practiced within the scope of the following claims.

What is claimed is:

1. A method of providing augmented reality (AR) content in an AR device, the method comprising:
    monitoring a viewing activity of a user among a plurality of objects;
    detecting at least one viewing parameter comprising eye gaze time based on a head movement of the user or an eyeball movement of the user;
    determining, based on the eye gaze time, an observation category indicating whether the user is a fast explorer when exploring among the plurality of objects based on a duration of the eye gaze time between each of the plurality of objects;
    determining, based on the viewing activity of the user, a viewing time of AR content associated with a next appearing at least one object among the plurality of objects;
    determining an amount of the AR content associated with the next appearing at least one object based on the monitored viewing activity of the user and the observation category; and
    displaying the AR content of the next appearing at least one object based on the determined amount of the AR content.

2. The method of claim 1, wherein
    the at least one viewing parameter further comprises eye movement determined based on the head movement of the user or the eye ball movement of the user.

3. The method of claim 1, wherein the monitoring of the viewing activity of the user comprises:
    estimating the viewing time using the detected at least one viewing parameter.

4. The method of claim 1,
    wherein the eye gaze time is divided into a plurality of time instances, and wherein the determining of the observation category comprises determining the observation category by estimating the viewing time based on the plurality of the time instances.

5. The method of claim 4, wherein the determining of the viewing time further comprises:
in response to a determination that each of viewing time corresponding to each of the plurality of time instances is one of greater than a predetermined maximum threshold time and less than a predetermined minimum threshold time, determining the amount of the AR content associated with the next appearing at least one object as zero.

6. The method of claim 1, wherein the determining of the amount of the AR content comprises determining the amount of the AR content in proportion to the length of the eye gaze time.

7. The method of claim 1, wherein the viewing activity comprises at least one of viewing instances over at least one of a plurality of times instances or a plurality of eye gazes.

8. The method of claim 1, wherein the monitoring of the viewing activity of the user comprises filtering the viewing activity of the user having a viewing time less than a predetermined minimum threshold time or greater than a predetermined maximum threshold time.

9. The method of claim 8, wherein the monitoring of the viewing activity of the user further comprises updating at least one of the predetermined minimum threshold time and the predetermined maximum threshold time based on at least one of the observation category, historical viewing activity data, real time viewing activity data, and user-specific profile data.

10. The method of claim 1, further comprising:
monitoring user data stored in the AR device and location data of the AR device,
wherein the determining of the viewing time of the AR content is performed based on the viewing activity of the user, the monitored user data, and the monitored location data of the AR device.

11. An apparatus for providing augmented reality content, the apparatus comprising:
at least one sensor configured to monitor viewing activity of a user among a plurality of objects;
a processor configured to:
detect at least one viewing parameter comprising eye gaze time based on a head movement of the user or an eyeball movement of the user;
determine, based on the eye gaze time, an observation category indicating whether the user is a fast explorer when exploring among the plurality of objects based on a duration of the eye gaze time between each of the plurality of objects;
determine, based on the viewing activity of the user monitored by the at least one sensor, a viewing time of AR content associated with a next appearing object among the plurality of objects, and
determine an amount of the AR content associated with the next appearing object based on the monitored viewing activity of the user and the observation category; and
a display configured to display the AR textual content of the next appearing object based on the amount of the AR content.

12. The apparatus of claim 11, wherein the at least one viewing parameter further comprises an eye movement determined based on the head movement of the user or the eye ball movement of the user.

13. The apparatus of claim 11, wherein the monitoring of the viewing activity of the user comprises:
estimating the viewing time based on the at least one viewing parameter.

14. The apparatus of claim 11,
wherein the eye gaze time is divided into a plurality of time instances, and
wherein the determining of the observation category comprises determining the observation category by estimating the viewing time based on the plurality of the time instances.

15. The apparatus of claim 14, wherein the determining of the viewing time comprises determining the amount of the AR textual content associated with the next appearing object as zero in response to a determination that each of viewing time corresponding to each of the plurality of time instances is greater than a predetermined maximum threshold time or less than a predetermined minimum threshold time.

16. A non-transitory computer readable storage medium having a computer readable program stored therein, the computer readable program, when executed on an AR device, configured to execute instructions to cause the AR device to:
monitor a viewing activity of a user among a plurality of objects;
detect at least one viewing parameter comprising eye gaze time based on a head movement of the user or an eyeball movement of the user;
determine, based on the eye gaze time, an observation category indicating whether the user is a fast explorer when exploring among the plurality of objects based on a duration of the eye gaze time between each of the plurality of objects;
determine, based on the viewing activity of the user, a viewing time of AR content associated with a next appearing object among the plurality of objects;
determine an amount of the AR content associated with the next appearing object based on the viewing activity of the user and the observation category; and
display the AR content of the next appearing object based on the amount of the AR content.

* * * * *